US011812839B2

(12) United States Patent
Thulin et al.

(10) Patent No.: US 11,812,839 B2
(45) Date of Patent: Nov. 14, 2023

(54) SUSTAINABLE DISPENSING PACKAGE HAVING A LOCKING RING

(71) Applicant: The Procter & Gamble Company, Cincinnati, OH (US)

(72) Inventors: Nathaniel David Thulin, Hebron, KY (US); Matthew Corey Cataudella, West Chester, OH (US); Mitchell Edwin Messenger, Fredericktown, OH (US); Nathan Daniel Grubbs, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 457 days.

(21) Appl. No.: 17/195,708

(22) Filed: Mar. 9, 2021

(65) Prior Publication Data
US 2021/0289919 A1    Sep. 23, 2021

(30) Foreign Application Priority Data

Mar. 19, 2020   (EP) ..................................... 20164149

(51) Int. Cl.
*A45D 40/06*      (2006.01)
*B65D 83/00*      (2006.01)
*A45D 40/00*      (2006.01)

(52) U.S. Cl.
CPC .......... *A45D 40/06* (2013.01); *B65D 83/0011* (2013.01); *A45D 2040/0043* (2013.01)

(58) Field of Classification Search
CPC ................ B65D 83/0011; A45D 40/06; A45D 40/0043; A45D 2040/0043

USPC ............................................... 401/72, 73, 75
See application file for complete search history.

(56) References Cited

U.S. PATENT DOCUMENTS

| 5,902,062 A * | 5/1999 | Rosenblatt ............. A45D 40/06 401/86 |
| 6,623,197 B1 * | 9/2003 | Lee ......................... C09D 13/00 401/175 |
| 8,132,977 B2 * | 3/2012 | Pires ....................... A45D 40/06 401/88 |

(Continued)

FOREIGN PATENT DOCUMENTS

| BE | 489472 A | 7/1945 |
| KR | 101912115 B | 10/2018 |

(Continued)

OTHER PUBLICATIONS

CM05177F-EP Extended European Search Report and Search Opinion; Application No. 20164149.5; dated Jul. 22, 2020; 08 pages.

(Continued)

*Primary Examiner* — Timothy L Maust
(74) *Attorney, Agent, or Firm* — Alexandra S. Anoff

(57) ABSTRACT

Dispensing packages for a spreadable personal care product and its respective methods for dispensing a spreadable personal care product. The dispensing package comprises a reusable dispenser, a replaceable cartridge and optionally a top cap. The reusable dispenser comprises a tubular body and a telescopic actuator. The reusable dispenser comprises a locking ring removably engaged with the tubular body of the reusable dispenser to secure the replaceable cartridge within the tubular body of the reusable dispenser.

15 Claims, 32 Drawing Sheets

(56) References Cited

U.S. PATENT DOCUMENTS

| | | | | |
|---|---|---|---|---|
| 8,875,955 | B2* | 11/2014 | Arora | B65D 83/0011 |
| | | | | 401/175 |
| 11,033,091 | B2* | 6/2021 | Wiesenthal | A45D 40/16 |
| 11,517,098 | B2* | 12/2022 | Nolan | A45D 40/14 |
| 11,547,198 | B2* | 1/2023 | Thulin | A45D 40/04 |
| 2008/0286028 | A1* | 11/2008 | Lombardi | A45D 40/04 |
| | | | | 401/75 |
| 2021/0289918 | A1 | 9/2021 | Thulin et al. | |
| 2022/0039536 | A1 | 2/2022 | Hwang et al. | |
| 2022/0087399 | A1* | 3/2022 | Dunton | A45D 40/06 |
| 2022/0160102 | A1* | 5/2022 | Chien | A45D 40/04 |
| 2023/0030527 | A1* | 2/2023 | Shen | A45D 34/00 |

FOREIGN PATENT DOCUMENTS

| | | |
|---|---|---|
| WO | 2017009706 A1 | 1/2017 |
| WO | 2017048244 A1 | 3/2017 |

OTHER PUBLICATIONS

All Office Actions; U.S. Appl. No. 17/195,711.
CM05177 PCT Search Report and Written Opinion for PCT/US2021/022031 dated Jun. 15, 2021.
U.S. Appl. No. 17/195,711, filed Mar. 9, 2021, to Nathaniel David Thulin et. al.

* cited by examiner

SUSTAINABLE DISPENSING PACKAGE HAVING A LOCKING RING

FIELD OF THE INVENTION

The present application generally relates to dispensing packages for a spreadable personal care product and its respective methods for manufacturing the dispensing packages, and for dispensing and applying a spreadable personal care product. The dispensing package comprises a reusable dispenser and a replaceable cartridge, and optionally a top cap. The reusable dispenser comprises a tubular body and a telescopic actuator. The reusable dispenser comprises a locking ring removably engaged with the tubular body of the reusable dispenser to secure the replaceable cartridge within the tubular body of the reusable dispenser.

Alternatively, the locking ring comprises a first indicia, and the tubular body comprises a second indicia such that the first and second indicia together form a final indicia to indicate that the locking ring is locked to the tubular body of the reusable dispenser.

BACKGROUND OF THE INVENTION

Personal care products such as antiperspirants and deodorants for instance as a stick form product are typically packaged in what is referred to as swivel-up or elevator/threaded-shaft dispensing packages. Such dispensing packages typically have a body with an oval cross-section having a threaded shaft axially oriented therein and rotatably mounted at the bottom end through an aperture. The threaded shaft is typically connected to a hand wheel on the exterior of the package's bottom for advancing the personal care product out of the package. An elevator or follower is threadably mounted to the shaft on the interior of the package at its bottom. Turning the hand wheel in a predetermined direction will either advance the elevator towards the top of the package or retract it back towards the bottom. The personal care product is typically poured into the dispensing package in its liquid or molten state, with the elevator in its lowermost position, whereby upon cooling the personal care product solidifies and takes on the shape of the dispensing package. Thereafter, to dispense the stick form product from the dispensing package one turns the hand wheel thereby rotating the threaded shaft and advancing the elevator towards the top of the dispensing package. As the elevator advances toward the top of the dispensing package, it pushes the stick form product up and out of the top of the dispensing package so the user can have access.

In order to reduce solid waste landfill volume, there is still a desire to develop dispensing packages partially reusable so that the entire package does not have to be thrown away after the initial personal care product is used up. One way to accomplish this is to design a dispensing package that has a reusable dispenser designed to receive a replaceable cartridge containing the personal care product, see for instance U.S. Pat. No. 5,255,990. After the initial personal care product in the dispensing package is used up, the initial replaceable cartridge is discarded and a new a replaceable cartridge is inserted into the reusable dispenser, thereby rendering the dispensing package partially reusable.

The replaceable cartridge disclosed in U.S. Pat. No. 5,255,990 includes a means for releasably securing the replaceable cartridge within the reusable dispenser. The means of the replaceable cartridge comprises a downwardly extending annular collar that is designed to cover the top of the reusable dispenser and skirt over stepped section of the reusable dispenser. To better secure the replaceable cartridge within the reusable dispenser, the collar of the replaceable cartridge is provided with a pair of opposed inwardly extending protrusions that are designed to snap fit over beads of the reusable dispenser. This locks the replaceable cartridge into place. To release the replaceable cartridge from the reusable dispenser, the consumer would squeeze against ends of collar. This would cause protrusions to move outwardly.

Plastic packaging uses nearly 40% of all polymers, a substantial share of which is used for consumer products, such as personal care packages (e.g., antiperspirant, deodorant stick bottles). Most of the materials used to produce polymers for plastic packaging applications, such as polyethylene, polyethylene terephthalate, and polypropylene, are derived from monomers (e.g., ethylene, propylene, terephthalic acid, ethylene glycol), which are obtained from non-renewable, fossil-based resources, such as petroleum, natural gas, and coal. Many consumers display an aversion to purchasing products that are derived from petrochemicals. In some instances, consumers are hesitant to purchase products made from limited non-renewable resources (e.g., petroleum, natural gas and coal). Other consumers may have adverse perceptions about products derived from petrochemicals as being "unnatural" or not environmentally friendly.

However, current dispensing packages still use plastic for all the parts of the dispensing package. There is still a need to reduce the consumption of non-renewable resources.

As the replaceable cartridge is intended to be disposed of or recyclable, there is a need to provide an improved replaceable cartridge as simple as possible that will lead to minimal waste when disposed of.

Also, the reusable dispenser shall be improved such that the replaceable cartridge shall be relatively easier to insert into the reusable dispenser without having to manipulate the replaceable cartridge itself.

There is a need of an improved means for releasably securing the replaceable cartridge within the reusable dispenser without involving the replaceable cartridge itself.

Also, there is a need to ensure the consumer that the replaceable cartridge is well secured in the reusable dispenser.

SUMMARY OF THE INVENTION

A dispensing package 1 for a spreadable personal care product is provided and comprises: a reusable dispenser 3, a replaceable cartridge 8 and optionally a top cap 2; wherein the reusable dispenser 3 comprises: a longitudinal axis L; a tubular body 6 having an open top 61 and an open bottom 62, wherein the tubular body 6 comprises an upper top portion 66 and a lower bottom portion 67, wherein the tubular body 6 has a coupling sleeve 63 disposed inside the lower bottom portion 67 forming a central opening 630 coaxial to the longitudinal axis L; and a telescopic actuator 5 axially oriented within the tubular body 6 and mounted through the open bottom 62 of the tubular body 6 into the coupling sleeve 63; wherein the replaceable cartridge 8 comprises: a tubular chamber 80 for holding the personal care product, wherein the tubular chamber 80 includes an open top 84 and an open bottom 85; wherein the tubular chamber 80 comprises a push plate 86 disposed inside the tubular chamber 80 at or adjacent to the open bottom 85 of the tubular chamber 80; wherein the replaceable cartridge 8 is slidingly mounted through the open top 61 of the tubular body 6; wherein the telescopic actuator 5 is able to engage with the push plate 86 to deliver the personal care product from the open top 84 of the replaceable cartridge 8; and wherein the reusable dispenser 3 comprises a locking ring 7 removably engaged with the tubular body 6 of the reusable dispenser 3 to secure the replaceable cartridge 8 within the tubular body 6 of the reusable dispenser 3.

Alternatively, a dispensing package 1 for a spreadable personal care product is provided and comprises: a reusable dispenser 3 and a replaceable cartridge 8 and optionally a top cap 2; wherein the reusable dispenser 3 comprises: a longitudinal axis L, a tubular body 6 having an open top 61 and an open bottom 62, wherein the tubular body 6 comprises an upper top portion 66 and a lower bottom portion 67, wherein the tubular body 6 has a coupling sleeve 63 disposed inside the lower bottom portion 67 forming a central opening 630 coaxial to the longitudinal axis L; and a telescopic actuator 5 axially oriented within the tubular body 6 and mounted through the open bottom 62 of the tubular body 6 into the coupling sleeve 63; wherein the replaceable cartridge 8 comprises: a tubular chamber 80 for holding the personal care product, wherein the tubular chamber 80 includes an open top 84 and an open bottom 85; wherein the tubular chamber 80 comprises a push plate 86 disposed inside the tubular chamber 80 at or adjacent to the open bottom 85 of the tubular chamber 80; wherein the replaceable cartridge 8 is slidingly mounted through the open top 61 of the tubular body 6; wherein the telescopic actuator 5 is able to engage with the push plate 86 to deliver the personal care product from the open top 84 of the replaceable cartridge 8; wherein the reusable dispenser 3 comprises a locking ring 7 removably engaged with the tubular body 6 of the reusable dispenser 3 to secure the replaceable cartridge 8 within the tubular body 6 of the reusable dispenser 3; wherein the locking ring 7 comprises a first indicia 30A located at an outer surface 78 of the locking ring 7, wherein the tubular body 6 comprises a second indicia 30B located at an outer surface 65 of the tubular body 6, such that the first and second indicia (30A, 30B) together form a final indicia 30 to indicate that the locking ring 7 is locked to the tubular body 6 of the reusable dispenser 3.

A method for dispensing a spreadable personal care product is provided and comprises the following steps in that order:

a) Providing a reusable dispenser 3, wherein the reusable dispenser 3 comprises: a longitudinal axis L, a tubular body 6 having an open top 61 and an open bottom 62, wherein the tubular body 6 comprises an upper top portion 66 and a lower bottom portion 67, wherein the tubular body 6 has a coupling sleeve 63 disposed inside the lower bottom portion 67 forming a central opening 630 coaxial to the longitudinal axis L; and a telescopic actuator 5 axially oriented within the tubular body 6 and mounted through the open bottom 62 of the tubular body 6 into the coupling sleeve 63;

b) Providing a replaceable cartridge 8, wherein the replaceable cartridge 8 comprises a tubular chamber 80, wherein the tubular chamber 80 includes an open top 84 and an open bottom 85; wherein the replaceable cartridge 8 comprises a push plate 86 disposed inside the tubular chamber 80 at or adjacent to the open bottom 85 of the tubular chamber 80;

c) Filling the replaceable cartridge 8 with a spreadable personal care product;

d) Inserting the replaceable cartridge 8 in the reusable dispenser 3 through the open top 61 of the tubular body 6 of the reusable dispenser 3;

e) Securing the replaceable cartridge 8 within the tubular body 6 of the reusable dispenser 3 by removably engaging a locking ring 7 with the tubular body 6 of the reusable dispenser 3; and f) actuating the telescopic actuator 5 to dispense the spreadable personal care product to the consumer by displacing the push plate 86 upwardly in the replaceable cartridge 8 towards the open top 84 of the replaceable cartridge 8.

Alternatively, a method for dispensing a spreadable personal care product comprising the following steps in that order:

a) Providing a reusable dispenser 3, wherein the reusable dispenser 3 comprises: a longitudinal axis L, a tubular body 6 having an open top 61 and an open bottom 62, wherein the tubular body 6 comprises an upper top portion 66 and a lower bottom portion 67, wherein the tubular body 6 has a coupling sleeve 63 disposed inside the lower bottom portion 67 forming a central opening 630 coaxial to the longitudinal axis L; and a telescopic actuator 5 axially oriented within the tubular body 6 and mounted through the open bottom 62 of the tubular body 6 into the coupling sleeve 63;

b) Providing a replaceable cartridge 8, wherein the replaceable cartridge 8 comprises a tubular chamber 80, wherein the tubular chamber 80 includes an open top 84 and an open bottom 85; wherein the replaceable cartridge 8 comprises a push plate 86 disposed inside the tubular chamber 80 at or adjacent to the open bottom 85 of the tubular chamber 80;

c) Filling the replaceable cartridge 8 with a spreadable personal care product;

d) Inserting the replaceable cartridge 8 in the reusable dispenser 3 through the open top 61 of the tubular body 6 of the reusable dispenser 3;

e) Securing the replaceable cartridge 8 within the tubular body 6 of the reusable dispenser 3 by removably engaging a locking ring 7 with the tubular body 6 of the reusable dispenser 3; wherein the locking ring 7 comprises a first indicia 30A located at an outer surface 78 of the locking ring 7, wherein the tubular body 6 comprises a second indicia 30B located at an outer surface 65 of the tubular body 6, such that the first and second indicia (30A, 30B) together form a final indicia 30 to indicate that the locking ring 7 is locked to the tubular body 6 of the reusable dispenser 3; and f) actuating the telescopic actuator 5 to dispense the spreadable personal care product to the consumer by displacing the push plate 86 upwardly in the replaceable cartridge 8 towards the open top 84 of the replaceable cartridge 8.

A method of applying a spreadable personal care product onto the skin of a consumer, such as an antiperspirant or a deodorant product onto the axilla skin of a consumer; optionally in the form of a cream, a gel, a soft-solid or invisible solid, is provided and comprises the use of a dispensing package 1 as set out herein.

A method of manufacturing a dispensing package 1 for a spreadable personal care product is provided and comprises bringing together a reusable dispenser 3, a replaceable cartridge 8, a locking ring 7 and optionally a top cap 2; wherein the reusable dispenser 3 comprises: a longitudinal axis L; a tubular body 6 having an open top 61 and an open bottom 62, wherein the tubular body 6 comprises an upper top portion 66 and a lower bottom portion 67, wherein the tubular body 6 has a coupling sleeve 63 disposed inside the lower bottom portion 67 forming a central opening 630 coaxial to the longitudinal axis L; and a telescopic actuator 5 axially oriented within the tubular body 6 and mounted through the open bottom 62 of the tubular body 6 into the coupling sleeve 63; wherein the replaceable cartridge 8 comprises: a tubular chamber 80 for holding the personal care product, wherein the tubular chamber 80 includes an open top 84 and an open bottom 85; wherein the tubular chamber 80 comprises a push plate 86 disposed inside the tubular chamber 80 at or adjacent to the open bottom 85 of the tubular chamber 80; wherein the replaceable cartridge 8 is slidingly mounted through the open top 61 of the tubular body 6; and wherein the reusable dispenser 3 comprises a locking ring 7 removably engaged with the tubular body 6 of the reusable dispenser 3 to secure the replaceable cartridge 8 within the tubular body 6 of the reusable dispenser 3.

BRIEF DESCRIPTION OF THE DRAWINGS

While the specification concludes with claims particularly pointing out and distinctly claiming the present invention, it is believed that the same will be better understood from the following description read in conjunction with the accompanying drawings in which:

DETAILED DESCRIPTION OF THE INVENTION

Definitions of Terms

Figure 1:
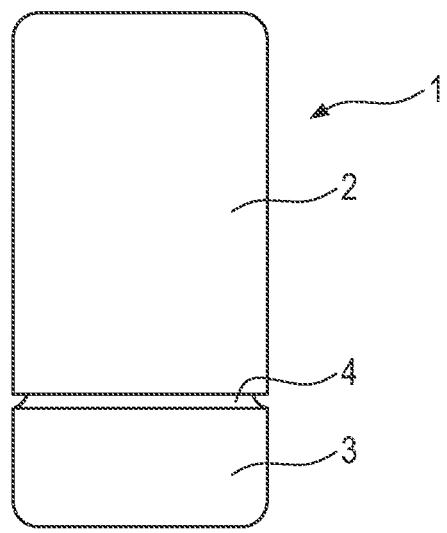
FIG. 1 provides a front view of a dispensing package for a spreadable personal care product shown and described herein in a closed position.

In this document, including in all embodiments of all aspects of the present invention, the following definitions apply unless specifically stated otherwise.

The terms "comprise", "comprising", and "comprises" as used herein are open ended terms, each specifying the presence of what follows, e.g., a component, but not precluding the presence of other features, e.g., elements, steps or components known in the art, or disclosed herein.

The term "personal care product" as used herein refers to compositions intended for topical application to the skin, including but not limited to, creams, gels, solid sticks, and soft-solid sticks. For example, the personal care product may be a composition such as a soft-solid deodorant, soft-solid antiperspirant, an invisible solid deodorant, an invisible solid antiperspirant, a fluid antiperspirant, a body powder, or foot powder; or a shave care product.

The term "invisible solid" as used herein refers to a product having a product hardness of least 600 gram-force, more specifically from 600 gram-force to 5 000 gram-force.

The term "product hardness" as used herein is a reflection of how much force is required to move a penetration cone to a specified distance and at a controlled rate into a composition under the test conditions described hereinafter. Higher values represent harder product, and lower values represent softer product. These values are measured at 27° C., 15% relative humidity, using a TA-XT2 Texture Analyzer, available from Texture Technology Corp., Scarsdale, N.Y., U.S.A. The product hardness value as used herein represents the peak force required to move a standard 45-degree angle penetration cone through the composition for a distance of 10 mm at a speed of 2 mm/second. The standard cone is available from Texture Technology Corp., as part number TA-15, and has a total cone length of 24.7 mm, angled cone length of 18.3 mm, and a maximum diameter of the angled surface of the cone of 15.5 mm. The cone is a smooth, stainless steel construction and weighs 17.8 grams.

The term "soft solid" as used herein refers to a compositional form which is viscoelastic, like a dough or a paste, and generally remains together as a single piece during use. "Soft solid" also refers to a composition with a static yield stress of 200 Pa to 1 500 Pa after dispensing.

The term "static yield stress" as used herein refers to the minimum amount of stress (dyne/cm$^2$) that must be applied to the composition to move the upper plate of the Rheometrics Dynamic Stress Rheometer a distance of 4.2 micro radians, in accordance with the analysis method described hereinafter. In other words, static yield stress represents the point in a stress sweep analysis of a product at which point the rheometer is first capable of measuring product viscosity. To determine the static stress yield values for a composition, the composition is analyzed using a Rheometrics Dynamic Stress Rheometer (available from Rheometrics Inc., Piscataway, N.J., U.S.A.) with data collection and analysis performed using Rhios software 4.2.2 (also available from Rheometrics Inc., Piscataway, N.J., U.S.A.). The rheometer is configured in a parallel plate design using a 25 mm upper plate (available as part number LS-PELT-1P25 from Rheometrics Inc., Piscatawany, N.J., U.S.A.). Temperature control is set at 37° C. Analysis of the composition is performed in the "Stress Sweep: steady sweep" default test mode. Rheometer settings are initial stress (1.0 dyne/cm$^2$), final stress (63 930 dyne/cm$^2$), stress increment (100 dyne/cm$^2$), and maximum time per data point (5 seconds).

The term "antiperspirant product" as used herein means a cosmetic composition applied topically at the underarm skin for providing dryness feel and appearance benefits across the day. The cosmetic composition is able to control dryness within the axilla across the day, e.g. forming a very efficient spreading, wetting, sealing and adsorbing and/or absorbing film onto the axillary (underarm) skin surface. The cosmetic composition when forming a film may have adhesive properties that are resilient to subsequent emerging sweat and transepidermal water bond-breaking and solubilizing properties. Alternatively, the term "antiperspirant product" as used herein includes any compound, composition or other material having antiperspirant activity. For instance, an antiperspirant active, such as an aluminum salt, can react with the electrolytes in perspiration to form a plug in the ducts of sweat glands. The plugs prevent perspiration from exiting the duct, thereby depriving the bacteria of water and a food source. Antiperspirant compositions may be applied to the skin in a contact type antiperspirant product form, e.g., a stick or roll-on.

The term "deodorant product" as used herein means a cosmetic composition applied topically at the underarm skin for minimizing malodors or unpleasant odors caused by the interaction of sebum, perspiration and bacteria on the underarm skin.

The terms "include," "includes," and "including," as used herein are meant to be non-limiting.

Where amount ranges are given, these are to be understood as being the total amount of said ingredient in the composition or the product, or where more than one species fall within the scope of the ingredient definition, the total amount of all ingredients fitting that definition, in the composition or the product or the package component.

The amount of each particular ingredient or mixtures thereof described hereinafter can account for up to 100% (or 100%) of the total amount of the ingredient(s) in the composition.

The term "anhydrous" as used herein means that the cosmetic composition is preferably substantially or completely free of separately added water (i.e., anhydrous).

The term "structurant" as used herein means any material known or otherwise effective in providing suspending, gelling, viscosifying, solidifying, and/or thickening properties to the composition or which otherwise provide structure to the final product form.

The term "indicia" as used herein can be any type of lines, patterns, ornamental designs, symbols, script, color codes, or other markings which have the capability, either inherently or with additional denotation, to aid an individual securing the replaceable cartridge within the reusable dispenser by indicating the locking ring is locked to the tubular body of the reusable dispenser.

The term "topical application", as used herein, means to apply or spread the personal care product onto the surface of the skin, body skin, facial skin, or underarm axilla skin.

The term "free of" as used herein means that a specific component of the dispensing package, e.g., the replaceable cartridge comprises 0% of an ingredient by total weight of specific component of the dispensing package, e.g. the replaceable cartridge, thus no detectable amount of the stated ingredient.

The term "substantially free of" as used herein means less than 1%, less than 0.8%, less than 0.5%, less than 0.3%, or less than an immaterial amount of a stated ingredient by total weight of the specific component of the dispensing package, e.g. the replaceable cartridge.

The term "slidingly mounted" as used herein means that the replaceable cartridge is inserted through the open top of the tubular body.

Herein, the longitudinal axis of the reusable dispenser, the replaceable cartridge and the telescopic actuator are coaxial with the longitudinal axis of the dispensing package. Any longitudinal axis herein is referenced with the letter "L".

The objects of the present invention are to provide dispensing packages for a spreadable personal care product, replaceable cartridges and reusable dispensers and methods for dispensing a spreadable personal care product as described in the Summary or as described hereinbelow for fulfilling the technical effects or goals as set out herein. These objects and other advantages as may be apparent to those skilled in the art can be achieved through the present invention, which is described in the above Summary of the Invention and Detailed Description of the invention and which is defined in the claims which follow.

Dispensing Package

A dispensing package 1 for a spreadable personal care product is provided and comprises: a reusable dispenser 3, a replaceable cartridge 8 and optionally a top cap 2.

The reusable dispenser 3 comprises a longitudinal axis L; a tubular body 6 having an open top 61 and an open bottom 62. The tubular body 6 comprises an upper top portion 66 and a lower bottom portion 67. The tubular body 6 has a coupling sleeve 63 disposed inside the lower bottom portion 67 forming a central opening 630 coaxial to the longitudinal axis L of the reusable dispenser 3.

The reusable dispenser 3 also comprises a telescopic actuator 5 axially oriented within the tubular body 6 and mounted through the open bottom 62 of the tubular body 6 into the coupling sleeve 63.

The replaceable cartridge 8 comprises a tubular chamber 80 for holding the spreadable personal care product. The tubular chamber 80 includes an open top 84 and an open bottom 85. The tubular chamber 80 comprises a push plate 86 disposed inside the tubular chamber 80 at or adjacent to the open bottom 85 of the tubular chamber 80. The replaceable cartridge 8 is slidingly mounted through the open top 61 of the tubular body 6.

As explained more in detail hereinafter, the telescopic actuator 5 is able to engage with the push plate 86 to deliver the spreadable personal care product from the open top 84 of the replaceable cartridge 8.

The reusable dispenser 3 comprises a locking ring 7 removably engaged with the tubular body 6 of the reusable dispenser 3 to secure the replaceable cartridge 8 within the tubular body 6 of the reusable dispenser 3.

Alternatively, the reusable dispenser 3 comprises a locking ring 7 removably engaged with the tubular body 6 of the reusable dispenser 3 to secure the replaceable cartridge 8 within the tubular body 6 of the reusable dispenser 3. Furthermore, the locking ring 7 comprises a first indicia 30A located at an outer surface 78 of the locking ring 7. The tubular body 6 comprises a second indicia 30B located at an outer surface 65 of the tubular body 6. The first and second indicia (30A, 30B) together form a final indicia 30 to indicate that the locking ring 7 is locked to the tubular body 6 of the reusable dispenser 3.

The different components of the dispensing package will be described more in details hereinafter.

FIG. 1 provides a front view of a dispensing package for a spreadable personal care product shown and described herein in a closed position. A dispensing package 1 for a spreadable personal care product is shown and comprises a top cap 2, a reusable dispenser 3 and a collar 4.

Figure 2:
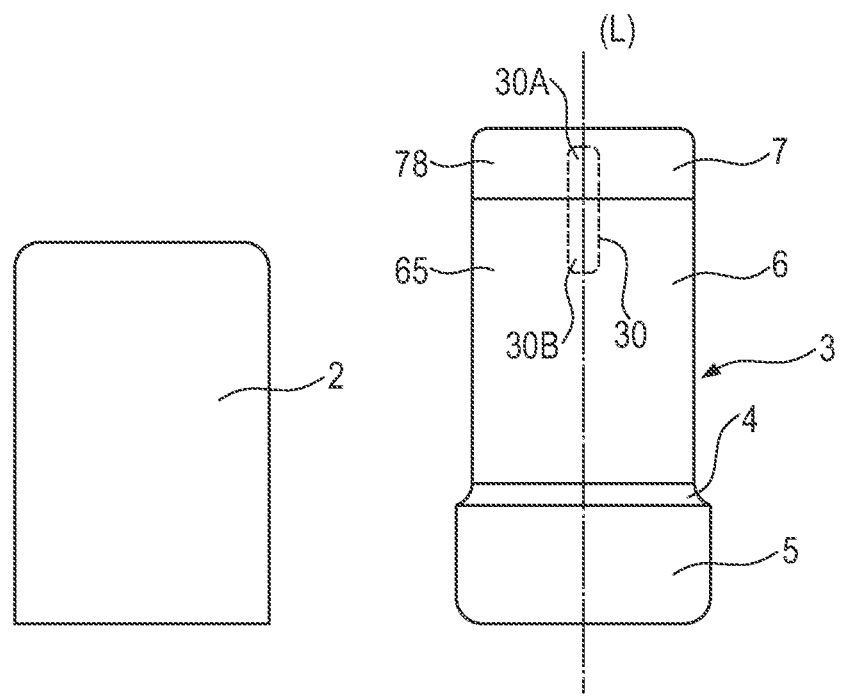
FIG. 2 provides a front view of a dispensing package for a spreadable personal care product shown and described herein in an open position.

FIG. 2 provides a front view of a dispensing package for a spreadable personal care product shown and described herein in an open position. A dispensing package 1 for a spreadable personal care product is shown and comprises a top cap 2, a reusable dispenser 3 comprising a tubular body 6, a telescopic actuator 5 and a collar 4 positioned between the tubular body 6 and the telescopic actuator 5. The reusable dispenser 3 also comprises a locking ring 7 removably engaged with the tubular body 6 of the reusable dispenser 3.

The reusable dispenser 3 comprising the tubular body 6, the telescopic actuator 5 and the locking ring 7 is designed to be durable and reusable. The replaceable cartridge 8 is designed to be disposable and non-durable or recyclable.

A dispensing package 1 for a spreadable personal care product comprises: a reusable dispenser 3 and a replaceable cartridge 8.

Reusable Dispenser

The reusable dispenser 3 comprises a longitudinal axis L; a tubular body 6 and a telescopic actuator 5. Optionally, the reusable dispenser 3 may also include a collar 4, wherein the collar 4 is positioned between the tubular body 6 and the telescopic actuator 5 of the reusable dispenser 3. The collar 4 of the reusable dispenser 3 can provide a demarcation between the tubular body 6 and the telescopic actuator 5 of the reusable dispenser 3.

The collar 4 of the reusable dispenser 3 may comprise an engagement member to allow the top cap 2 to snap fit with the collar 4 of the reusable dispenser 3 when the dispensing package is in a closed position. Such engagement member may be one or more male lugs protruding from an inner surface of the top cap 2.

Figure 3:
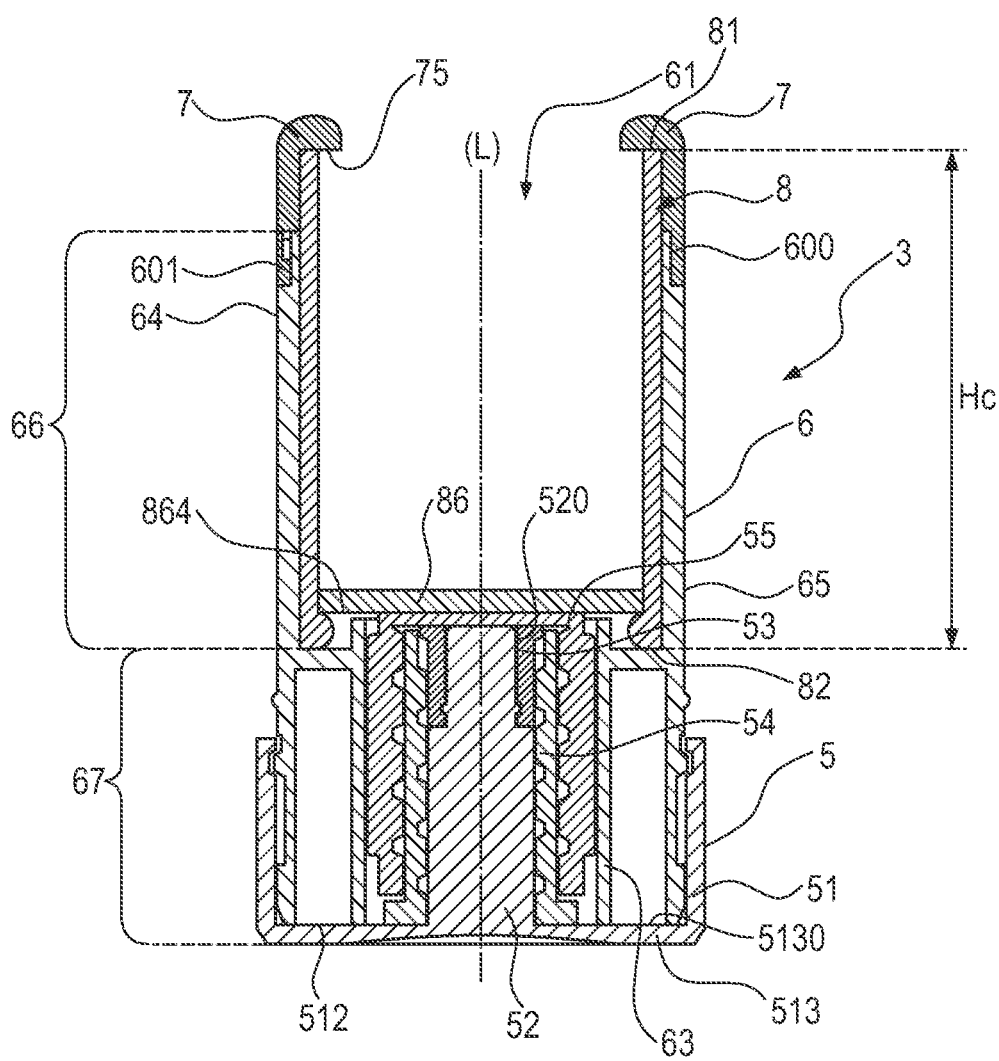
FIG. 3 provides a cross-sectional view of a reusable dispenser in an open position according to one or more aspects.
Figure 4:
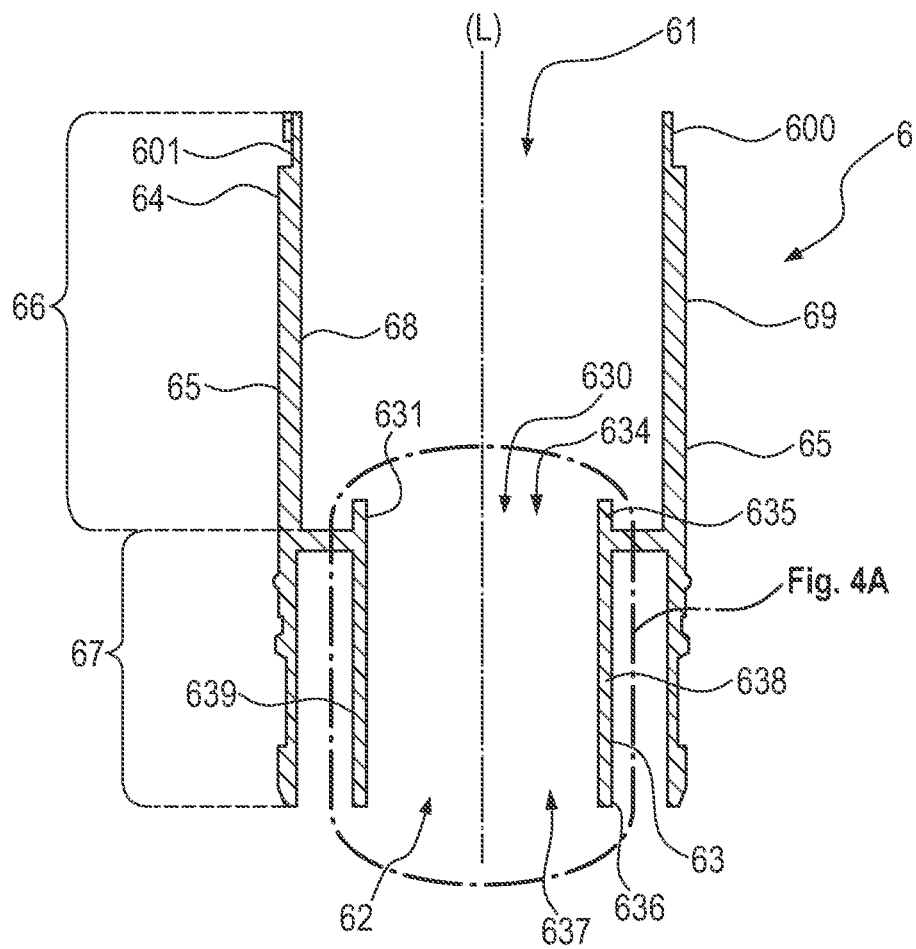
FIG. 4 provides a cross-sectional view of a tubular body of the reusable dispenser according to one or more aspects.

The reusable dispenser 3 comprises a longitudinal axis L, a tubular body 6 and a telescopic actuator 5; and a locking ring 7 securing a replaceable cartridge 8 in place within the tubular body 6, as shown for instance in FIG. 3. FIG. 3 provides a cross-sectional view of a reusable dispenser according to one or more aspects. FIG. 4 provides a cross-sectional view of a tubular body of the reusable dispenser according to one or more aspects.

The tubular body 6 of the reusable dispenser 3 has an open top 61 and an open bottom 62. The tubular body 6 of the reusable dispenser 3 has a side wall 69 having an outer surface 65 and inner surface 68. The tubular body 6 of the reusable dispenser 3 comprises an upper top portion 66 and a lower bottom portion 67. The tubular body 6 of the reusable dispenser 3 has a coupling sleeve 63 disposed inside the lower bottom portion 67 forming a central opening 630 coaxial to the longitudinal axis L.

The tubular body 6 of the reusable dispenser 3 is not limited to a cylindrical tube per se. The tubular body 6 of the reusable dispenser 3 may have any suitable outer shape, including, e.g., a generally cylindrical shape, a generally conical shape, a generally elliptical shape, or any combination thereof. As used herein, the terms "generally cylindrical", "generally conical" and "generally elliptical" describe shapes strictly cylindrical, conical and elliptical and those deviating from strictly cylindrical, conical and elliptical shapes. Examples of such "generally cylindrical" and "generally conical" or "generally elliptical" tubular body 6 of the reusable dispenser 3 may include, without limitation, the tubular body 6 having a cross-sectional shape deviating from circular by being elongated in a direction transverse to the longitudinal axis L of the reusable dispenser 3, e.g., elliptical, oval, and the like. The tubular body 6 of the reusable dispenser 3 may have other suitable shapes as well, e.g., polygonal, rectangular prism, cuboid, and so on or a combination of generally cylindrical/conical and polygonal shapes.

Thus, the tubular body 6 shall not be restricted to a cylindrical body. The tubular body 6 of the reusable dispenser 3 has an outer shape defined by the outer surface 65 of the tubular body 6. The tubular body 6 of the reusable dispenser 3 has an inner shape defined by the inner surface 68 of the reusable dispenser 3. The outer shape of the tubular body 6 of the reusable dispenser 3 is not limited to any cylindrical outer shape. The tubular body 6 of the reusable dispenser 3 may have an outer shape selected from the group consisting of oval, elliptical, cylindrical, polygonal shape and combinations thereof. However, the tubular body 6 of the reusable dispenser 3 has an inner shape defined by the inner surface 68 of the reusable dispenser 3, wherein the inner shape of the tubular body 6 of the reusable dispenser 3 is cylindrical.

The coupling sleeve 63 of the tubular body 6 of the reusable dispenser 3 may have a side wall 638 having an inner surface 631 and an outer surface 639. The coupling sleeve 63 of the tubular body 6 has an inner shape defined by the inner surface 631 of the coupling sleeve 63, wherein the inner shape of the coupling sleeve 63 of the tubular body 6 is cylindrical.

The coupling sleeve 63 of the tubular body 6 may be attached to the inner surface 68 of the tubular body 6 of the reusable dispenser 3, as shown for instance in FIG. 4.

Alternatively, the coupling sleeve 63 of the tubular body 6 may be integrally formed with the inner surface 68 of the tubular body 6 of the reusable dispenser 3. In that case, the coupling sleeve 63 of the tubular body 6 protrudes from the inner surface 68 of the tubular body 6 of the reusable dispenser 3.

Figure 4A:
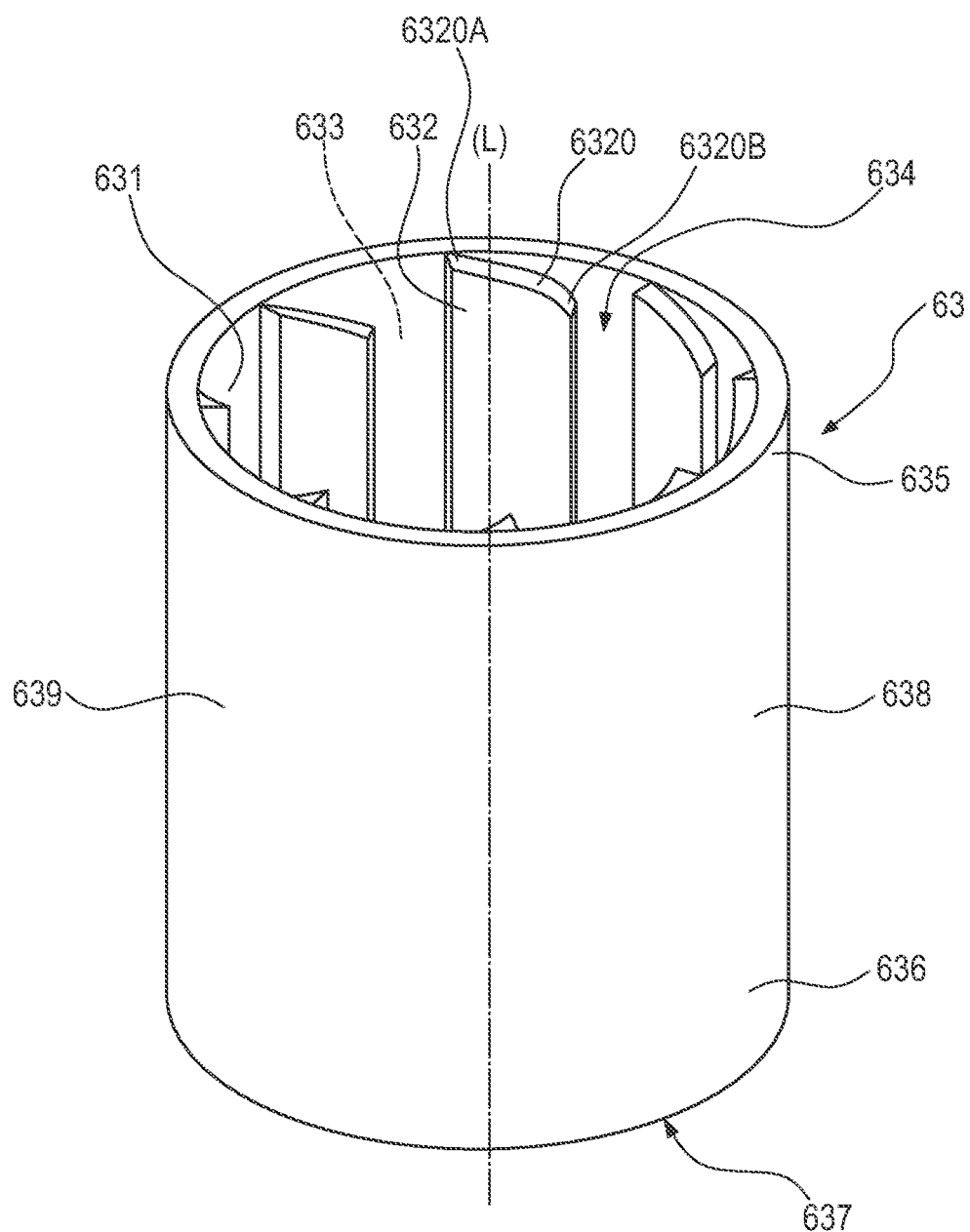
FIG. 4A provides an enlarged view of an area of FIG. 4 including a coupling sleeve of a tubular body, according to one or more aspects.

FIG. 4A provides an enlarged view of FIG. 4 showing a coupling sleeve 63. The coupling sleeve 63 will be further described below when describing the telescopic actuator 5.

Figure 5:
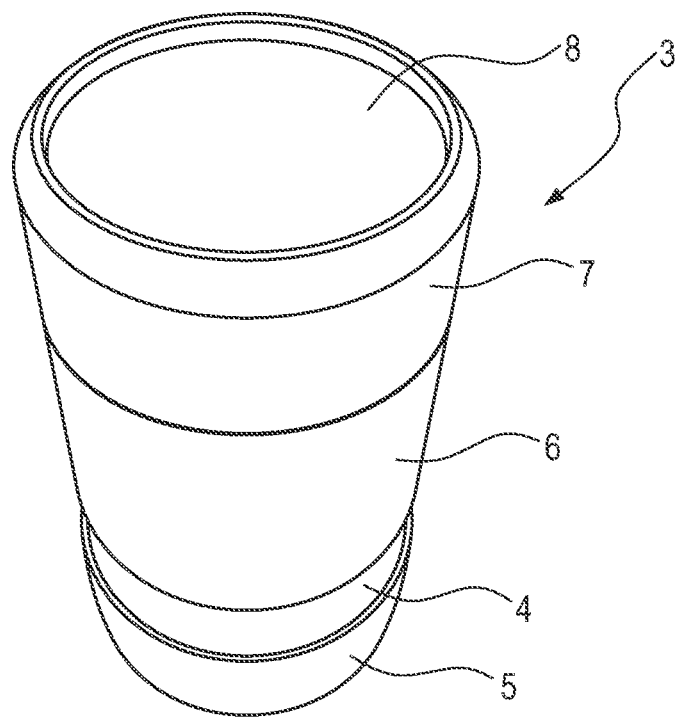
FIG. 5 provides a front perspective view of a reusable dispenser having cylindrical inner and outer shapes.
Figure 6:
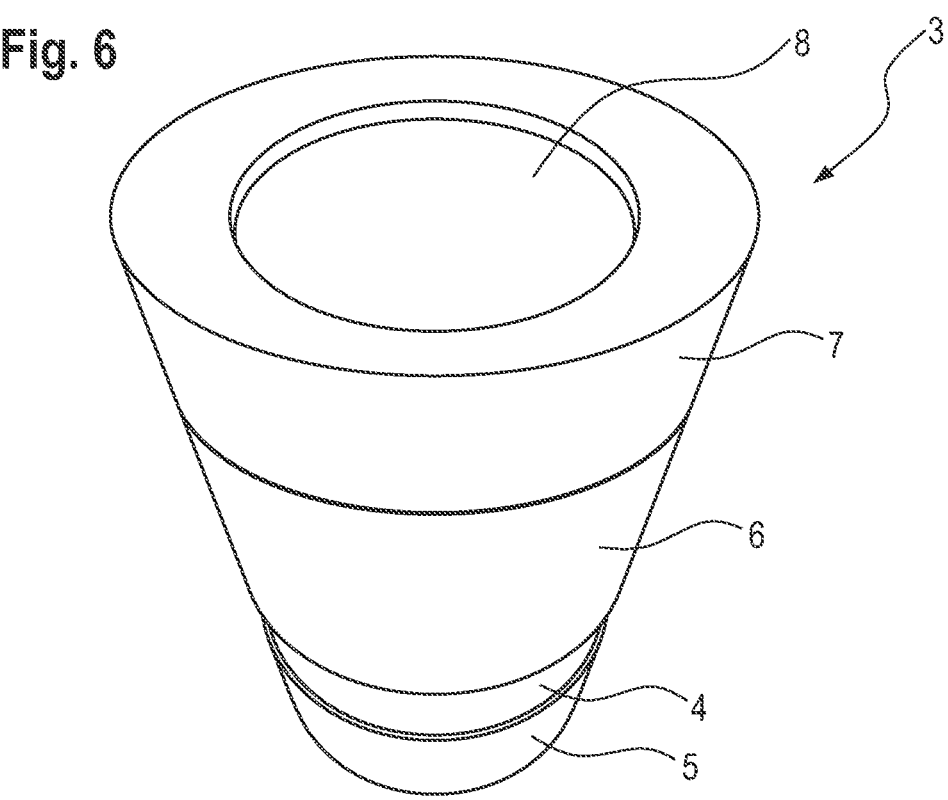
FIG. 6 provides a front perspective view of a reusable dispenser having a cylindrical inner shape but an oval outer shape.

FIG. 5 provides an example of a front perspective view showing an example of a reusable dispenser having cylindrical inner and outer shapes. FIG. 6 provides an example of a front perspective view showing another example of a reusable dispenser having a cylindrical inner shape but a non-cylindrical, namely oval outer shape.

The reusable dispenser 3 also comprises a telescopic actuator 5 axially oriented within the tubular body 6 and mounted through the open bottom 62 of the tubular body 6 into the coupling sleeve 63. The different types of telescopic actuators 5 that allow delivering the spreadable personal care product from an open top 84 of the replaceable cartridge 8 will be described in more details hereinafter.

Replaceable Cartridge

The replaceable cartridge 8 comprises a tubular chamber 80 for holding the spreadable personal care product. The replaceable cartridge 8 comprises a tubular chamber 80 that at least partially surrounds and supports a spreadable personal care product. The tubular chamber 80 includes an open top 84 and an open bottom 85. The replaceable cartridge 8 comprises an upper end 81 at the open top 84 of the replaceable cartridge 8 and a lower end 82 at the open bottom 85 of the replaceable cartridge 8, the lower end 82 being opposed to the upper end 81 of the replaceable cartridge 8. The tubular chamber 80 of the replaceable cartridge 8 comprises a side wall 83 having an inner surface 87 and an outer surface 88.

The tubular chamber 80 of the replaceable cartridge 8 may comprise an internal space which is defined by the inner surface 87 of the side wall 83 of the tubular chamber 80 of the replaceable cartridge 8, the upper end 81 and the lower end 82 of the replaceable cartridge 8.

The spreadable personal care product may be in the form of a solid, a semi-solid, liquid, gel, cream or the like. The spreadable personal care product may be held within the surrounding walls, particularly the inner surface 87 of the tubular chamber 80 of the replaceable cartridge 8. The spreadable personal care product may be dispensed from the open top 84 located at the upper end 81 of tubular chamber 80 of the replaceable cartridge 8.

The tubular chamber 80 comprises a push plate 86 disposed inside the tubular chamber 80 at or adjacent to the open bottom 85 of the tubular chamber 80. The push plate 86 of the replaceable cartridge 8 comprises a top surface 860 and a bottom surface 864.

The push plate 86 can move from the open bottom 85 of the tubular chamber 80 to the open top 84 of the tubular chamber 80 of the replaceable cartridge 8. Hence, the personal care product can move up and outward when the push plate 86 of the replaceable cartridge advances in a linear displacement in a direction parallel along the longitudinal axis L towards the open top 84 of the replaceable cartridge 8. The longitudinal axis L of the replaceable cartridge 8 is coaxial with the longitudinal axis L of the reusable dispenser 3.

Figure 7:
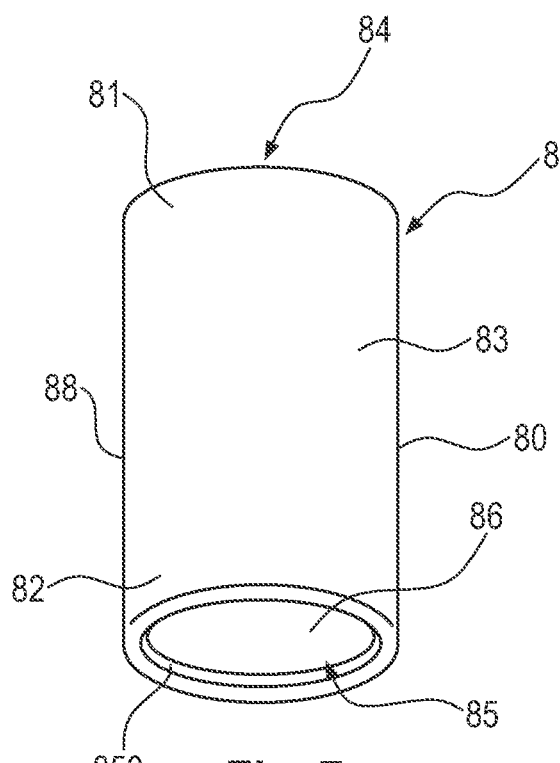
FIG. 7 provides a schematic perspective view of a replaceable cartridge according to one or more aspects.
Figure 8:
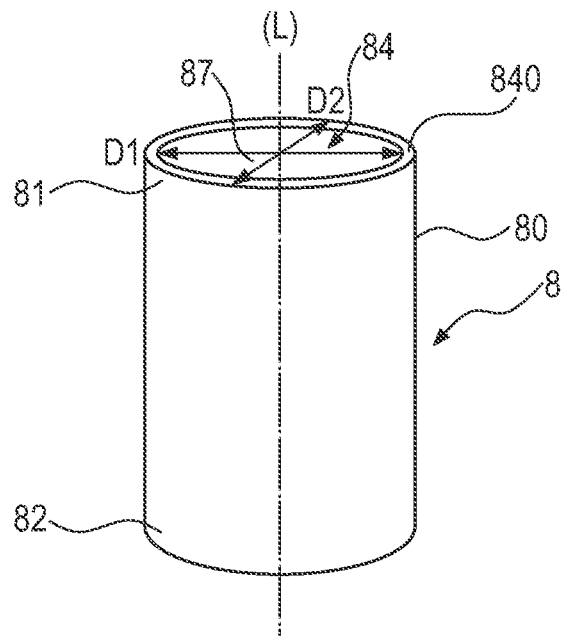
FIG. 8 provides a front perspective view of a replaceable cartridge according to one or more aspects.

FIGS. 7 and 8 provide perspective views of an example of a replaceable cartridge 8.

The replaceable cartridge 8 is slidingly mounted through the open top 61 of the tubular body 6 of the reusable dispenser 3.

The tubular chamber 80 of the replaceable cartridge 8 is also not limited to a cylindrical chamber. The tubular chamber 80 of the replaceable cartridge 8 has an outer shape defined by the outer surface 88 of the replaceable cartridge 8. The tubular chamber 80 of the replaceable cartridge 8 has an inner shape defined by the inner surface 87 of the replaceable cartridge 8. Examples of such "generally cylindrical" and "generally conical" or "generally elliptical" tubular chamber 80 of the replaceable cartridge 8 may include, without limitation, the tubular chamber 80 of the replaceable cartridge 8 having a cross-sectional shape deviating from circular by being elongated in a direction transverse to the longitudinal axis L of the replaceable cartridge 8, e.g., elliptical, oval, and the like. The tubular chamber 80 of the replaceable cartridge 8 may have other suitable shapes as well, e.g., polygonal, rectangular prism, cuboid, and so on or a combination of generally cylindrical/conical and polygonal shapes.

The outer shape of the tubular chamber 80 of the replaceable cartridge 8 is not limited to any cylindrical outer shape. The tubular chamber 80 of the replaceable cartridge 8 may have an outer shape selected from the group consisting of oval, elliptic, cylindrical, polygonal shape, and combinations thereof. However, the tubular chamber 80 of the replaceable cartridge 8 has an inner shape defined by the inner surface 87 of the replaceable cartridge 8, wherein the inner shape of the tubular chamber 80 of the replaceable cartridge 8 is cylindrical. It follows that the push plate 86 of the replaceable cartridge 8 comprises a cylindrical outer shape. The top and bottom surfaces (860, 864) of the push plate 86 have a disc shape.

The replaceable cartridge 8 may be disposable and recyclable. The replaceable cartridge 8 may be made of a sustainable material selected from the group consisting of a recycled material and a renewable material.

Examples of renewable materials include bio-polyethylene, bio-polyethylene terephthalate, and bio-polypropylene. As used herein and unless otherwise noted, "polyethylene" encompasses high density polyethylene (HDPE), low density polyethylene (LDPE), linear low density polyethylene (LLDPE), and ultra-low density polyethylene (ULDPE). As used herein and unless otherwise noted, "polypropylene" encompasses homopolymer polypropylene, random copolymer polypropylene, and block copolymer polypropylene.

As used herein, "recycled" materials encompass post-consumer recycled (PCR) materials, post-industrial recycled (PIR) materials, and a mixture thereof. The replaceable cartridge 8 may be composed of recycled high density polyethylene, recycled polyethylene terephthalate, recycled polypropylene, recycled LLDPE, or recycled LDPE. In one example, the cartridge 8 may be composed of recycled high density polyethylene, recycled polyethylene terephthalate, or recycled polypropylene. In another example, the cartridge 8 may be composed of recycled high density polyethylene or recycled polyethylene terephthalate.

The sustainable material may contain one or more bio-derived polymers or plastics selected from the group consisting of bio-derived polyethylene, bioderived high-density polyethylene, bio-derived polypropylene, bio-derived polyethylene terephthalate, and mixtures thereof, see for instance CA2762589A1, which is incorporated herein by reference.

However, the replaceable cartridge 8 may be substantially free, preferably free of a plastic polymeric material selected from the group consisting of polyethylene, polypropylene, polyethylene terephthalate, polyester, polyamide, polystyrene, polyvinyl chloride, and mixtures thereof.

The replaceable cartridge 8 may be made of a material selected from the group consisting of paper, corrugated paperboard, cardboard, cork and mixtures thereof.

The replaceable cartridge 8 may be made of cellulosic fiber which are natural fibers such as typically wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web.

The replaceable cartridge 8 may be made from a molded paper web into a tubular shape. For instance, a paper web may be made by a process comprising the steps of forming an aqueous papermaking furnish, depositing this furnish on a foraminous surface, such as a Fourdrinier wire, and removing the water from the furnish as by gravity or vacuum-assisted drainage, with or without pressing, and by evaporation, comprising the final steps of adhering the sheet in a semi-dry condition to the surface of a Yankee dryer, completing the water removal by evaporation to an essentially dry condition, removal of the web from the Yankee dryer by means of a flexible creping blade, and winding the resultant sheet onto a reel.

Alternatively or also, the replaceable cartridge 8 may be typically provided as a spiral wound tube. Spiral wound tubes are well known. Web materials such as tissue paper, hard grades of paper and the like are provided to consumers wound on spiral wrapped paper tubes. Typical spiral wound tubes are comprised of at least two plies of paper web. For instance, an outer ply completely overlaps an inner ply and a layer of binding agent is disposed between the outer and inner plies. These tubes comprise fully overlapped plies and therefore the outer circumferential surface of the tubes is generally smooth.

The replaceable cartridge 8 may be provided in different variants. The upper end 81 of the replaceable cartridge 8 may have a sharped edge 840 and the lower end 82 of the replaceable cartridge 8 may have a rounded edge 850, as shown for instance FIG. 7 and FIG. 8.

In that case, the replaceable cartridge 8 may be made of a spiral wounded tube. The replaceable cartridge 8 may include a first laminate 80A forming an outer part of the tubular chamber 80 and the rounded edge 850 at the open bottom 85 of the replaceable cartridge 8, as shown for instance in FIG. 9.

Figure 11:
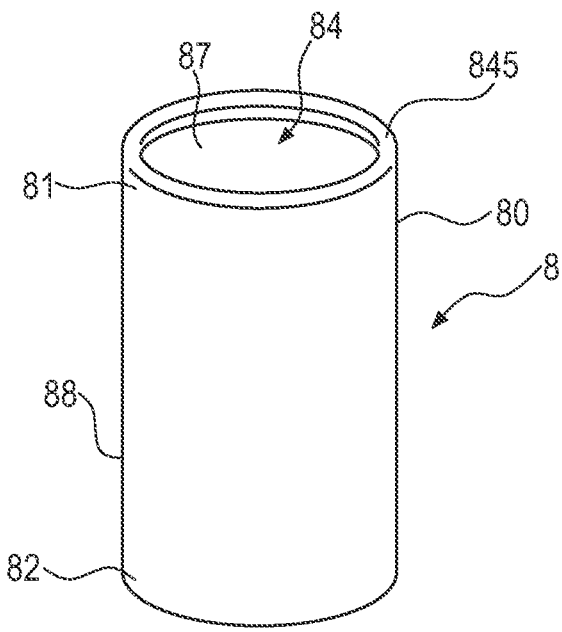
FIG. 11 provides a front perspective view of another replaceable cartridge according to one or more aspects.

Alternatively, the upper end 81 of the replaceable cartridge 8 may have a rounded edge 845 and the lower end 82 of the replaceable cartridge 8 may have a rounded edge 850, as shown for instance in FIG. 11.

For this, the replaceable cartridge 8 may be made of a spiral wounded tube. The replaceable cartridge 8 may include a first laminate 80A forming an inner part of the tubular chamber 80 and the rounded edge 850 at the open bottom 85 of the replaceable cartridge 8. In addition, the replaceable cartridge 8 may comprise a second laminate 80B forming an outer part of the tubular chamber 80 and the rounded edge 845 at the open top 84 of the replaceable cartridge 8, as shown for instance in FIG. 12.

Having a rounded edge 845 at the open top 84 of the replaceable cartridge 8 allows a better application of the spreadable personal care product and prevent any skin irritation that could be due to the use of a relatively sharp edge.

The inner surface 87 of the tubular chamber 80 of the replaceable cartridge 8 may comprise a suitable impermeable and/or anti-adhesive coating. Such impermeable and/or anti-adhesive coating can help for preventing the spreadable personal care product from sticking at the inner surface 87 of the tubular chamber 80. Such anti-adhesive coating may be preferred when the replaceable cartridge 8 is made of paper. Indeed, when the replaceable cartridge 8 is made of paper, the paper material might adhere to the spreadable personal care product because on a micro scale, the spreadable personal care product might penetrate the pores of the paper material.

Hence, having the inner surface 87 of the tubular chamber 80 of the replaceable cartridge 8 having a suitable impermeable and/or anti-adhesive coating, the personal care product can slide readily out from the replaceable cartridge 8, when the push plate 86 moves upwardly towards the open top 84 of the replaceable cartridge 8.

However, the push plate 86 of the replaceable cartridge 8 may not comprise any impermeable and/or anti-adhesive coating. In that case, the personal care product can readily adhere to top surface 860 of the push plate 86 such that the personal care product does not become detached from the push plate 86 when the push plate 86 moves towards the open top 84 of the replaceable cartridge 8. When the push plate 86 has advanced until the open top 84 of the replaceable cartridge 8, only some residual personal care product might still remain onto the top surface 860 of the push plate 86, which is typically observed in the current marketed dispensing packages comprising an elevator platform in engagement with a threaded shaft.

The push plate 86 of the replaceable cartridge 8 may comprise first, second and third layers (861, 862, 863). The first layer 861 of the push plate 86 is positioned towards the open top 84 of the replaceable cartridge 8. The third layer 863 of the push plate 86 is positioned towards the open bottom 85 of the replaceable cartridge 8. The second layer 862 of the push plate 86 is positioned between the first and third layer (861, 863) of the push plate 86.

Figure 10:
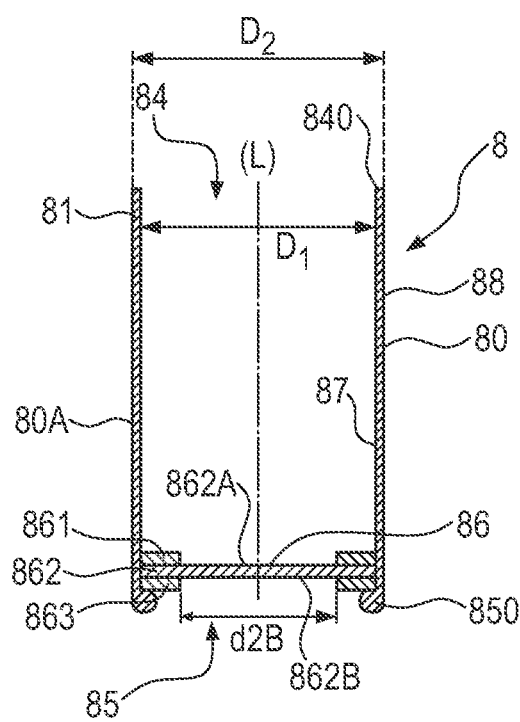
FIG. 10 provides a cross-sectional view of another replaceable cartridge according to one or more aspects.
Figure 12:
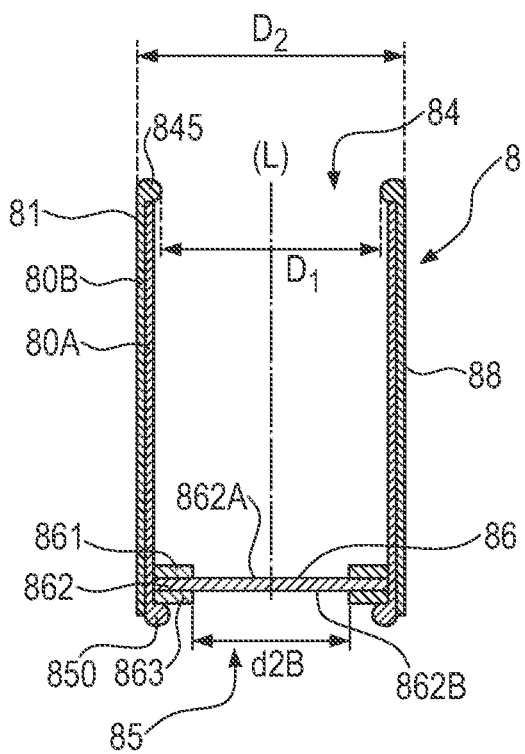
FIG. 12 provides a cross-sectional view of another replaceable cartridge according to one or more aspects.

FIG. 10 provides a cross-sectional view of a replaceable cartridge 8 comprising a push plate 86 including first, second and third layers (861, 862, 863) when the upper end 81 of the replaceable cartridge 8 may have a sharped edge 840. FIG. 12 provides a cross-sectional view of another replaceable cartridge 8 comprising a push plate 86 including first, second and third layers (861, 862, 863) when the upper end 81 of the replaceable cartridge 8 may have a rounded edge 845.

A portion of the first layer 861 of the push plate 86 may been cut out such that the spreadable personal care product can adhere even better with the remaining first layer 861 of the push plate 86 and a top surface 862A of the second layer 862 of the push plate 86. By providing such construction of the push plate 86, the spreadable personal care product can be better stuck to the push plate 86 to be better delivered when the push plate 86 of the replaceable cartridge 8 moves towards the open top 84 of the tubular chamber 80 of the replaceable cartridge 8.

Locking Ring

The reusable dispenser 3 comprises a locking ring 7 removably engaged with the tubular body 6 of the reusable dispenser 3 to secure the replaceable cartridge 8 within the tubular body 6 of the reusable dispenser 3.

The locking ring 7 comprises an upper end 72 at an open top 71, a lower end 74 at an open bottom 73, an inner surface 76 and an outer surface 78. The lower end 74 of the locking ring 7 is opposed to the upper end 72 of the locking ring 7.

The locking ring 7 comprises an inner shape defined by the inner surface 76 of the locking ring 7. The locking ring 7 comprises an outer shape defined by the outer surface 78 of the locking ring 7.

Figure 13:
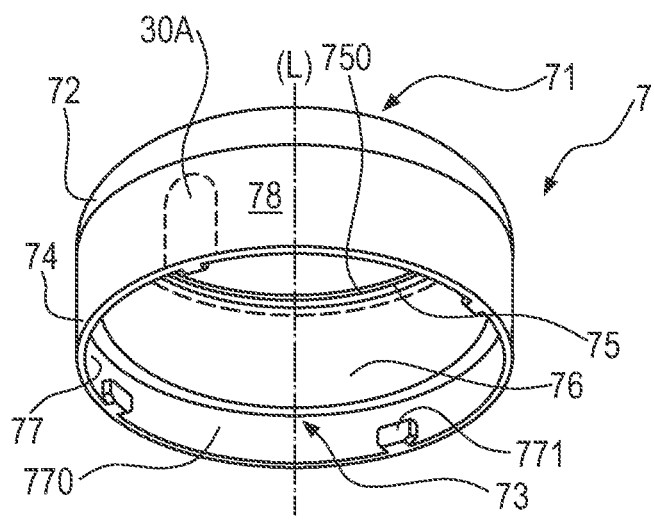
FIG. 13 provides a front perspective view of a locking ring according to one or more aspects.
Figure 16:
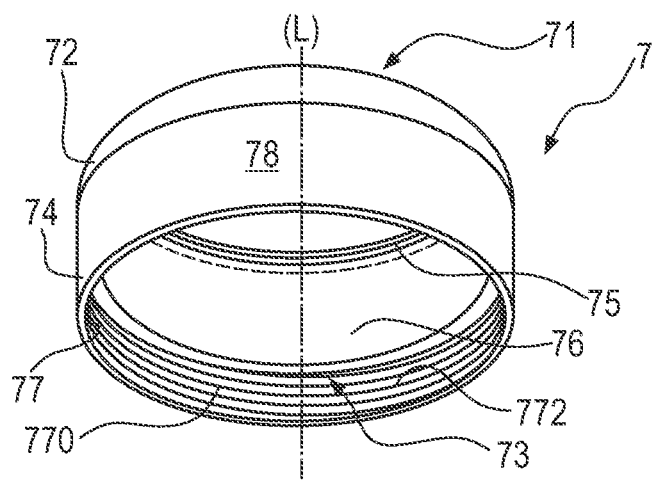
FIG. 16 provides a front perspective view of another locking ring according to one or more aspects.

FIG. 13 and FIG. 16 provide front perspective views of two non-limiting examples of a locking ring 7 within the present disclosure.

The locking ring 7 shall not be limited to a cylindrical ring. The locking ring 7 may have any suitable outer shape, including, e.g., a generally cylindrical shape, a generally conical shape, a generally elliptical shape, or any combination thereof. Examples of such "generally cylindrical" and "generally conical" or "generally elliptical" locking ring 7 may include, without limitation, the locking ring 7 having a cross-sectional shape deviating from circular by being elongated in a direction transverse to the longitudinal axis L of the locking ring 7, e.g., elliptical, oval, and the like. The locking ring 7 may have other suitable shapes as well, e.g., polygonal, rectangular prism, cuboid, and so on or a combination of generally cylindrical/conical and polygonal shapes.

Thus, the outer shape of the locking ring 7 is not limited to any cylindrical outer shape. The locking ring 7 may have an outer shape selected from the group consisting of oval, elliptical, cylindrical, polygonal shape and combinations thereof. However, the locking ring 7 has an inner shape defined by the inner surface 76 of the locking ring 7, wherein the inner shape of the locking ring 7 is cylindrical.

The locking ring 7 may comprise a circumferential edge 75 located at the upper end 72 of the locking ring 7. The circumferential edge 75 protrudes from the inner surface 76 of the locking ring 7.

The locking ring 7 can secure the replaceable cartridge 8 within the tubular body 6 of the reusable dispenser 3 by contacting the inner surface 76 of the locking ring 7 with the outer surface 88 of the replaceable cartridge 8.

Also, the locking ring 7 can secure the replaceable cartridge 8 within the tubular body 6 of the reusable dispenser 3 by abutting the circumferential edge 75 of the locking ring 7 with the upper end 81 of the replaceable cartridge 8, i.e. the sharped edge 840 or the rounded edge 845 at the open top 84 of the replaceable cartridge 8.

The locking ring 7 can secure the replaceable cartridge 8 within the tubular body 6 of the reusable dispenser 3 by abutting a bottom of the circumferential edge 75 of the locking ring 7 with the upper end 81 of the replaceable cartridge 8, i.e. the sharped edge 840 or the rounded edge 845 at the open top 84 of the replaceable cartridge 8.

Hence, the axial movement of the tubular chamber 80 of the replaceable cartridge 8 along the longitudinal axis L is prevented while the push plate 86 is axially displaced during the rotation of the hand wheel 51 of the telescopic actuator 5.

For this, the inner surface 76 of the locking ring 7 may be cylindrical. Also, the circumferential edge 75 of the locking ring 7 may be preferably cylindrical, or, in other words, the circumferential edge 75 of the locking ring 7 may have a circular cross-sectional shape in a transverse direction perpendicular to the longitudinal axis L of the locking ring 7.

Also, the replaceable cartridge 8 may have a height Hc as measured in a direction parallel along the longitudinal axis L from the upper end 81 of the replaceable cartridge 8 to the lower end 82 of the replaceable cartridge 8 (See for instance, FIG. 3). The height Hc of the replaceable cartridge 8 may be equal to an height of an upper portion of the reusable dispenser 3 as measured in a direction parallel along the longitudinal axis L from a bottom of the circumferential edge 75 of the locking ring 7 to a lower end 66A of the upper top portion 66 of the tubular body 6.

In order to confine the replaceable cartridge 8 within the tubular body 6 of the reusable dispenser 3, the dimensions of the tubular chamber 80 of the replaceable cartridge 8 and the locking ring 7 may also be adjusted.

The open top 71 of the locking ring 7 may have an inner diameter d1. The inner diameter d1 may be measured diametrically in a transversal direction perpendicular to a longitudinal axis L of the locking ring 7. The longitudinal axis L of the locking ring 7 is coaxial with the longitudinal axis L of the reusable dispenser 3. The open top 71 of the locking ring 7 may be defined by the circumferential edge 75 of the locking ring 7. The circumferential edge 75 of the locking ring 7 may have an inner surface 750. The inner diameter d1 may be thus measured from two points diametrically opposed on the inner surface 750 of the circumferential edge 75 of the locking ring 7 in a transversal direction perpendicular to the longitudinal axis L of the locking ring 7, as shown for instance in FIG. 14.

The open top 84 of tubular chamber 80 of the replaceable cartridge 8 may have an inner diameter D1 and an outer diameter D2.

When the upper end 81 of the replaceable cartridge 8 has a sharped edge 840, the inner diameter D1 of the open top 84 of the tubular chamber 80 of the replaceable cartridge 8 may be measured from two points diametrically opposed at the inner surface 87 of the tubular chamber 80 in a transversal direction perpendicular to the longitudinal axis L of the replaceable cartridge 8, as shown for instance in FIGS. 8 and 10.

When the upper end 81 of the replaceable cartridge 8 has a sharped edge 840, the outer diameter D2 of the open top 84 of the tubular chamber 80 of the replaceable cartridge 8 may be measured from two points diametrically opposed at the outer surface 88 of the tubular chamber 80 in a transversal direction perpendicular to the longitudinal axis L of the replaceable cartridge 8, as shown for instance in FIGS. 8 and 10.

When the upper end 81 of the replaceable cartridge 8 has a rounded edge 845, the outer diameter D2 of the open top 84 of the tubular chamber 80 of the replaceable cartridge 8 may be measured from two points diametrically opposed and each point being located on respective tangents of the rounded edge 845 of the upper end 81 of the replaceable cartridge 8. Each tangent meets the outer surface 88 of the replaceable cartridge 8 at the rounded edge 845 of the replaceable cartridge 8. Each tangent is also parallel to the longitudinal axis L of the replaceable cartridge 8. The outer diameter D2 of the open top 84 of the tubular chamber 80 of the replaceable cartridge 8 may be measured from two points diametrically opposed and each point being located on the respective tangent in a transversal direction perpendicular to the longitudinal axis L of the replaceable cartridge 8, as shown in FIG. 12.

When the upper end 81 of the replaceable cartridge 8 has a rounded edge 845, the inner diameter D1 of the open top 84 of the tubular chamber 80 of the replaceable cartridge 8 may be measured from two points diametrically opposed and each point being located on respective tangents of the rounded edge 845 of the upper end 81 of the replaceable cartridge 8. Each tangent is located inside the tubular chamber 80 of the replaceable cartridge 8 at the rounded edge 845 of the replaceable cartridge 8. Each tangent is also parallel to the longitudinal axis L of the replaceable cartridge 8. The outer diameter D2 of the open top 84 of the tubular chamber 80 of the replaceable cartridge 8 may be measured from two points diametrically opposed and each point being located on the respective tangent in a transversal direction perpendicular to the longitudinal axis L of the replaceable cartridge 8, as shown in FIG. 12.

In order to confine the replaceable cartridge 8 within the tubular body 6 of the reusable dispenser 3, the inner diameter d1 of the open top 71 of the locking ring 7 may be smaller than the outer diameter D2 of the open top 84 of the replaceable cartridge 8. Also, the inner diameter d1 of the open top 71 of the locking ring 7 may be greater than the inner diameter D1 of the open top 84 of the replaceable cartridge 8.

Alternatively, the inner diameter d1 of the open top 71 of the locking ring 7 may be smaller than the outer diameter D2 of the open top 84 of the replaceable cartridge 8. Also, the inner diameter d1 of the open top 71 of the locking ring 7 may be smaller than the inner diameter D1 of the open top 84 of the replaceable cartridge 8, in order to control the opening of the locking ring 7 to control the topical application of the personal care product. The locking ring 7 may for instance, have an apertured dome shape to assist the topical application of the personal care product to the skin. The size of the aperture of the apertured dome shape may be thus controlled by the inner diameter d1 of the open top 71 of the locking ring 7.

The locking ring 7 can be removably engaged with the tubular body 6 of the reusable dispenser 3 to secure the replaceable cartridge 8 within the tubular body 6 of the reusable dispenser 3 in different ways.

The locking ring 7 may comprise an annular groove 77 located at or adjacent to the open bottom 73 of the locking ring 7 or the lower end 74 of the locking ring 7. The annular groove 77 of the locking ring 7 can be defined as a recess of the inner surface 76 of the locking ring 7 at or adjacent to the open bottom 73 of the locking ring 7; or at or adjacent to the lower end 74 of the locking ring 7.

Figure 14:
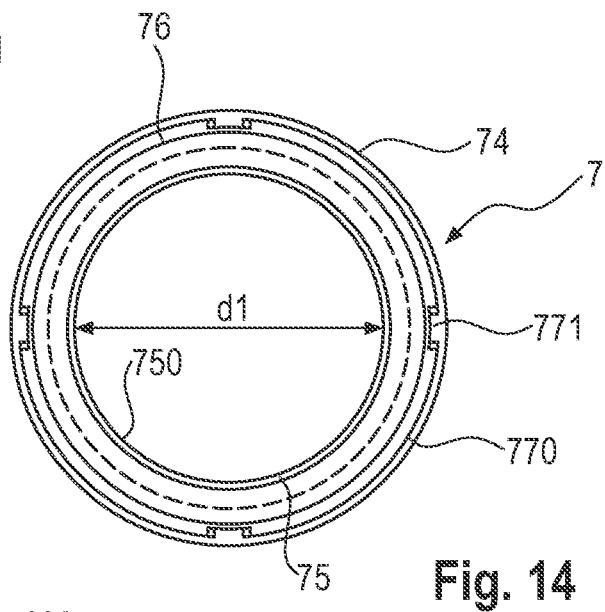
FIG. 14 provides a bottom view of the locking ring of FIG. 13.

FIG. 13 provides a front perspective view of a locking ring 7 comprising an annular groove 77 located at the open bottom 73 of the locking ring 7. FIG. 14 provides a bottom view of the locking ring of FIG. 13.

The annular groove 77 of the locking ring 7 has an inner surface 770. The annular groove 77 may comprise one or more engagement members, namely one or more male lugs 771 which protrude from the inner surface 770 of the annular groove 77 of the locking ring 7. The one or more male lugs 771 of the annular groove 77 of the locking ring 7 can be seen as interlocking protrusions or bayonet lugs. The one or more male lugs 771 of the annular groove 77 of the locking ring 7 may be located at or adjacent to the open bottom 73 of the locking ring 7 or the lower end 74 of the locking ring 7.

The one or more male lugs 771 of the annular groove 77 of the locking ring 7 may be located on the same circular plane orthogonal to the longitudinal axis L of the locking ring 7.

The annular groove 77 may comprise two male lugs 771 which protrude from the inner surface 770 of the annular groove 77 of the locking ring 7. The two male lugs 771 of the annular groove 77 may be diametrically opposed from the inner surface 770 of the annular groove 77 in a transversal direction perpendicular to the longitudinal axis L of the locking ring 7.

The annular groove 77 may more comprise four male lugs 771 which protrude from the inner surface 770 of the annular groove 77 of the locking ring 7, such that two adjacent male lugs 771 of the annular groove 77 are positioned at an angle of π/2 relative to the longitudinal axis L of the locking ring 7, as shown for instance in FIGS. 13 and 14.

The one or more male lugs 771 of the annular groove 77 of the locking ring 7 may be located at or adjacent to the open bottom 73 of the locking ring 7 and on the same circular plane orthogonal to the longitudinal axis L of the locking ring 7.

The tubular body 6 of the reusable dispenser 3 may be adapted to engage with the one or more male lugs 771 of the annular groove 77 of the locking ring 7.

For this, the tubular body 6 of the reusable dispenser 3 may comprise a stepped section 600 located at or adjacent to an upper end 64 or the open top 61 of the tubular body 6. The stepped section 600 of the tubular body 6 of the reusable dispenser 3 may be formed from a recess of the outer surface 65 of the tubular body 6 of the reusable dispenser 3. The stepped section 600 of the tubular body 6 of the reusable dispenser 3 may comprise one or more interlocking recesses 601.

Figure 15:
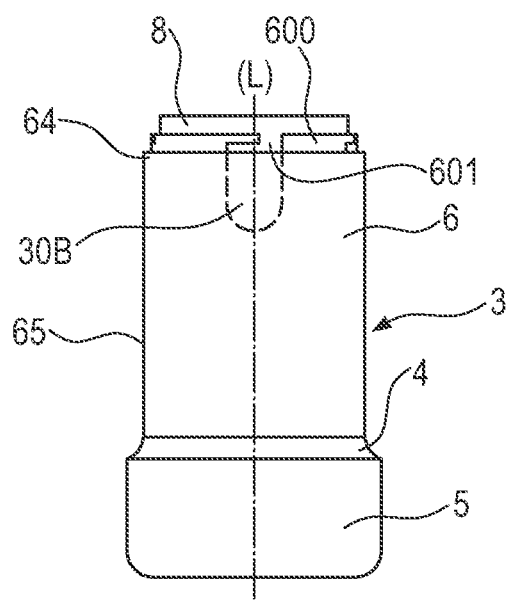
FIG. 15 provides a front view of a reusable dispenser with a replaceable cartridge inserted therein, the reusable dispenser being able to engage with the locking ring of FIG. 13.

FIG. 15 provides a front view of a reusable dispenser 3 having a stepped section 600 comprising one or more interlocking recesses 601. The reusable dispenser 3 as exemplified in FIG. 15 can engage with a locking ring 7 comprising one or more male lugs 771 onto an annular groove 77 as shown for instance in FIG. 13.

The one or more interlocking recesses 601 of the stepped section 600 of the tubular body 6 may be located on the same circular plane orthogonal to the longitudinal axis L of the reusable dispenser 3.

The stepped section 600 may comprise two interlocking recesses 601. The two interlocking recesses 601 of the stepped section 600 may be diametrically opposed in a transversal direction perpendicular to the longitudinal axis L of the reusable dispenser 3.

The stepped section 600 may comprise four interlocking recesses 601 such that two adjacent interlocking recesses 601 of the stepped section 600 may be positioned at an angle of π/2 relative to the longitudinal axis L of the reusable dispenser 3, as shown for instance in FIG. 15.

To secure the replaceable cartridge 8 within the tubular body 6 of the reusable dispenser 3, the locking ring 7 engages with the tubular body 6 of the reusable dispenser 3. In that case, the one or more male lugs 771 of the annular groove 77 of the locking ring 7 snap fit over the one or more interlocking recesses 601 of the stepped section 600 to engage the locking ring 7 with the tubular body 6 for securing the replaceable cartridge 8 within the tubular body 6 of the reusable dispenser 3.

The one or more interlocking recesses 601 of the stepped section 600 are designed to allow access of the one or more male lugs 771 of the annular groove 77 of the locking ring 7, when the locking ring 7 is inserted from above at the open top 61 of the tubular body 6 of the reusable dispenser 3. A clockwise rotation of the locking ring 7 can help for locking the one or more male lugs 771 of the annular groove 77 of the locking ring 7 into the respective one or more interlocking recesses 601 of the stepped section 600; and preventing any axial movement of the locking ring 7 relative to the tubular body 6 of the reusable dispenser 3.

When the locking ring 7 needs to be removed (typically when the replaceable cartridge 8 is empty and requires replacing), the locking ring 7 is rotated counter-clockwise and the one or more male lugs 771 of the annular groove 77 of the locking ring 7 may then be lifted clear of the respective one or more interlocking recesses 601 of the stepped section 600.

Hence, there is no need to provide any locking means to the replaceable cartridge 8 for releasably securing the replaceable cartridge 8 within the tubular body 6 of the reusable dispenser 3. The replaceable cartridge 8 that will be discarded or recycled is provided as simple as is practicable without no additional locking means to be included on it. The replaceable cartridge 8 without any interlocking mean features comprise less material to be discarded or recycled.

Then, it is possible to provide the replaceable cartridge 8 with a sustainable material, such as the ones described more in details above, e.g. paper, corrugated paperboard, cardboard, cork or mixtures thereof, which helps to significantly reduce the consumption of non-renewable resources.

The one or more male lugs 771 of the annular groove 77 of the locking ring 7 may have a L-shape. The one or more interlocking recesses 601 of the stepped section 600 may have a L-shape corresponding to the L-shape of the one or more male lugs 771 of the annular groove 77 of the locking ring 7. In that case, the one or more male lugs 771 of the annular groove 77 of the locking ring 7 come up against the one or more interlocking recesses 601 of the stepped section 600.

Other suitable shapes for protrusions and recesses for the respective one or more male lugs 771 of the annular groove 77 of the locking ring 7 and for the one or more interlocking recesses 601 of the stepped section 600 of the reusable dispenser 3 may be included as long as the one or more male lugs 771 of the annular groove 77 and the one or more interlocking recesses 601 of the stepped section 600 interlock with one another.

Alternatively, the annular groove 77 of the locking ring 7 may comprise inner threads 772 as shown for instance in FIG. 16.

The tubular body 6 of the reusable dispenser 3 may be adapted to engage with the inner threads 772 of the annular groove 77 of the locking ring 7.

For this, the tubular body 6 of the reusable dispenser 3 may comprise a stepped section 600 located at or adjacent to the upper end 64 of the tubular body 6. The stepped section 600 tubular body 6 of the reusable dispenser 3 may comprise outer threads 602.

Figure 17:
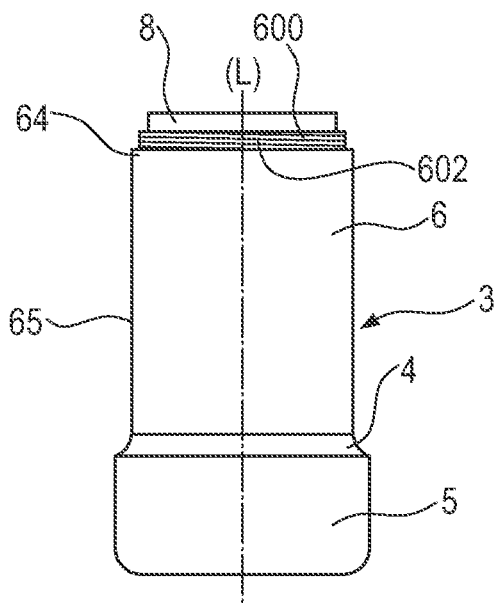
FIG. 17 provides a front view of another reusable dispenser with a replaceable cartridge inserted therein, the reusable dispenser being able to engage with the locking ring of FIG. 16.

FIG. 17 provides a front view of another reusable dispenser 3 having a stepped section 600 comprising outer threads 602. The reusable dispenser 3 as exemplified in FIG. 17 is able to engage with another type of locking ring 7 comprising inner threads 772, as shown in FIG. 16.

To secure the replaceable cartridge 8 within the tubular body 6 of the reusable dispenser 3, the locking ring 7 engages with the tubular body 6 of the reusable dispenser 3. In that case, the inner threads 772 of the annular groove 77 of the locking ring 7 engage with the outer threads 602 of the stepped section 600.

Again, it has been avoided providing a replaceable cartridge 8 with any locking means for releasably securing the replaceable cartridge 8 within the tubular body 6 of the reusable dispenser 3. The replaceable cartridge 8 that will be discarded or recycled is provided as simple as is practicable without no additional means to be included on it. The replaceable cartridge 8 without any outer thread features comprise less material to be discarded or recycled.

Overall, the replaceable cartridge 8 without any locking means can be readily inserted into or removed from the reusable dispenser 3 without having to manipulate the replaceable cartridge 8 itself to fix or detach it from the tubular body 6 of the reusable dispenser 3.

The replaceable cartridge 8 may not comprise any engagement members engaging with the inner surface 68 of the tubular body 6.

The reusable dispenser 3 may not comprise any holder to support or to attach the replaceable cartridge 8 with the tubular body 6.

The replaceable cartridge 8 can be maintained in place within the tubular body 6 of the reusable dispenser 3 because of the attachment of the removable locking ring 7 to the tubular body 6, especially when the circumferential edge 75 of the locking ring 7 abuts the upper end 81 of the replaceable cartridge 8.

The upper end 72 of the locking ring 7 may comprise a curvature including, but not limited to, convex, concave, or a mixture thereof. The upper end 72 of the locking ring 7 may be convex, in the cross section, in a transverse direction perpendicular to the longitudinal axis L of the locking ring 7.

The upper end 72 of the locking ring 7 and the circumferential edge 75 of the locking ring 7 together form a curvature including, but not limited to, convex, concave, or a mixture thereof. The upper end 72 of the locking ring 7 may be convex, in the cross section, in a transverse direction perpendicular to the longitudinal axis L of the locking ring 7.

Having the upper end 72 of the locking ring 7; and the circumferential edge 75 of the locking ring 7 together; being convex can allow providing an improved gentle application of the personal care product to the skin of the consumer, by preventing any mechanical skin irritation, by following better the contours of the skin.

As more detailed below, the locking ring 7 may comprise a first indicia 30A located at the outer surface 78 of the locking ring 7. The tubular body 6 may comprise a second indicia 30B located at the outer surface 65 of the tubular body 6. The first and second indicia (30A, 30B) may together form a final indicia 30 to indicate that the locking ring 7 is locked to the tubular body 6 of the reusable dispenser 3.

Perforated Dome Cover

The reusable dispenser 3 may comprise a perforated dome cover 9. The open top 71 of the locking ring 7 may optionally comprise an upwardly facing perforated dome cover 9, as shown for instance in FIGS. 18, 19 and 20. The perforated dome cover 9 may be a separate member that is formed separately and then attached to the locking ring 7 (by any conventional means immediately apparent to the skilled person).

Figure 18:
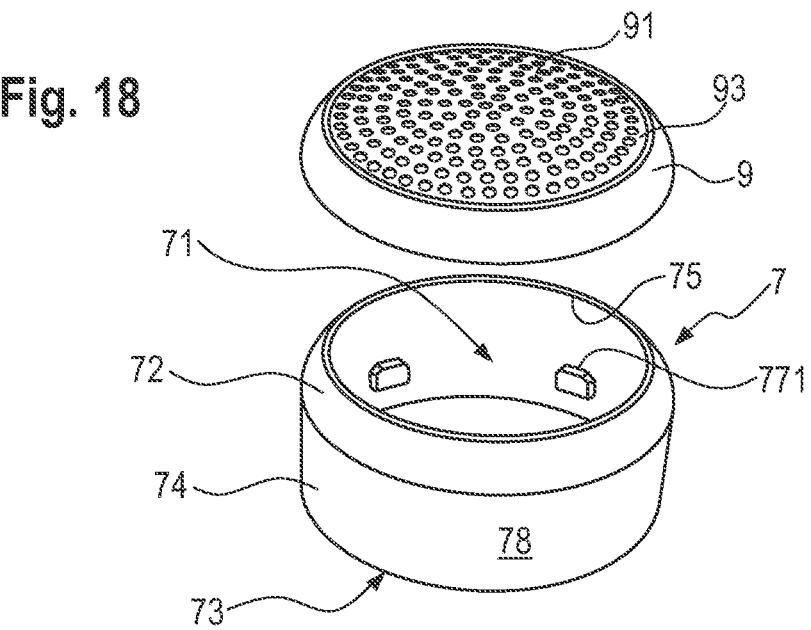
FIG. 18 provides a front perspective view of a non-integrated perforated dome cover of the dispensing package as shown and described herein.

FIG. 18 provides a front perspective view of a perforated dome cover 9 as a separate member from the locking ring 7.

Figure 19:
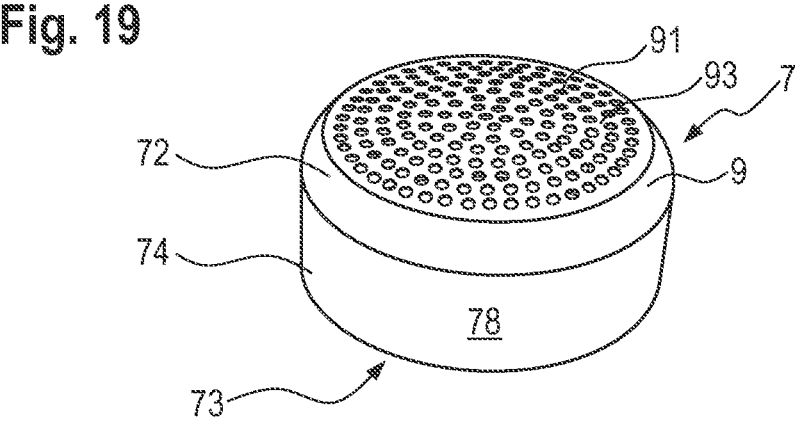
FIG. 19 provides a front perspective view of a locking ring comprising an integrated perforated dome cover for the dispensing package as shown and described herein.
Figure 20:
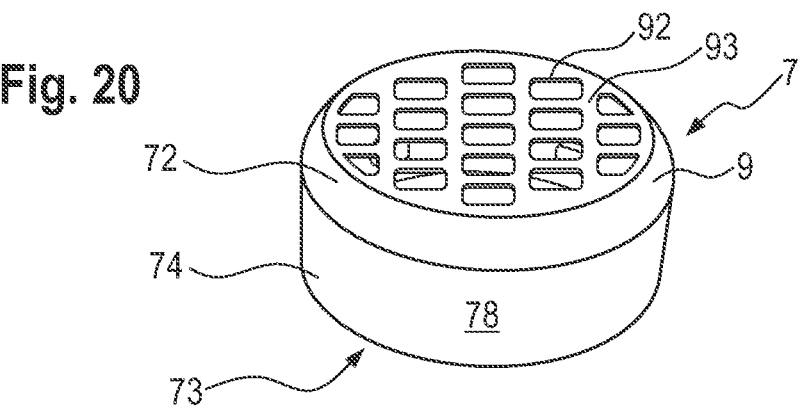
FIG. 20 provides a front perspective view of a locking ring comprising another integrated perforated dome cover for the dispensing package as shown and described herein.

Alternatively, the perforated dome cover 9 may be integrally formed with the locking ring 7. FIGS. 19 and 20 provide front perspective views of perforated dome covers 9 integrally formed with the locking ring 7.

The perforated dome cover 9 is generally useful for personal care products with rheology, hardness, and/or melting profiles that are considered gels or semi-solids. For example soft solids are described in U.S. Patent Publication No. 2013/0108570A1 whereby the rheology profile may include a combination of product hardness in the form of penetration force (gram-force), static yield stress (Pa) values, and/or high shear stress viscosity via methods for determining such characteristics of the rheology profile that are described therein.

The perforated dome cover 9 may extend outwardly from and completely surround a periphery of the open top 71 of the locking ring 7. The upper end 72 of the locking ring 7 and/or perforated dome cover 9 may comprise a curvature including, but not limited to, convex, concave or a mixture thereof. The upper end 72 of the locking ring 7 can be convex, in the cross section, in a transverse direction perpendicular to the longitudinal axis L of the locking ring 7.

The perforated dome cover 9 may comprise a plurality of apertures. The apertures in the perforated dome cover 9 may represent from 15% to 80%, or from 30% to 60%, or from 39% to 50%, of a surface area of the perforated dome cover 9. In this context, the surface area of the perforated dome cover 9 may correspond to the surface area as measured from a topographical view of the perforated dome cover 9.

The perforated dome cover 9 may comprise a convex configuration. The convex configuration of the perforated dome cover 9 may have a radius of curvature of from about 25 mm to about 127 mm, alternatively from about 57 mm to about 69 mm, for a major dimension. Alternatively, the convex configuration of the perforated dome cover 9 may have a radius of curvature of from about 12 mm to about 39 mm, preferably from about 22 mm to about 28 mm for a minor dimension.

The average aperture area of the perforated dome cover 9 may range from about 0.12 $cm^2$ to about 0.50 $cm^2$, alternatively from about 0.2 $cm^2$ to about 0.35 $cm^2$.

The perforated dome cover 9 may comprise a plurality of apertures (91, 92). wherein each of the plurality of apertures has a circular or noncircular shape. A noncircular shape may be polygonal, trapezoidal, or parallelepipedal. FIG. 19 and FIG. 20 illustrate some non-limiting perforated dome covers 9 comprising a plurality of apertures having different shapes.

The apertures 91 of the perforated dome cover 9 may have a circular shape. The apertures 91 of the perforated dome cover 9 may have an average circular diameter of from about 1.9 mm to about 2.6 mm. The perforated dome cover thickness may be from about 0.25 mm to about 1.53 mm, alternatively from 0.45 mm to 1.1 mm.

The perforated dome cover 9 may have a bottom edge closest to the open top 61 of the tubular body 6 of the reusable dispenser 3 and the open top 84 of the replaceable cartridge 8. Also, the perforated dome cover 9 may have a top edge 93, furthest or distal from the open top 61 of the tubular body 6 of the reusable dispenser 3 and the open top 84 of the replaceable cartridge 8.

The top edge 93 of the perforated dome cover 9 can help to provide a surface for applying the spreadable personal care product. The outer surface of the perforated dome cover 9 can aid in applying, dosing, and/or delivering the desired amount of the spreadable personal care product to the skin being taking care, and may, in addition to having a plurality of apertures, be smooth or textured. Textured applicator surfaces include, but are not limited to dimpling, bumping, electrical discharge machining (EDM), coating, emboss, deboss or mixtures thereof.

Indicia

Alternatively, the reusable dispenser 3 comprises a locking ring 7 removably engaged with the tubular body 6 of the reusable dispenser 3 to secure the replaceable cartridge 8 within the tubular body 6 of the reusable dispenser 3. Now, the locking ring 7 comprises a first indicia 30A located at the outer surface 78 of the locking ring 7. The tubular body 6 comprises a second indicia 30B located at the outer surface 65 of the tubular body 6. The first and second indicia (30A, 30B) together form a final indicia 30 to indicate that the locking ring 7 is locked to the tubular body 6 of the reusable dispenser 3.

The first and second indicia (30A, 30B) may join together to form the final indicia 30 to indicate that the locking ring 7 is locked to the tubular body 6 of the reusable dispenser 3. In that case, the first and second indicia (30A, 30B) are connected together to form the final indicia 30, which provides the secured information that the replaceable cartridge 8 is locked in place within the tubular body 6.

FIG. 2 provides a front view of a dispensing package 1 for a spreadable personal care product in an open position. The reusable dispenser 3 is in a closed position since the locking ring 7 has been attached to the tubular body 6 of the reusable dispenser 3. In such closed position, the consumer is ensured that the locking ring 7 is well secured onto the tubular body 6 because the first indicia 30A located at the outer surface 78 of the locking ring 7 and the second indicia 30B located at the outer surface 65 of the tubular body 6 together form a final indicia 30.

Hence, the final indicia 30 of the reusable dispenser 3 enables an individual securing the locking ring 7 to the tubular body 6 of the reusable dispenser 3, for effecting closure and effective securing of the replaceable cartridge 8 within the tubular body 6 of the reusable dispenser 3.

The first and second indicia (30A, 30B) of the reusable dispenser 3 may be the same or different from one another. In general, an indicia may be any type of lines, patterns, ornamental designs, symbols, script, color codes, or other markings which have the capability, either inherently or with additional denotation, to aid an individual securing the replaceable cartridge 8 within the reusable dispenser 3 by indicating the locking ring 7 is locked to the tubular body 6 of the reusable dispenser 3.

The first and second indicia (30A, 30B) of the reusable dispenser 3 may also or alternatively include, but are not limited to, pressure sensitive labels; shrink wrap labels; or other visually detectable or discernable aspects (e.g., "sparkles" or "glitter" via incorporation of interference pigments) that are part of the material from which the tubular body 6 or the locking ring 7 are made or that is subsequently added to the manufactured components; defined relief, indentation, windows and/or gaps formed in the components during or after their manufacture; cast designs, including but not limited to novelty casting to identify characters, paraphernalia, animals, and the like; particular shapes or other means of decoration and/or information sharing used to indicate to the individual that the locking ring 7 is locked to the tubular body 6 of the reusable dispenser 3.

The first and second indicia (30A, 30B) and/or the final indicia 30 of the reusable dispenser 3 may comprise a shape and/or a surface feature, etc.

The locking ring 7 comprises a first indicia 30A located at the outer surface 78 of the locking ring 7. The tubular body 6 comprises a second indicia 30B located at the outer surface 65 of the tubular body 6. The first indicia 30A located at the outer surface 78 of the locking ring 7 may have a visual appearance that is transparent, translucent or substantially opaque, or include a portion of the same. The second indicia 30B located at the outer surface 65 of the tubular body 6 may have a visual appearance that is transparent, translucent or substantially opaque, or include a portion of the same.

The first and second indicia (30A, 30B) and the resulting indicia 30 may comprise a particular shape including, but not limited to, circle, square, rectangle, oval, star, heart, diamond, polygons and the like.

When the locking ring 7 and/or the tubular body 6 of the reusable dispenser 3 is at least partially transparent or translucent, the first and second indicia (30A, 30B) and the resulting final indicia 30 may define a window to discern the outer surface 88 of the replaceable cartridge 8.

The first indicia 30A of the locking ring 7 may be positioned at a location at or adjacent the open bottom 73 of the locking ring 7 and at the outer surface 78 of the locking ring 7. The second indicia 30B of the tubular body 6 of the reusable dispenser 3 may be positioned at a location at or adjacent the open top 61 of the tubular body 6 and at the outer surface 65 of the tubular body 6.

As set out above, to secure the replaceable cartridge 8 within the tubular body 6 of the reusable dispenser 3, the locking ring 7 engages with the tubular body 6 of the reusable dispenser 3.

The one or more male lugs 771 of the annular groove 77 of the locking ring 7 may snap fit over the one or more interlocking recesses 601 of the stepped section 600 to engage the locking ring 7 with the tubular body 6 for securing the replaceable cartridge 8 within the tubular body 6 of the reusable dispenser 3.

The first indicia 30A of the locking ring 7 may be positioned at a location at or adjacent the open bottom 73 of the locking ring 7; and at a male lug 771 and at the outer surface 78 of the locking ring 7. The second indicia 30B of the tubular body 6 of the reusable dispenser 3 may be positioned at a location at or adjacent the stepped section 600 of the tubular body 6, and at an interlocking recess 601 of the stepped section 600 of the tubular body 6, wherein the interlocking recesses 601 of the stepped section 600 has a L-shape. All the interlocking recesses 601 of the stepped section 600 may have a L-shape, as shown for instance in FIGS. 13 and 15.

The first and second indicia (30A, 30B) together form a final indicia 30 to indicate that the locking ring 7 is locked to the tubular body 6 of the reusable dispenser 3 when the one or more male lugs 771 of the annular groove 77 of the locking ring 7 snap fit over the one or more interlocking recesses 601 of the stepped section 600. In that case, the first indicia 30A of the locking ring 7 positioned at a location at a male lug 771 of the locking ring 7 meet the second indicia 30B of the tubular body 6 positioned at a location at the interlocking recesses 601 being in L-shape. All the interlocking recesses 601 of the stepped section 600 may have a L-shape.

Alternatively, the first indicia 30A of the locking ring 7 may be positioned at a location at or adjacent to the open bottom 73 of the locking ring 7; and adjacent to a male lug 771 and at the outer surface 78 of the locking ring 7. The second indicia 30B of the tubular body 6 of the reusable dispenser 3 may be positioned at a location at or adjacent to the stepped section 600 of the tubular body 6, and adjacent to an interlocking recesses 601 of the stepped section 600 of the tubular body 6, wherein the interlocking recesses 601 of the stepped section 600 has a L-shape.

The first and second indicia (30A, 30B) together form a final indicia 30 to indicate that the locking ring 7 is locked to the tubular body 6 of the reusable dispenser 3 when the one or more male lugs 771 of the annular groove 77 of the locking ring 7 snap fit over the one or more interlocking recesses 601 of the stepped section 600. In that case, the first indicia 30A of the locking ring 7 positioned at a location adjacent to a male lug 771 at the outer surface 78 of the locking ring 7 meet the second indicia 30B of the tubular body 6 positioned at a location adjacent to an interlocking recesses 601 being in L-shape.

Alternatively, the first indicia 30A of the locking ring 7 may be positioned at a location at or adjacent to the open bottom 73 of the locking ring 7; and adjacent to the start of the inner threads 772 of the annular groove 77. The second indicia 30B of the tubular body 6 of the reusable dispenser 3 may be positioned at a location at or adjacent to the stepped section 600 of the tubular body 6, and adjacent to the start of the outer threads 602 of the stepped section 600.

The first and second indicia (30A, 30B) together form a final indicia 30 to indicate that the locking ring 7 is locked to the tubular body 6 of the reusable dispenser 3 when the inner threads 772 of the annular groove 77 engage completely with the outer threads 602 of the stepped section 600.

The dispensing package 1 for a spreadable personal care product may comprise optionally a top cap 2.

The top cap 2 of the dispensing packaging 1 can be relatively short in height relatively to the height of the reusable dispenser 3 with regard to the longitudinal axis L.

The top cap 2 of the dispensing packaging 1 may cover only the locking ring 7, and optionally the perforated dome cover 9 as described hereinbefore. Alternatively, the top cap 2 of the dispensing packaging 1 may cover the tubular body 6 of the reusable dispenser 3 and rest on the collar 4 of the reusable dispenser 3.

The top cap 2 of the reusable dispenser 3 can cover the locking ring 7 and optionally the perforated dome cover 9; the open top 84 of replaceable cartridge 8; and the tubular body 6 of the reusable dispenser 3 between uses. The top cap 2 of the reusable dispenser 3 may assist to avoid contamination of the spreadable personal care product and the locking ring 7 by any foreign matter, such as dust, when the dispensing package 1 is not being used.

The top cap 2 of the reusable dispenser 3 may comprise one or more engagement members included in the top cap 2. The collar 4 or the tubular body 6 of the reusable dispenser 3 may also releasably engage the top cap 2, thereby to enable top cap 2 to detachably cover the reusable dispenser 3.

Telescopic Actuator

The reusable dispenser 3 comprises a telescopic actuator 5 axially oriented within the tubular body 6 and mounted through the open bottom 62 of the tubular body 6 into the coupling sleeve 63. The telescopic actuator 5 is able to engage with the push plate 86 to deliver the personal care product from the open top 84 of the replaceable cartridge 8.

Figure 21:
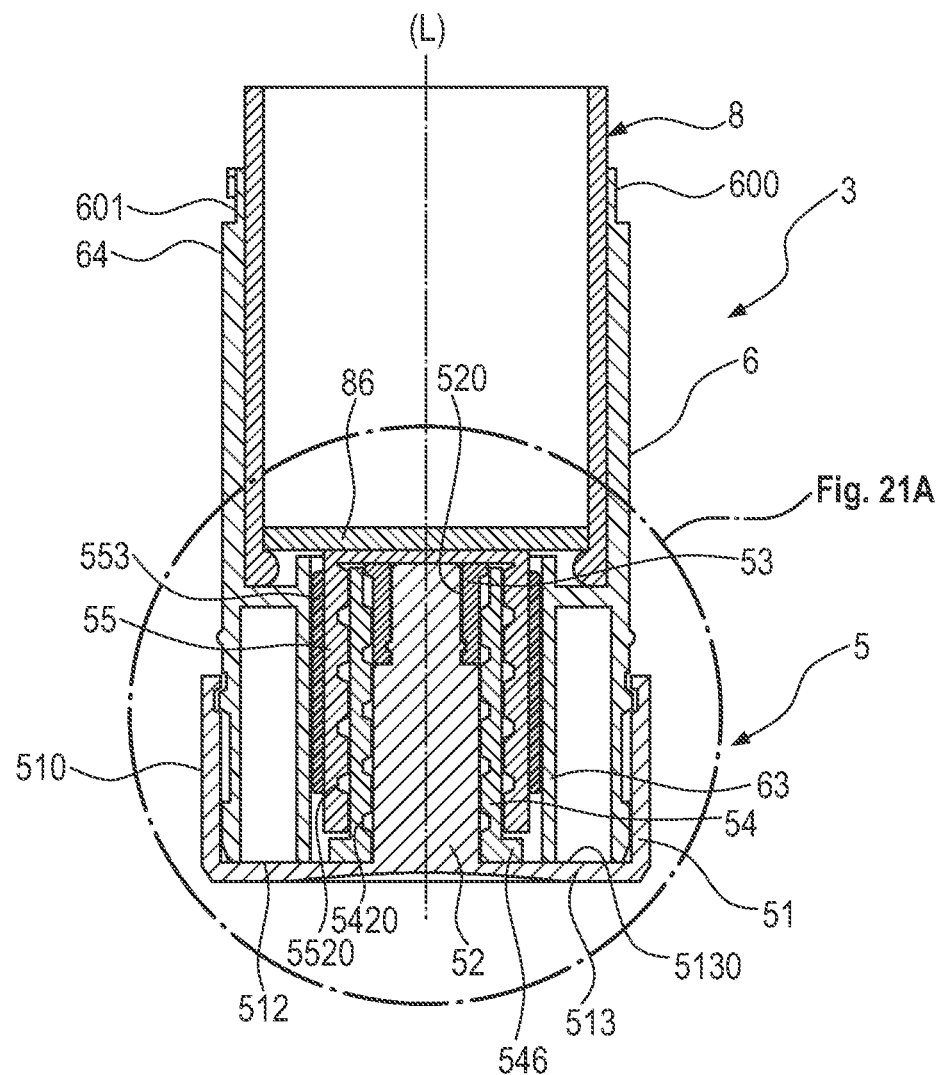
FIG. 21 provides a cross-sectional view of a reusable dispenser comprising a tubular body, a telescopic actuator in a rest or collapsed state position; and a replaceable cartridge, according to one or more aspects.

The telescopic actuator 5 may comprise a hand wheel 51, a central shaft 52, a leading screw 53, a tubular screw 54 and an elevator 55, as shown for instance in FIG. 3 and FIG. 21.

FIG. 3 provides a cross-sectional view of a reusable dispenser 3 comprising a tubular body 6 and a telescopic actuator 5 with a replaceable cartridge 8 locked into the tubular body 6 of the reusable dispenser 3. FIG. 21 provides a cross-sectional view of a reusable dispenser 3 comprising a tubular body 6 and a telescopic actuator 5 with a replaceable cartridge 8 that has been slidingly mounted through the open top 61 of the tubular body 6.

The telescopic actuator 5 may comprise a hand wheel 51 having an inner surface 512 and a perimeter wall 510. The perimeter wall 510 of the telescopic actuator 5 extends around the lower bottom portion 67 of the tubular body 6. The hand wheel 51 of the telescopic actuator 5 may have a bottom 513 having an inner surface 5130.

The telescopic actuator 5 may additionally comprise a central shaft 52 connected to the hand wheel 51 of the telescopic actuator 5. The central shaft 52 of the telescopic actuator 5 may extend from the inner surface 5130 of the bottom 513 of the hand wheel 51 into the coupling sleeve 63 of the tubular body 6 along the longitudinal axis L.

The central shaft 52 of the telescopic actuator 5 may comprise an upper end 520. The central shaft 52 may comprise a leading screw 53 located at the upper end 520 of the central shaft 52.

The leading screw 53 may be a separate member that is formed separately and then attached to the central shaft 52 of the telescopic actuator 5. Alternatively, the leading screw 53 may be integrally formed with the central shaft 52 of the telescopic actuator 5.

Figure 22:
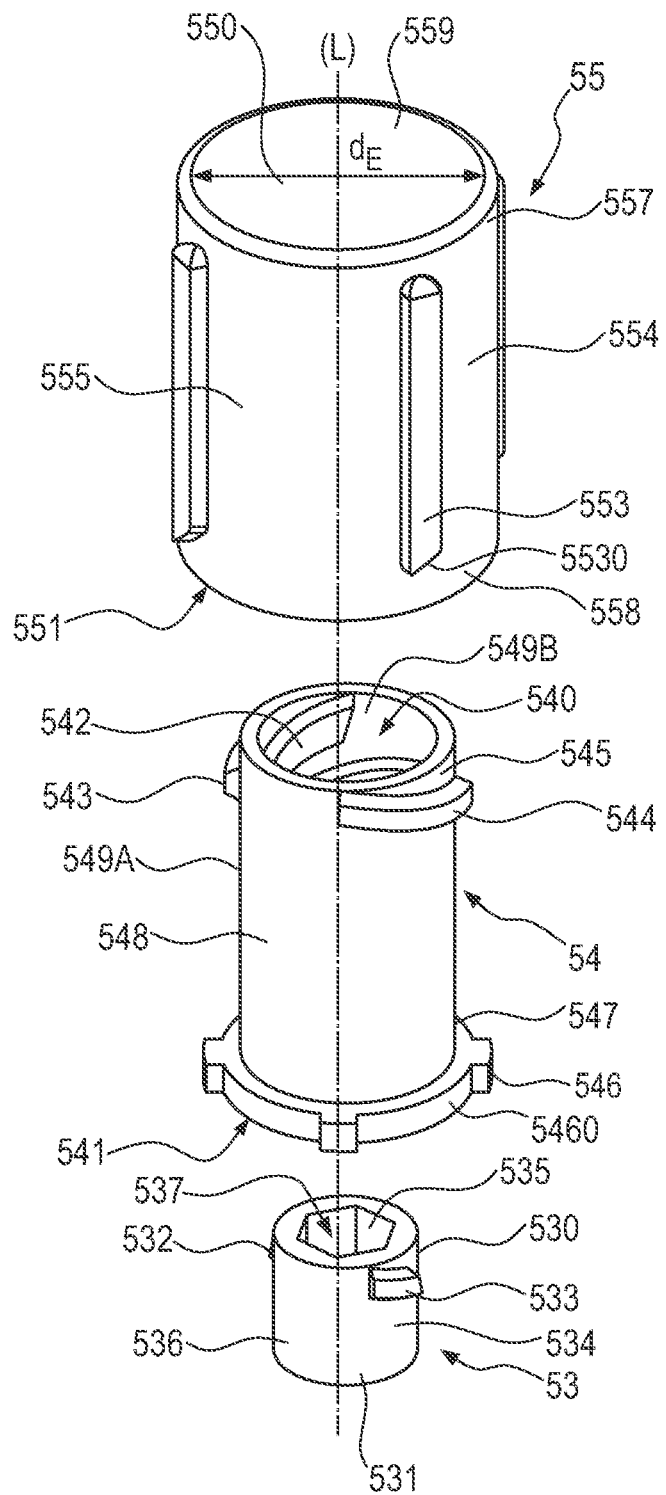
FIG. 22 provides an exploded top view of a lead screw, a tubular screw and an elevator in disassembled form, according to one or more aspects.

The telescopic actuator 5 may comprise a leading screw 53, a tubular screw 54 and an elevator 55. Each segment of the telescopic actuator 5 and how they are connected will be described more in details. FIG. 22 provides an exploded top view of a lead screw 53, a tubular screw 54 and an elevator 55 in disassembled form.

The leading screw 53 comprises an upper end 530 and a lower end 531 opposed to the upper end 530 of the leading screw 53. The leading screw 53 comprises a side wall 534 having an inner surface 535 and an outer surface 536. The leading screw 53 may have a cylindrical outer shape. The leading screw 53 may further comprise first and second opposed outer threads (532, 533) located at or adjacent to the upper end 530 of the leading screw 53.

When the leading screw 53 is a separate member, the leading screw 53 may have a cavity 537 that can engage with the central shaft 52 for attaching the leading screw 53 and the central shaft 52 together. As shown, for instance in FIG. 22, the leading screw 53 may have a hexagonal cavity 537 that can engage with a corresponding hexagonal central shaft 52 (not represented) for attaching the leading screw 53 and the central shaft 52 together. Alternatively, the leading screw 53 may have a cavity that can engage with the central shaft 52 for attaching the leading screw 53 and the central shaft 52 together, wherein the cavity of the leading screw 53 has a shape which is selected from the group consisting of round, oval, square, hexagonal and triangular.

Figure 23:
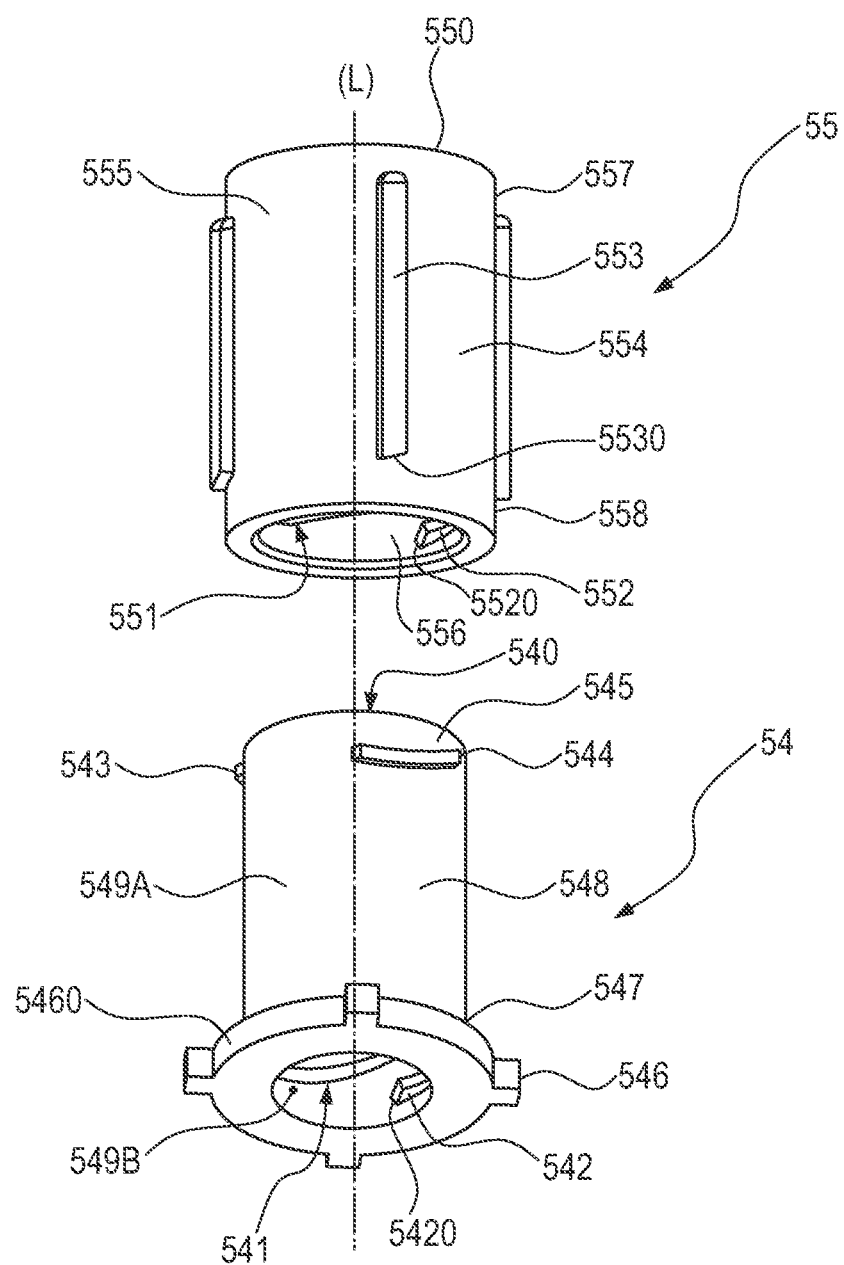
FIG. 23 provides an exploded bottom view of a tubular screw and an elevator disassembled form, according to one or more aspects.

The telescopic actuator 5 may further comprise a tubular screw 54. The tubular screw 54 of the telescopic actuator 5 may have a cylindrical outer shape. The tubular screw 54 of the telescopic actuator 5 comprises a side wall 548 having an outer surface 549A and an inner surface 549B. The tubular screw 54 of the telescopic actuator 5 may comprise an upper end 545 and a lower end 547 opposed to the upper end 545 of the tubular screw 54. The tubular screw 54 of the telescopic actuator 5 may comprise an open top 540 at the upper end 545 of the tubular screw 54, and an open bottom 541 at the lower end 547 of the tubular screw 54. The open top 540, the open bottom 541 and the side wall 548 of the tubular screw 54 may define a threaded cavity. The threaded cavity of the tubular screw 54 may have double start inner threads 542 including two opposed lower thread stops 5420. The double start inner threads 542 of the tubular screw 54 may extend from the open top 540 of the tubular screw 54 to a distal position of the open bottom 541 of the tubular screw 54, until the respective two opposed lower thread stops 5420 of the tubular screw 54, as shown in FIG. 23.

The tubular screw 54 may also comprise first and second opposed outer threads (543, 544) located at or adjacent to the upper end 545 of the tubular screw 54.

The tubular screw 54 of the telescopic actuator 5 may additionally comprise an annular ring 5460 protruding from the outer surface 549A of the tubular screw 54 and located at the lower end 547 of the tubular screw 54. The tubular screw 54 may comprise two or more spokes 546 located at the lower end 547 of the tubular screw 54. The two or more spokes 546 protrude from an outer surface of the annular ring 5460 in a direction perpendicular to the longitudinal axis L.

The tubular screw 54 of the telescopic actuator 5 may comprise two spokes 546 positioned at an angle of $\pi$ from each other with regard to the longitudinal axis L, alternatively four spokes 546 positioned at an angle of π/2 from each other with regard to the longitudinal axis L.

The telescopic actuator 5 may further comprise an elevator 55. The elevator 55 of the telescopic actuator 5 may comprise a side wall 554 having an outer surface 555 and an inner surface 556. The elevator 55 of the telescopic actuator 5 may include an upper end 557 and a lower end 558 opposed to the upper end 557 of the elevator 55. The elevator 55 of the telescopic actuator 5 may include a closed top 550 at the upper end 557 of the elevator 55 and an open bottom 551 at the lower end 558 of the elevator 55. The closed top 550 of the elevator 55 has a top surface 559. The closed top 550, the open bottom 551 and the side wall 554 of the elevator 55 may define a threaded cavity. The threaded cavity of the elevator 55 may have double start inner threads 552 including two opposed lower thread stops 5520. The double start inner threads 552 of the elevator 55 may extend from the closed top 550 of the elevator 55 to a distal position of the open bottom 551 of the elevator 55, until the respective two opposed lower thread stops 5520 of the elevator 55, as shown for instance in FIG. 23.

The leading screw 53, the tubular screw 54 and the elevator 55 of the telescopic actuator 5 are engaged as follows, as illustrated for instance with FIGS. 24-26.

The leading screw 53 of the telescopic actuator 5 may be permanently and threadedly engaged with the tubular screw 54 of the telescopic actuator 5 by engaging the first and second opposed outer threads (532, 533) of the leading screw 53 with the double start inner threads 542 of the tubular screw 54. For this, the double start inner threads 542 of the tubular screw 54 extend from the open top 540 of the tubular screw 54 to a distal position of the open bottom 541 of the tubular screw 54 until the respective two opposed lower thread stops 5420 of the tubular screw 54 such that the leading screw 53 and the tubular screw 54 do not detach.

In other words, the first and second opposed outer threads (532, 533) of the leading screw 53 are captured within the double start inner threads 542 of the tubular screw 54. The first and second opposed outer threads (532, 533) of the leading screw 53 and the double start inner threads 542 of the tubular screw 54 together in engagement cannot be disconnected. When the tubular screw 54 translates out of the leading screw 53, the first and second opposed outer threads (532, 533) of the leading screw 53 will move until abutting the respective two opposed lower thread stops 5420 of the tubular screw 54.

The tubular screw 54 of the telescopic actuator 5 may be permanently and threadedly engaged with the elevator 55 of the telescopic actuator 5 by engaging the first and second opposed outer threads (543, 544) of the tubular screw 54 with the double start inner threads 552 of the elevator 55. For this, the double start inner threads 552 of the elevator 55 extend from the closed top 550 of the elevator 55 to a distal position of the open bottom 551 of the elevator 55 until the respective two opposed lower thread stops 5520 of the elevator 55, such that the tubular screw 54 and the elevator 55 do not detach.

In other words, the first and second opposed outer threads (543, 544) of the tubular screw 54 are captured within the double start inner threads 552 of the elevator 55. The first and second opposed outer threads (543, 544) of the tubular screw 54 and the double start inner threads 552 of the elevator 55 together in engagement cannot be disconnected. When the elevator 55 translates out of the tubular screw 54, the first and second opposed outer threads (543, 544) of the tubular screw 54 will move until abutting the respective two opposed lower thread stops 5520 of the elevator 55.

To assemble the telescopic actuator 5, the leading screw 53 of the telescopic actuator 5 may be initially inserted inside the threaded cavity of the tubular screw 54. For instance, the tubular screw 54 may be divided into two halves (54A, 54B) along the longitudinal axis L that can be joined together around the leading screw 53 such that the first and second opposed outer threads (532, 533) of the leading screw 53 are engaged with the double start inner threads 542 of the tubular screw 54 (not shown). This less preferred execution may be used when the leading screw 53 is integrally formed with the central shaft 52 of the telescopic actuator 5.

Figure 24:
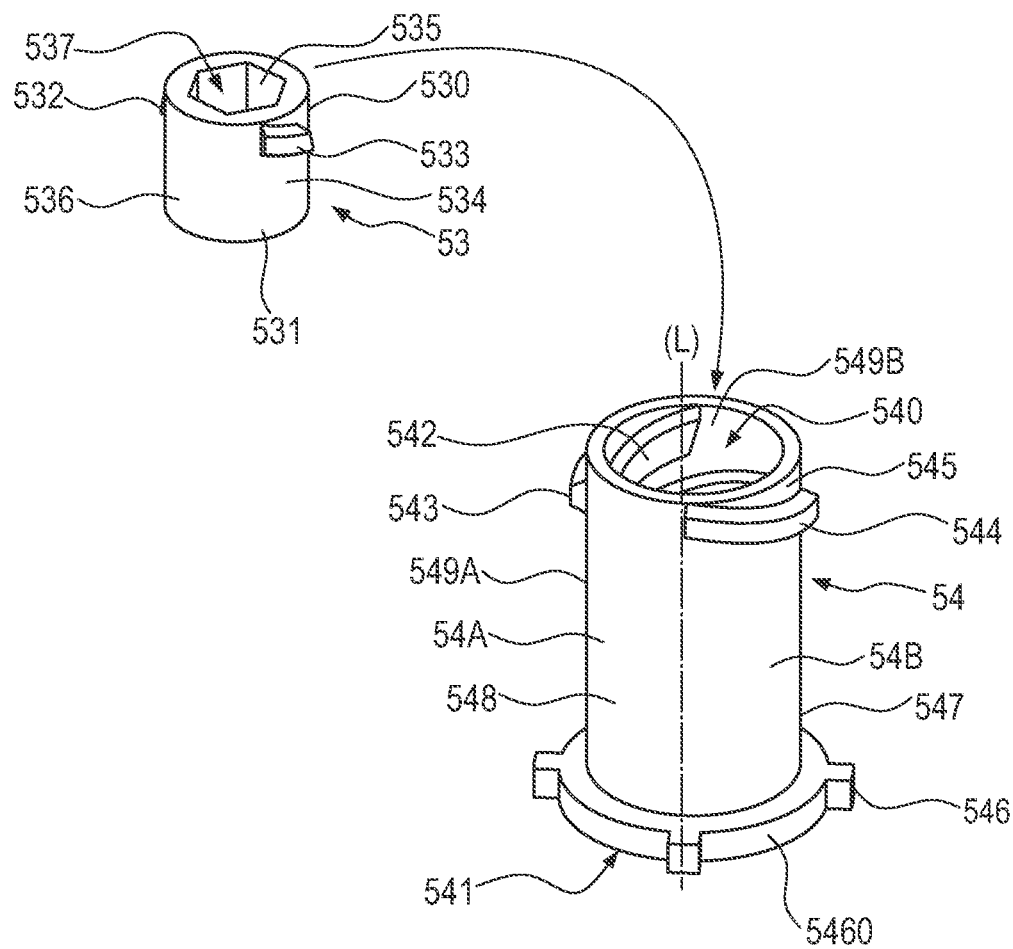
FIG. 24 depicts a schematic representation showing how the leading screw is inserted into the tubular screw, according to one or more aspects.

Alternatively, when the leading screw 53 is a separate member from the central shaft 52 of the telescopic actuator 5, the leading screw 53 may be initially inserted inside the threaded cavity of the tubular screw 54 from the open top 540 of the tubular screw 54, as shown in FIG. 24. Then, the resulting leading screw 53 can be attached to the central shaft 52 of the telescopic actuator 5.

Figure 25:
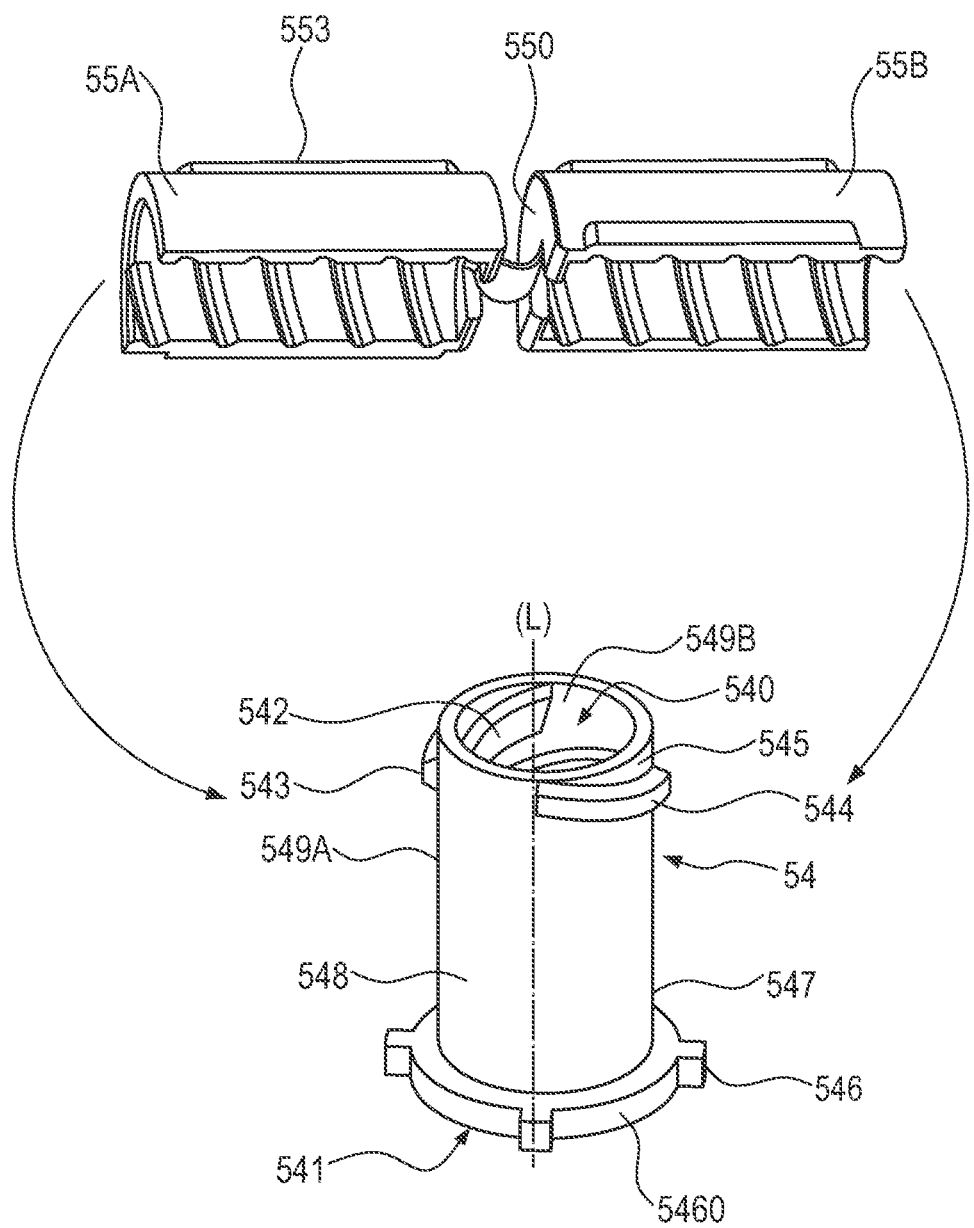
FIG. 25 depicts a schematic representation showing how the tubular screw is inserted into the elevator, according to one or more aspects.
Figure 26:
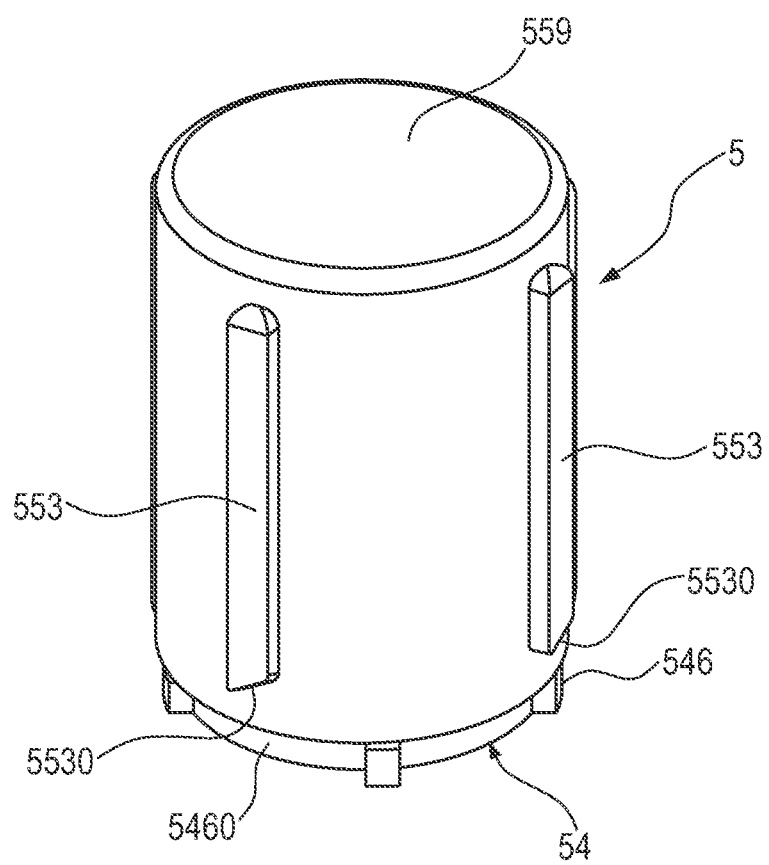
FIG. 26 provides a perspective, front view of a lead screw, a tubular screw and an elevator when assembled in a collapsed state, according to one or more aspects.

Then, the tubular screw 54 of the telescopic actuator 5 may be inserted inside the threaded cavity of the elevator 55, as shown in FIG. 25. For this, for instance, the elevator 55 may be divided into two halves (55A, 55B) along the longitudinal axis L that can be joined together around the tubular screw 54 such that the first and second opposed outer threads (543, 544) of the tubular screw 54 are engaged with the double start inner threads 552 of the elevator 55. The two halves (55A, 55B) of the elevator 55 may be glued together, alternatively only close up around the tubular screw 54 by a latching means.

Such engagement between the leading screw 53, the tubular screw 54 and the elevator 55 of the telescopic actuator 5 in an initial position, namely a fully collapsed state, can be shown for instance in FIG. 21, FIGS. 21A-B and FIG. 26. The leading screw 53, the tubular screw 54 and the elevator 55 of the telescopic actuator 5 are all screwed down, in a fully collapsed state. The telescopic actuator 5 is thus in a rest position.

The telescopic actuator 5 is axially oriented within the tubular body 6 and mounted through the open bottom 62 of the tubular body 6 into the coupling sleeve 63. The coupling sleeve 63 of the tubular body 6 of the reusable dispenser 3 has a side wall 638 having an inner surface 631 and an outer surface 639. The coupling sleeve 63 of the tubular body 6 has an inner shape defined by the inner surface 631 of the coupling sleeve 63, wherein the inner shape of the coupling sleeve 63 of the tubular body 6 is cylindrical.

The coupling sleeve 63 of the tubular body 6 may comprise an upper end 635 and a lower end 636 opposed to the upper end 635 of the coupling sleeve 63. The coupling sleeve 63 of the tubular body 6 may comprise an open top 634 at the upper end 635 of the tubular body 6, and an open bottom 637 at the lower end 636 of the tubular body 6. The open top 634, the open bottom 637 and the side wall 638 forms the central opening 630 of the coupling sleeve 63.

FIG. 4 provides a cross-sectional view of a tubular body 6 of the reusable dispenser 3 showing a coupling sleeve 63. FIG. 4A provides an enlarged view a coupling sleeve 63.

The coupling sleeve 63 of the tubular body 6 may have an inner surface 631 from which a plurality of vertical ridges 632 protrude and extend from the inner surface 631 of the coupling sleeve 63 along a direction parallel to the longitudinal axis L, as shown for instance in FIG. 4A. Each region between two neighboring vertical ridges 632 of the coupling sleeve 63 of the tubular body 6 may define a vertical guide groove 633. In other words, the coupling sleeve 63 of the tubular body 6 may also comprise a plurality of vertical guide grooves 633, each vertical guide groove 633 extending along a direction parallel to the longitudinal axis L, and each vertical guide groove 633 being positioned between two neighboring vertical ridges 632 of the coupling sleeve 63.

Each vertical ridge 632 of the coupling sleeve 63 may have a top edge 6320 and a bottom edge 6321. Each top edge 6320 of the vertical ridges 632 of the coupling sleeve 63 may be slightly sloped, as shown in FIG. 4A.

Each vertical ridge 632 of the coupling sleeve 63 may have a top edge 6320 comprising a lower level portion 6320B and an upper level portion 6320A. The lower level portion 6320B is in a distal location from the open top 634 of the coupling sleeve 63. The upper level portion 6320A is in a proximate location from the open top 634 of the coupling sleeve 63.

The double start inner threads 552 of the elevator 55 may have a first pitch. The double start inner threads 542 of the tubular screw 54 may have a second pitch. The first pitch of the double start inner threads 552 of the elevator 55 may be the same as the second pitch of double start inner threads 542 of the tubular screw 54.

The top edge 6320 of each vertical ridge 632 may be angled with regard to the longitudinal axis L according to an angle being equal to the first pitch of the double start inner threads 552 of the elevator 55.

The elevator 55 of the telescopic actuator 5 may comprise one or more vertical guides 553 protruding from the outer surface 555 of the elevator 55 and extending along a direction parallel to the longitudinal axis L. The elevator 55 of the telescopic actuator 5 may comprise four vertical guides 553 being positioned at right angles from each other with regard to the longitudinal axis L, as shown in FIG. 22 and FIG. 26.

The vertical guides 553 of the elevator 55 may comprise bottom edges 5530. The bottom edges 5530 of the vertical guides 553 may be rounded, alternatively slightly sloped such that the bottom edges 5530 of the vertical guides 553 of the elevator 55 can readily slide onto the respective slightly sloped top edge 6320 of the vertical ridges 632 of the coupling sleeve 63 when the elevator 55 has translated out from the tubular screw 54.

As shown more in detailed hereinafter, the shape of the bottom edges 5530 of the vertical guides 553 of the elevator 55 can match with the shapes of the top edges 6320 of the vertical ridges 632 of the coupling sleeve 63 to slide over one another.

The bottom edges 5530 of each vertical guide 553 of the elevator 55 and the top edge 6320 of each vertical ridge 632 may be more angled with regard to the longitudinal axis L according to an angle being equal to the first pitch of the double start inner threads 552 of the elevator 55.

Figure 21A:
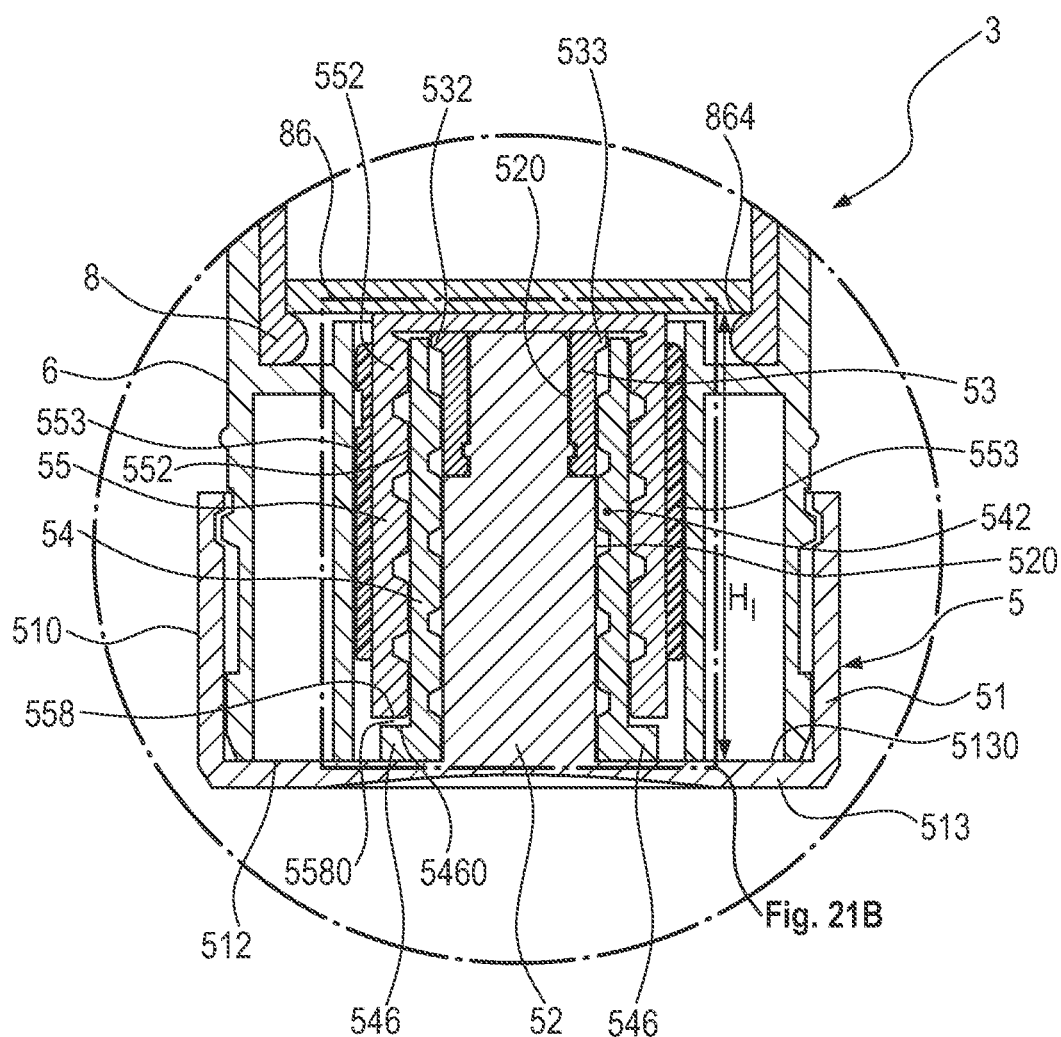
FIG. 21A provides an enlarged view of an area within FIG. 21.
Figure 21B:
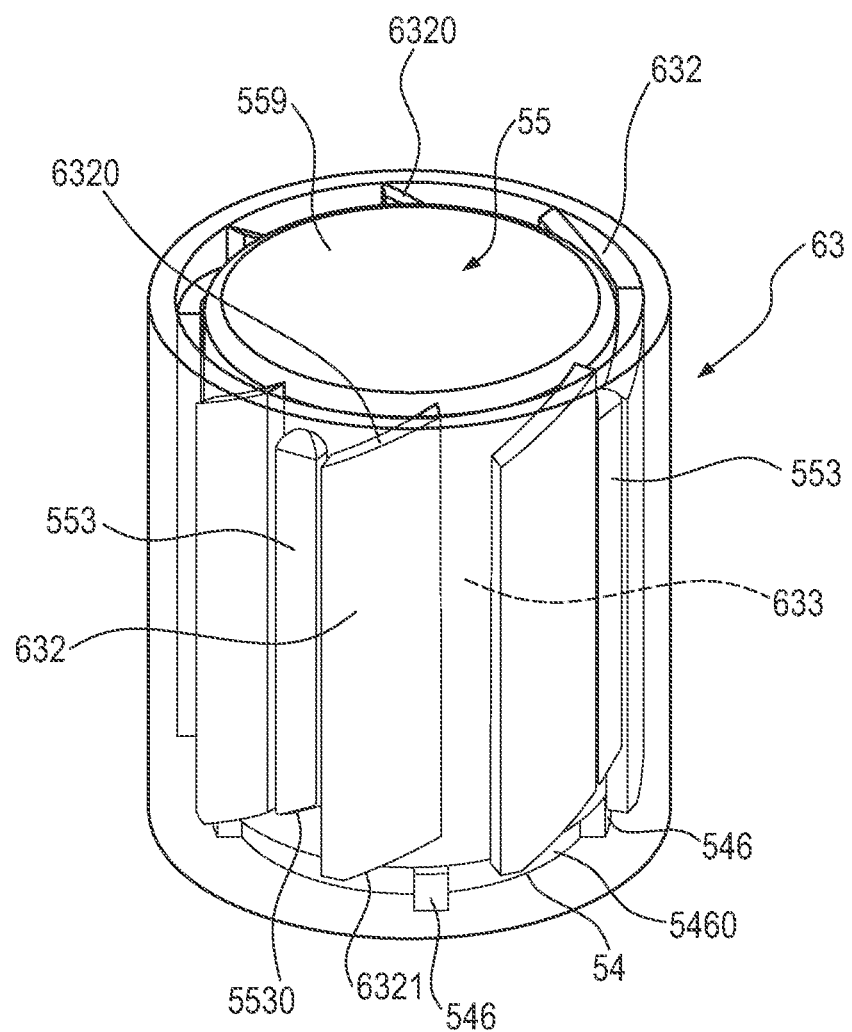
FIG. 21B provides an enlarged view of an area within FIG. 21A, and provides a perspective, and transparent front view of a coupling sleeve of a tubular body in engagement with a lead screw, a tubular screw and an elevator being connected to each other in a rest or collapsed state position.

FIG. 21 with FIGS. 21A-B provides a cross-sectional view showing a telescopic actuator 5 in an initial position, namely in a rest position or in a fully collapsed state. The reusable dispenser 3 comprises a telescopic actuator 5 axially oriented within the tubular body 6 and mounted through the open bottom 62 of the tubular body 6 into the coupling sleeve 63. The leading screw 53, the tubular screw 54 and the elevator 55 of the telescopic actuator 5 are all in engagement in an initial position and are all screwed down in a fully collapsed state, as also shown in FIG. 26.

The telescopic actuator 5 may comprise a clearance gap 5580 between the lower end 558 of the elevator 55 and the upper end 5460 of the spoke 546 to ensure that the tubular screw 54 and the elevator 55 do not bind against each other when being in an initial position, namely in a rest position or in a fully collapsed state (see FIG. 21A).

As shown in FIG. 21 and enlarged views of FIGS. 21A-B, the telescopic actuator 5 is in engagement with the coupling sleeve 63 of the tubular body 6 of the reusable dispenser 3 by engaging the elevator 55 of the telescopic actuator 5 with the coupling sleeve 63 of the tubular body 6. Each vertical guide 553 of the elevator 55 is positioned within a respective vertical guide groove 633 of the coupling sleeve 63 between two neighboring vertical ridges 632. When the hand wheel 51 of the telescopic actuator 5 is turned, the elevator 55 of the telescopic actuator 5 cannot rotate. The elevator 55 of the telescopic actuator 5 can only travel according to a linear displacement along the longitudinal axis L of the reusable dispenser 3, which is controlled by each vertical guide 553 of the elevator 55 when being positioned within a respective vertical guide groove 633 of the coupling sleeve 63.

The telescopic actuator 5 is able to engage with the push plate 86 of the replaceable cartridge 8 in a telescoping manner to deliver the personal care product such that top surface 559 of the elevator 55 telescopes with the bottom surface 864 of the push plate 86 of the replaceable cartridge 8. The push plate 86 of the replaceable cartridge 8 is therefore movably engaged with the elevator 55 of the telescopic actuator 5. The push plate 86 of the replaceable cartridge 8 is designed for linear displacement in a direction along the longitudinal axis L of the reusable dispenser 3.

When the hand wheel 51 of the telescopic actuator 5 is turned in a predetermined direction, the leading screw 53 of the telescopic actuator 5 rotates and the top surface 559 of the elevator 55 advances upwardly, which advances the push plate 86 of the replaceable cartridge 8 upwardly and pushes the personal care product out towards the open top 61 of the tubular body 6.

Figure 27:
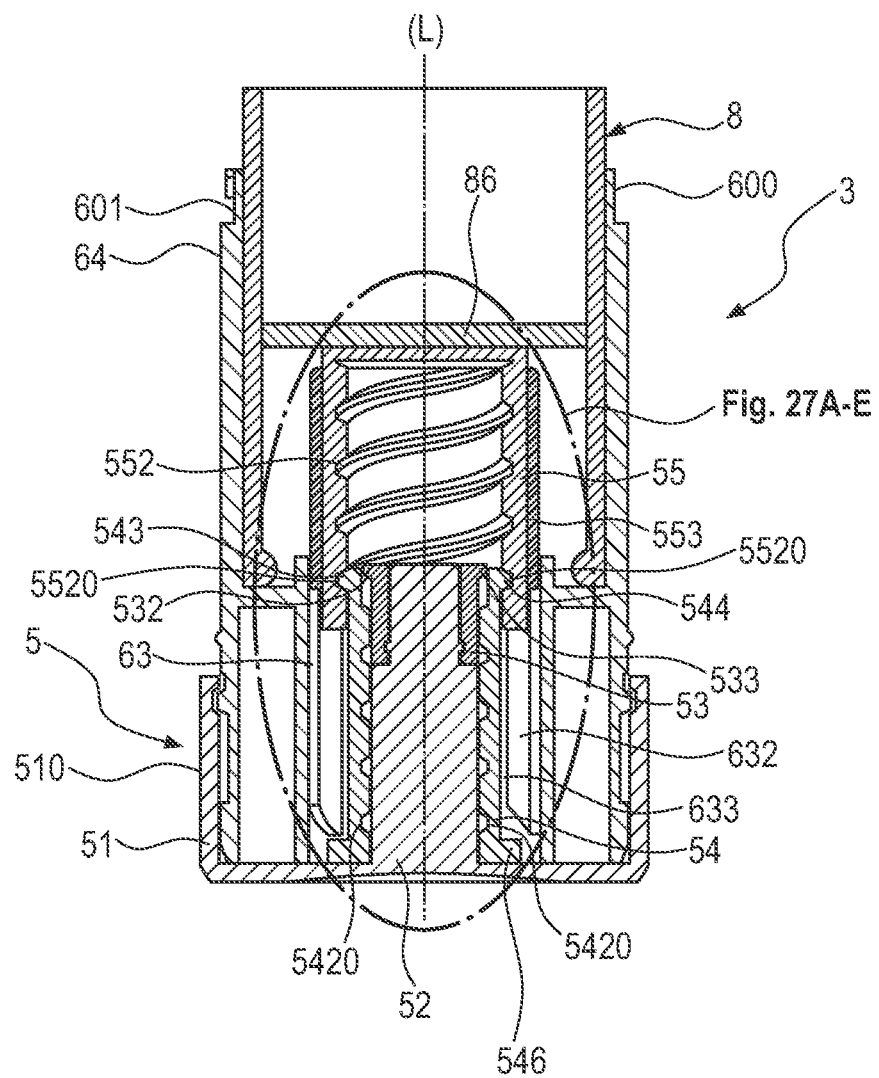
FIG. 27 provides a cross-sectional view of a reusable dispenser comprising a tubular body, a telescopic actuator and a replaceable cartridge when the elevator is translated out from the tubular screw according to one or more aspects.
Figure 27A:
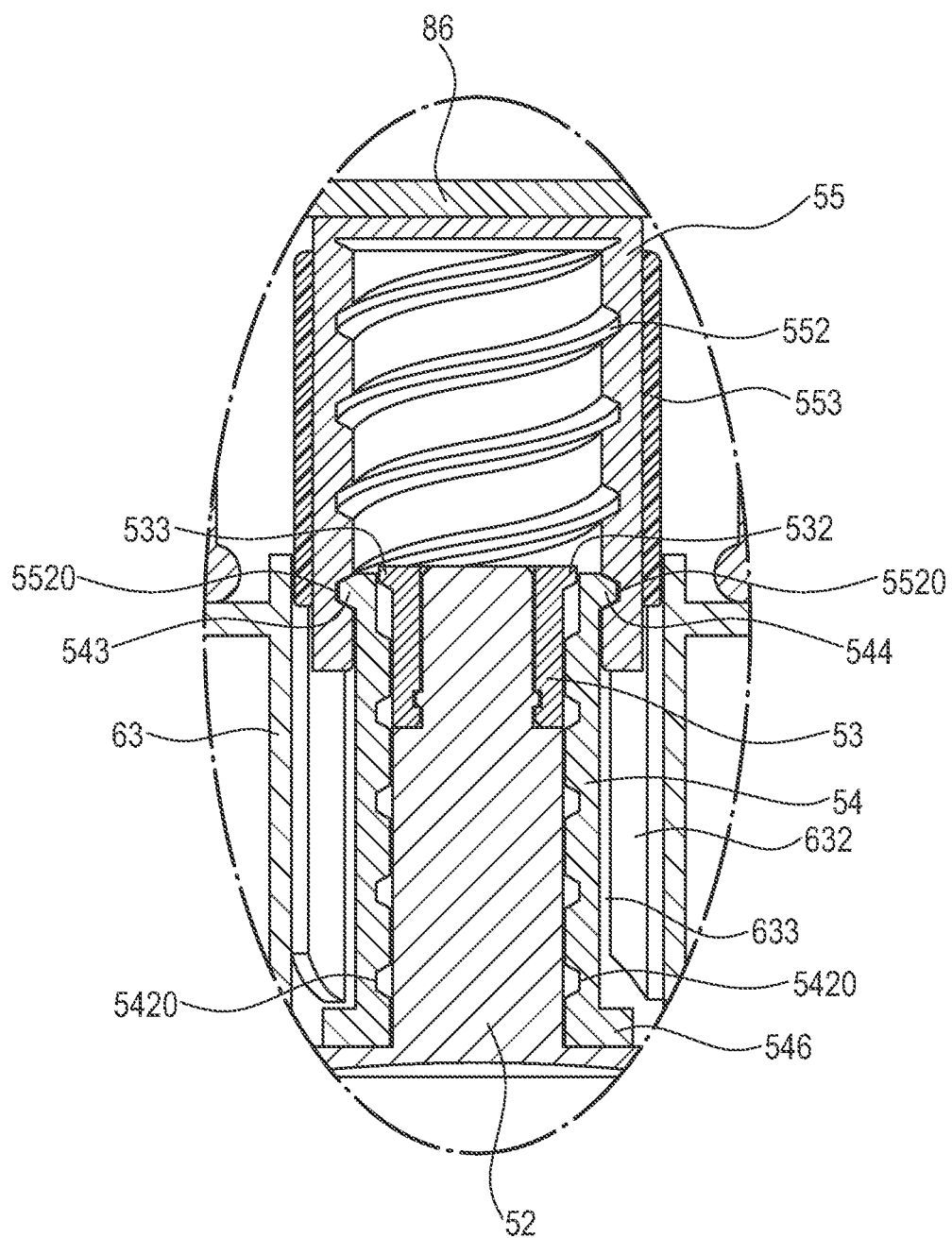
FIG. 27A provides an enlarged view of an area within FIG. 27.
Figure 27B:
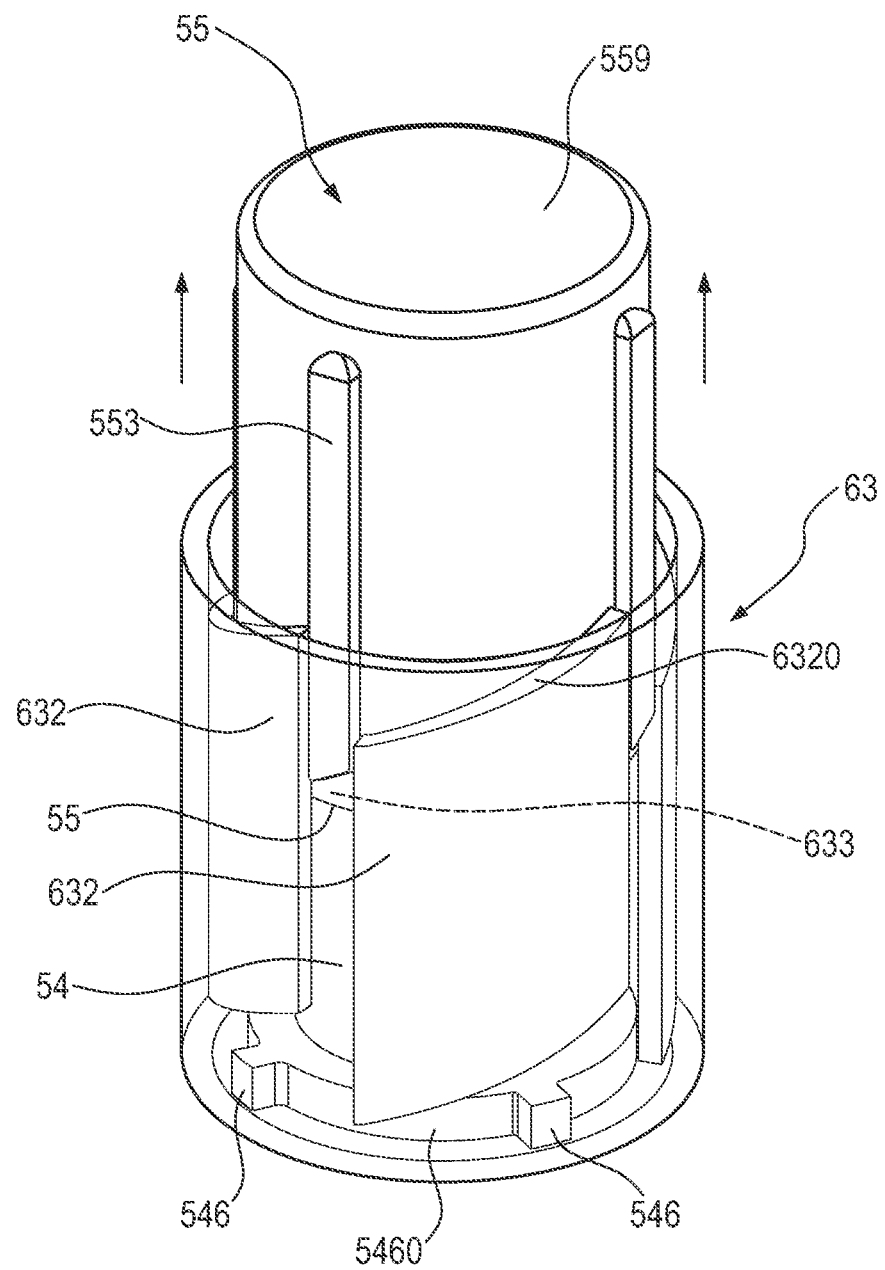
FIG. 27B provides a perspective, and transparent front view of a coupling sleeve of a tubular body in engagement with a lead screw, a tubular screw and an elevator being connected to each other when the elevator starts to be translated out of the tubular screw according to one or more aspects.

As shown in FIGS. 27 and 27A-B, the elevator 55 of the telescopic actuator 5 can only first travel according to a linear and axial displacement along the longitudinal axis L. Such linear and axial displacement is controlled by each vertical guide 553 of the elevator 55 which is positioned within a respective vertical guide groove 633 of the coupling sleeve 63.

Indeed, upon rotation of the leading screw 53 of the telescopic actuator 5 by turning the hand wheel 51 of the telescopic actuator 5 in the predetermined direction, the leading screw 53 and the tubular screw 54 of the telescopic actuator 5 rotates together in unison such that the elevator 55 is translated out from the tubular screw 54. For this, the elevator 55 of the telescopic actuator 5 is translated out from the tubular screw 54 of the telescopic actuator 5 by being guided by the vertical guides 553 of the elevator 55 in engagement with the vertical guide grooves 633 of the coupling sleeve 63 of the tubular body 6.

As set out above, the elevator 55 and the tubular screw 54 of the telescopic actuator 5 cannot detach from each other. The double start inner threads 552 of the elevator 55 extend from the closed top 550 of the elevator 55 to a distal position of the open bottom 551 of the elevator 55 until the respective two opposed lower thread stops 5520 of the elevator 55 such that the tubular screw 54 and the elevator 55 do not detach. Hence, the elevator 55 of the telescopic actuator 5 translates out from the tubular screw 54 until the first and second opposed outer threads (543, 544) of the tubular screw 54 abut the respective two opposed lower thread stops 5520 of the elevator 55.

By the time the elevator 55 has translated out from the tubular screw 54, the first and second opposed outer threads (543, 544) of the tubular screw 54 abut the respective two opposed lower thread stops 5520 of the elevator 55. At that time, the bottom edge 5530 of each vertical guide 553 of the elevator 55 is positioned above a lower level portion 6320B of the top edge 6320 of the respective adjacent vertical ridge 632 of the coupling sleeve 63.

Figure 27C:
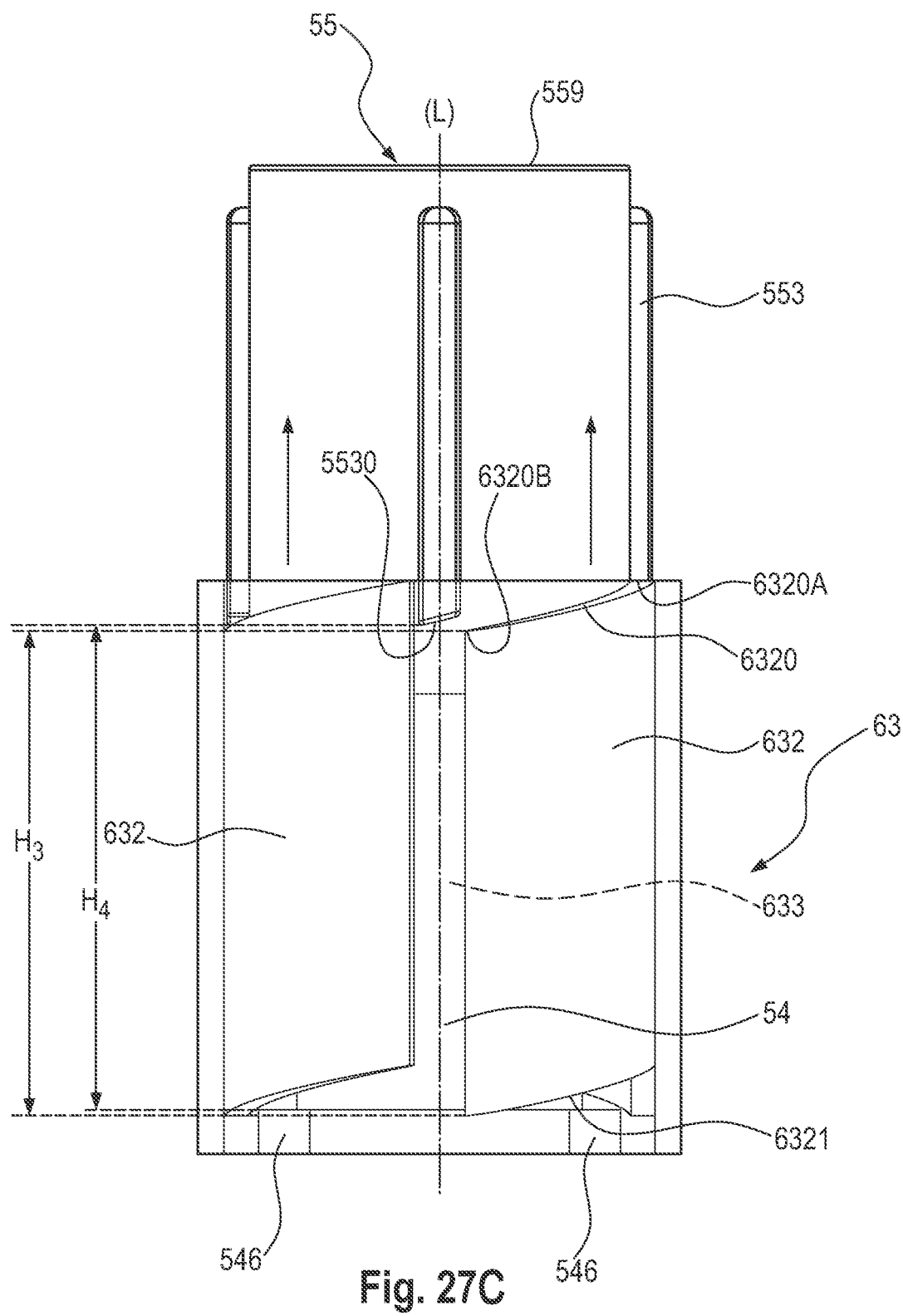
FIG. 27C provides a transparent side view of a coupling sleeve of a tubular body in engagement with a lead screw, a tubular screw and an elevator being connected to each other, when the elevator is translated out of the tubular screw according to one or more aspects.

FIG. 27C provides a transparent side view when the elevator 55 is translated out of the tubular screw 54, the bottom edge 5530 of each vertical guide 553 of the elevator 55 is positioned above a lower level portion 6320B of the top edge 6320 of the respective adjacent vertical ridge 632 of the coupling sleeve 63.

Figure 27D:
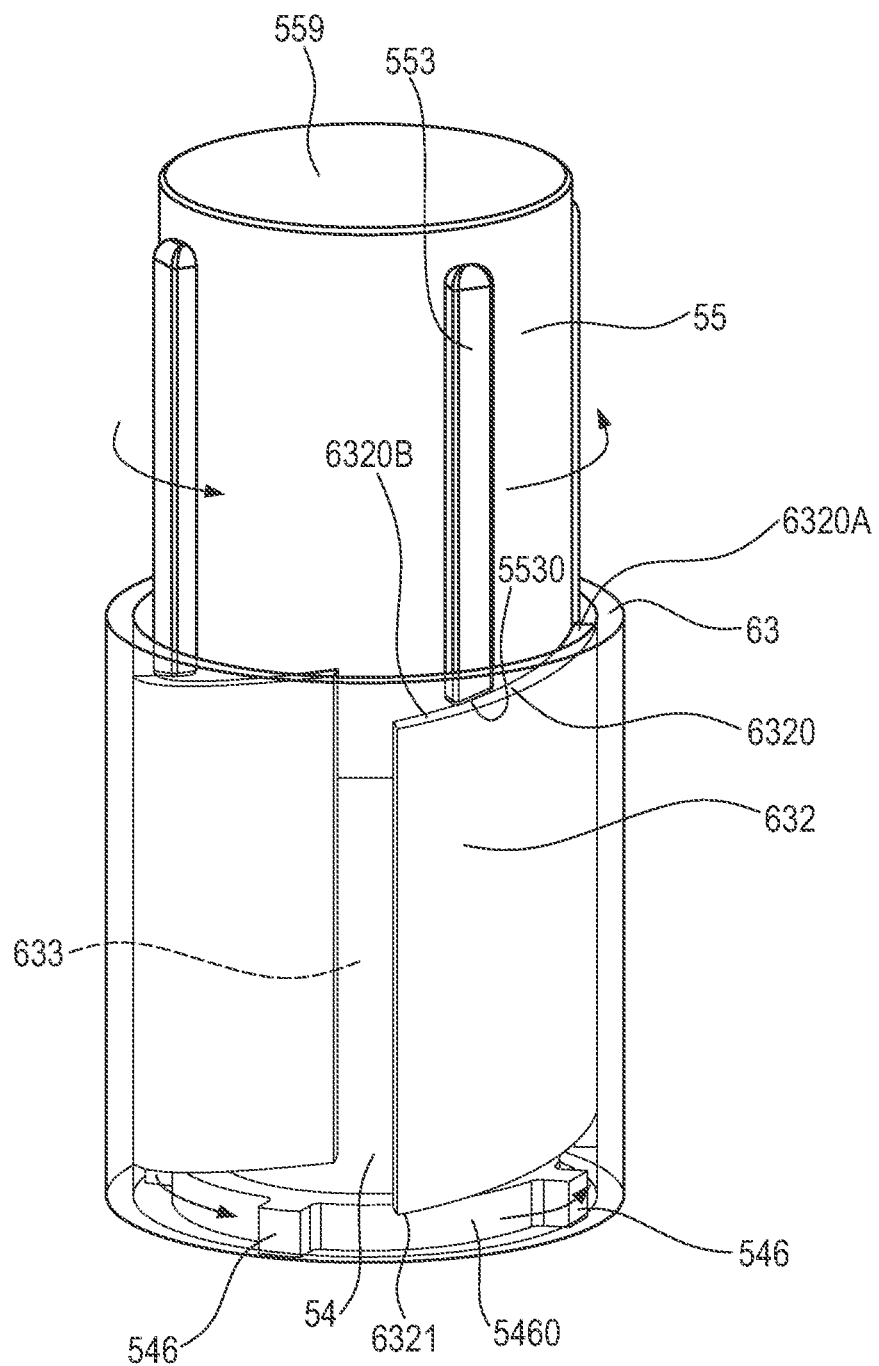
FIG. 27D provides a perspective, and transparent front view of a coupling sleeve of a tubular body in engagement with a lead screw, a tubular screw and an elevator being connected to each other when the bottom edges of the vertical guides of the elevator ride onto the top edges of neighboring vertical ridges of the coupling sleeve according to one or more aspects.

When the elevator 55 of the telescopic actuator 5 has been translated out from the tubular screw 54, a further rotation of the hand wheel 51 in the same predetermined direction will force the tubular screw 54 and the elevator 55 to rotate together. Each vertical guide 553 of the elevator 55 may ride on the adjacent vertical ridge 632 of the coupling sleeve 63 such that each spoke 546 of the tubular screw 54 engages with an adjacent vertical guide groove 633 of the coupling sleeve 63. The bottom edge 5530 of each vertical guide 553 of the elevator 55 may ride onto a top edge 6320 of the adjacent vertical ridge 632 of the coupling sleeve 63. Alternatively, the bottom edge 5530 of each vertical guide 553 of the elevator 55 may first ride from the lower level portion 6320B to the upper level portion 6320A of the top edge 6320 of the adjacent vertical ridge 632 of the coupling sleeve 63, as shown for instance in FIG. 27D.

A vertical ridge 632 of the coupling sleeve may have a height H3 as measured from the top edge 6320 to the bottom edge 6321 of the vertical ridge 632, along the longitudinal axis L. When the elevator 55 has translated out from tubular screw 54, the vertical guide 553 of the elevator 55 is at a height H4 from the annular ring 5460 of the tubular screw 54. The height H4 of the vertical guide 553 can be measured from the lowermost position of the bottom edge 5530 of the vertical guide 553 to the uppermost position of the annular ring 5460 of the tubular screw 54, along the longitudinal axis L. In order that each vertical guide 553 of the elevator 55 can ride on the top edge 6320 of the respective adjacent vertical ridge 632 (following the rotation of the hand wheel 51 in the same predetermined direction), the height H4 of the vertical guide 553 from the annular ring 5460 of the tubular screw 54 shall be relatively slightly higher than the height H3 of the vertical ridge 62 of the coupling sleeve 63.

If the height H4 of the vertical guide 553 from the annular ring 5460 of the tubular screw 54 is well below than the height H3 of the vertical ridge 62 of the coupling sleeve 63, each vertical guide 553 of the elevator 55 cannot readily ride on the adjacent vertical ridge 632 of the coupling sleeve 63. Then, each spoke 546 of the tubular screw 54 need to be located in a more proximal position to the next vertical guide groove 633 to be able to engage with the adjacent vertical guide groove 633 of the coupling sleeve 63.

If the height H4 of the vertical guide 553 from the annular ring 5460 of the tubular screw 54 is well above than the height H3 of the vertical ridge 62 of the coupling sleeve 63, each vertical guide 553 of the elevator 55 can ride on the adjacent vertical ridge 632 of the coupling sleeve 63, however with a delay effect. Then, each spoke 546 of the tubular screw 54 need to be located in a more distal position to the next vertical guide groove 633 to be able to engage with the adjacent vertical guide groove 633 of the coupling sleeve 63.

Figure 27E:
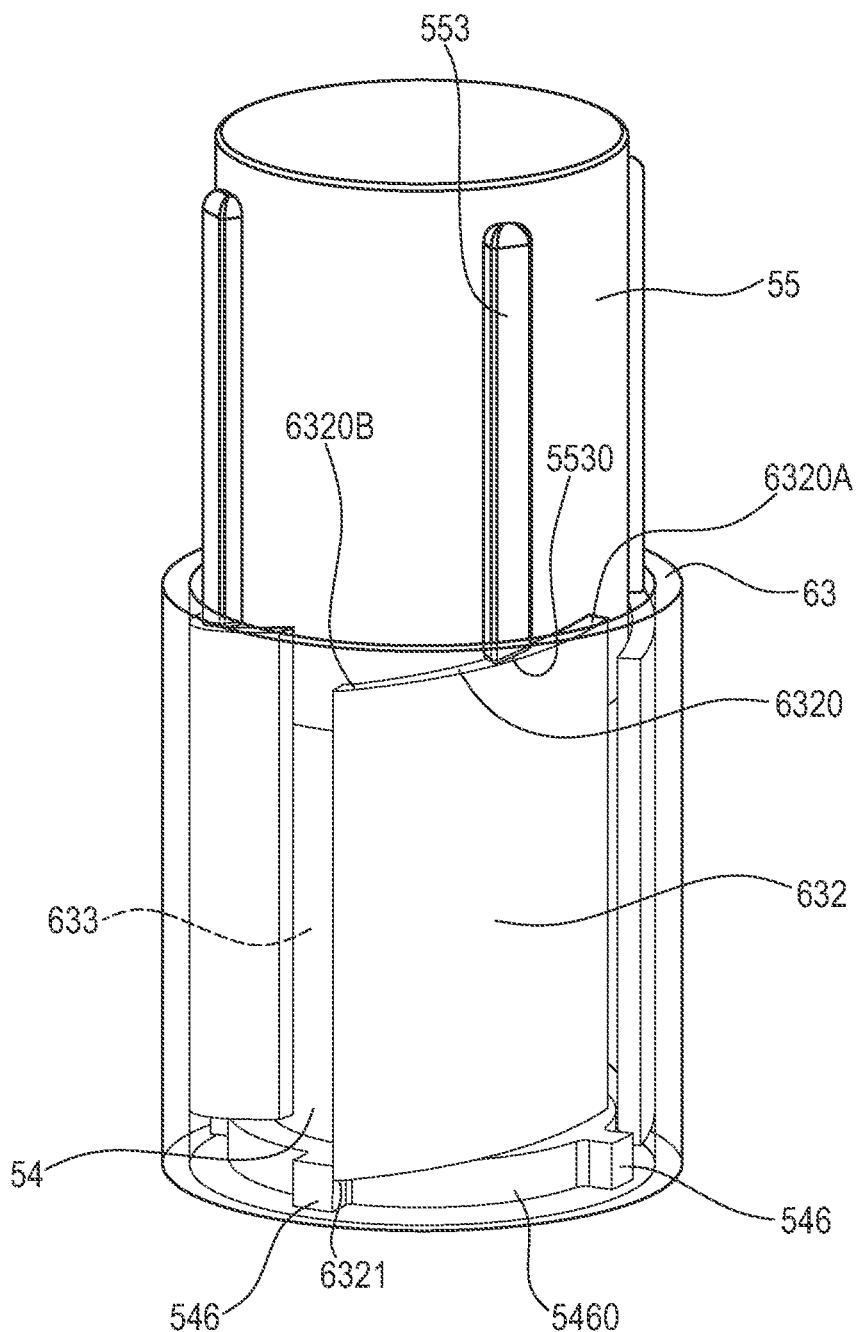
FIG. 27E provides a perspective, and transparent front view of a coupling sleeve of a tubular body in engagement with a lead screw, a tubular screw and an elevator being connected to each other when the spokes of the tubular screw engage with the vertical grooves of the coupling sleeve according to one or more aspects.

FIG. 27E provides an enlarged view of FIG. 27 when the elevator 55 of the telescopic actuator 5 has been translated out from the tubular screw 54. Each vertical guide 553 of the elevator 55 rides onto the top edge 6320 of the respective adjacent vertical ridge 632 of the coupling sleeve 63. It follows that the tubular screw 54 rotates such that each spoke 546 of the tubular screw 54 engages with the respective adjacent vertical guide groove 633 of the coupling sleeve 63.

When the bottom edge 5530 of each vertical guide 553 of the elevator 55 rides from the lower level portion 6320B to the upper level portion 6320A of the top edge 6320 of the adjacent vertical ridge 632 and before reaching the respective upper level portion 6320A, the corresponding spoke 546 of the tubular screw 54 may rotate until abutting the adjacent vertical ridge 632 at a location at or adjacent to the lower end 636 of the coupling sleeve 63.

The bottom edges 5530 of each vertical guide 553 of the elevator 55 and the top edge 6320 of each vertical ridge 632 may be more angled with regard to the longitudinal axis L according to an angle being equal to the first pitch of the double start inner threads 552 of the elevator 55.

The tubular screw 54 of the telescopic actuator 5 may comprise two or more spokes 546; and the coupling sleeve 63 may comprise four or more vertical ridges 632. The tubular screw 54 of the telescopic actuator 5 may comprise two spokes 546 being positioned at a r angle from each other with regard to the longitudinal axis L; and the coupling sleeve 63 may comprise four vertical ridges 632 being positioned at a $\pi/2$ angle from each other with regard to the longitudinal axis L. Hence, the coupling sleeve 63 may comprise four vertical guide grooves 633 being positioned at a $\pi/2$ angle from each other with regard to the longitudinal axis L.

The tubular screw 54 of the telescopic actuator 5 may comprise four spokes 546 being positioned at right angles ($\pi/2$) from each other with regard to the longitudinal axis L; and the coupling sleeve 63 may comprise eight vertical ridges 632 being positioned at a $\pi/4$ angle from each other with regard to the longitudinal axis L. Hence, the coupling sleeve 63 may comprise eight vertical guide grooves 633 being positioned at a $\pi/4$ angle from each other with regard to the longitudinal axis L.

FIG. 21B provides a perspective view of a coupling sleeve 63 of a tubular body 6 having 8 vertical ridges 632 being positioned at a $\pi/4$ angle from each other with regard to the longitudinal axis L, the coupling sleeve 63 being in engagement with a lead screw 53, a tubular screw 54 and an elevator 55 being connected to each other, wherein the tubular screw 54 of the telescopic actuator 5 may comprise four spokes 546 being positioned at right angles ($\pi/2$) from each other with regard to the longitudinal axis L.

The tubular screw 54 of the telescopic actuator 5 may comprise four spokes 546 being positioned at right angles ($\pi/2$) from each other with regard to the longitudinal axis L; and the coupling sleeve 63 may comprise four vertical ridges 632 being positioned at a $\pi/2$ angle from each other with regard to the longitudinal axis L. Hence, the coupling sleeve 63 may comprise four vertical guide grooves 633 being positioned at a $\pi/2$ angle from each other with regard to the longitudinal axis L.

FIG. 27B provides a perspective view of a coupling sleeve 63 of a tubular body 6 having 4 vertical ridges 632 being positioned at a $\pi/2$ angle from each other with regard to the longitudinal axis L, the coupling sleeve 63 being in engagement with a lead screw 53, a tubular screw 54 and an elevator 55 being connected to each other, wherein the tubular screw 54 of the telescopic actuator 5 may comprise four spokes 546 being positioned at right angles ($\pi/2$) from each other with regard to the longitudinal axis L.

Upon engagement of the spokes 546 of the tubular screw 54 with the vertical guide grooves 633 of the coupling sleeve 63, when the hand wheel 51 of the telescopic actuator 5 is further turned in the same predetermined direction, the leading screw 53 and the elevator 55 now may rotate together in unison such that the tubular screw 54 is translated out from the leading screw 53. The telescopic actuator 5 thus reaches a final position of maximum extension.

As long as the spokes 546 of the tubular screw 54 are not engaged with the vertical guide grooves 633 of the coupling sleeve 63, the tubular screw 54 of the telescopic actuator 5 cannot translate out from the leading screw 53.

Figure 28:
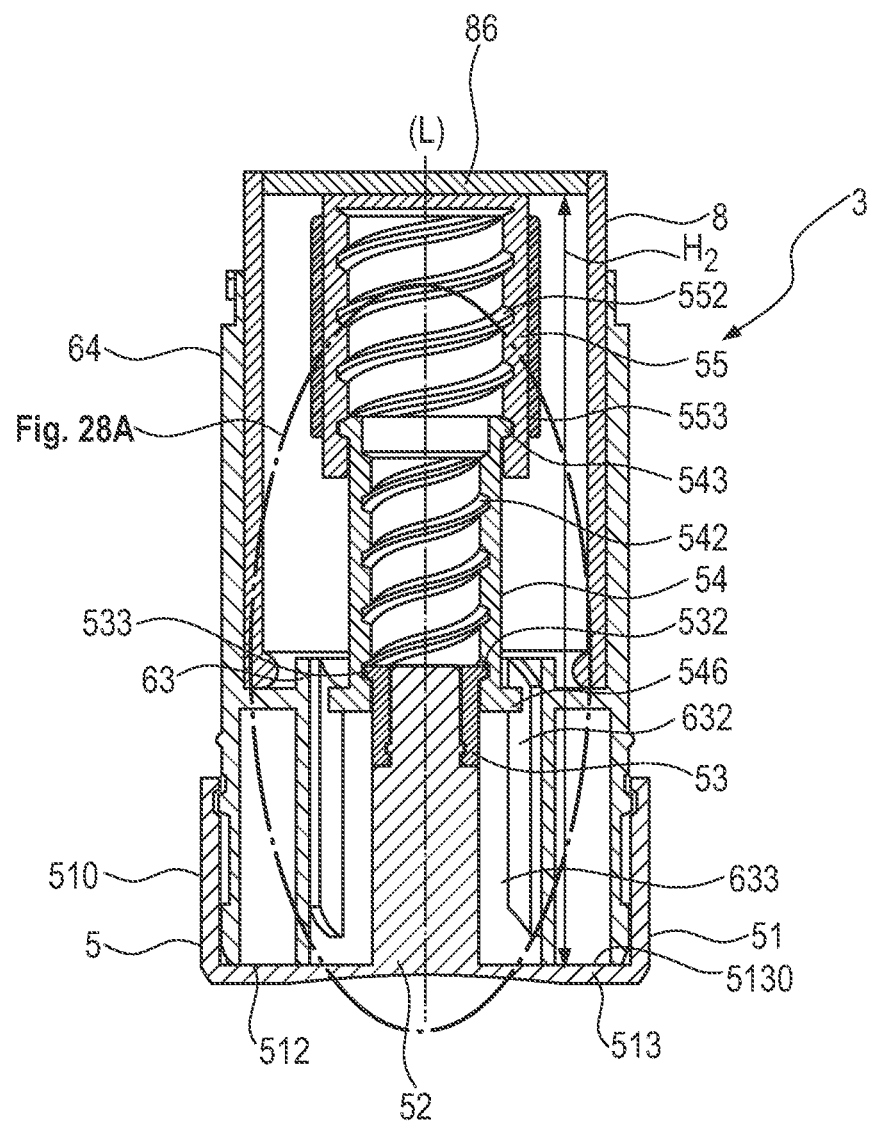
FIG. 28 provides a cross-sectional view of a reusable dispenser comprising a tubular body, a telescopic actuator and a replaceable cartridge when the tubular screw is translated out from the leading screw according to one or more aspects.
Figure 28A:
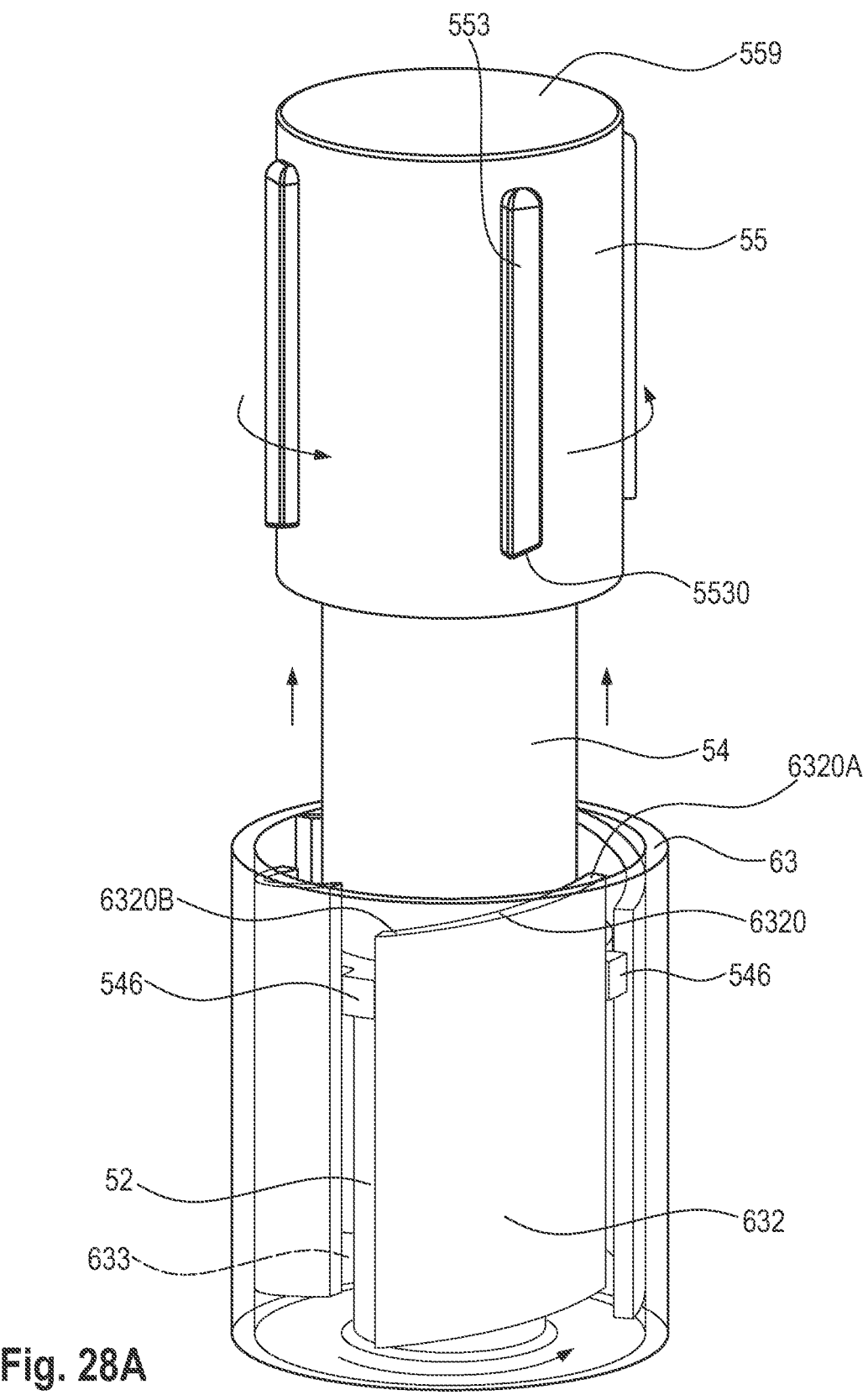
FIG. 28A provides a perspective, and transparent front view of an enlarged view of an area within FIG. 28.

As shown in FIG. 28 and FIG. 28A, the tubular screw 54 may translate out from the leading screw 53 of the telescopic actuator 5 when the hand wheel 51 of the telescopic actuator 5 is further turned in the same predetermined direction. The leading screw 53 of the telescopic actuator 5 further rotates in the same predetermined direction. Since the spokes 546 of the tubular screw 54 are engaged within the respective vertical guide grooves 633 of the coupling sleeve 63, the tubular screw 54 of the telescopic actuator 5 cannot rotate around the longitudinal axis L.

In that case, the tubular screw 54 of the telescopic actuator 5 is movably engaged with the coupling sleeve 63 of the tubular body 6. The tubular screw 54 of the telescopic actuator 5 is in linear and axial displacement in a direction along the longitudinal axis L of the reusable dispenser 3. When the tubular screw 54 of the telescopic actuator 5 translates out from the leading screw 53, it follows that the top surface 559 of the elevator 55 advances upwardly, which advances the push plate 86 of the replaceable cartridge 8 upwardly and pushes the personal care product out towards the open top 61 of the tubular body 6.

In any cases, the tubular screw 54 and the leading screw 53 of the telescopic actuator 5 cannot detach from each other. As explained above, the double start inner threads 542 of the tubular screw 54 extend from the open top 540 of the tubular screw 54 to a distal position of the open bottom 541 of the tubular screw 54 such that the leading screw 53 and the tubular screw 54 do not detach. Hence, the tubular screw 54 of the telescopic actuator 5 translates out from the leading screw 53 until the first and second opposed outer threads (532, 533) of the leading screw 53 abut the respective two opposed lower thread stops 5420 of the tubular screw 54, as shown for instance in FIG. 28.

Also, the tubular screw 54 of the telescopic actuator 5 may translate out from the leading screw 53 until before each spoke 546 of the tubular screw 54 is positioned above a lower level portion 6320B of the top edge 6320 of the respective adjacent vertical ridge 632 of the coupling sleeve 63, as shown for instance in FIG. 28A.

From a fully collapsed state, at an initial position, to a fully extended state, at a final position, the telescopic actuator 5 can extend because the elevator 55 can translate relative to its adjacent tubular screw 54, and the tubular screw 54 can translate relative to its adjacent leading screw 53.

To reverse the process and collapse the telescopic actuator 5 in its initial position, the rotation of the hand wheel 51 of the telescopic actuator 5 may be reversed, which cause the tubular screw 54 to travel back onto the leading screw 53, until the bottom edges 5530 of the vertical guides 553 of the elevator 55 engage with the respective top edges 6320 of the vertical ridges 632 of the coupling sleeve 63. Thereafter, at that point, further rotational force applied to the leading screw 53 will cause the elevator 55 to travel back onto the tubular screw 54. This process may be continued until the telescopic actuator 5 has returned to its completely collapsed state.

Such collapsing telescopic actuator 5 can help to provide an improved compact reusable dispenser 3 while the volume size of the replaceable cartridge remains the same as the current marketed product chambers for personal care products. The volume size of the replaceable cartridge 8 may be defined by the volume size of the tubular body 6 at the upper top portion 66. The reusable dispenser 3 remains compact as much as possible because the telescopic actuator 5 can extend from a fully collapsed state to a fully extended state.

A tubular screw 54 of the telescopic actuator 5 may not be limited to one single tubular screw 54. A tubular screw 54 of the telescopic actuator 5 may comprise one or more tubular screws 54 that are rotatably keyed to each other, such each tubular screw 54 translates relative to its adjacent tubular screw 54.

Hence, the telescopic actuator 5 with its collapsing and extending construction can help to provide relatively reduced size reusable dispensers 3 and offer improved compact dispensing packages 1. The push plate 86 of the replaceable cartridge 8 may move upwardly in a linear direction along the longitudinal axis L until the open top 84 of the replaceable cartridge 8 at most.

Figure 9:
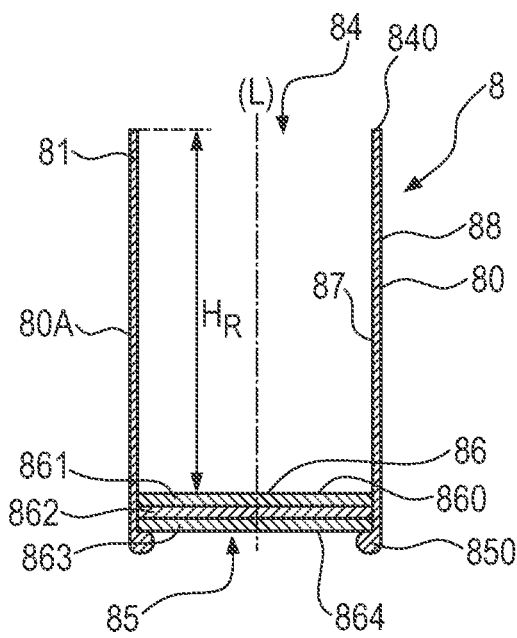
FIG. 9 provides a cross-sectional view of a replaceable cartridge according to one or more aspects.

Indeed, the inside of the replaceable cartridge 8 may have a height Hr as measured in a direction parallel along the longitudinal axis L from the top surface 860 of the push plate 86 to the open top 84 of the replaceable cartridge 8 (See for instance FIG. 9).

The telescopic actuator 5 may have two heights, a first minimum height $H_1$ at an initial position, i.e. a fully collapsed state (See FIG. 21A); and a second maximum height $H_2$ when the hand wheel 51 of the telescopic actuator 5 has been turned such that the telescopic actuator 5 is at a position of maximum extension. In that position of maximum extension, the elevator 55 has been translated out from the tubular screw 54, and the tubular screw 54 has been translated out the leading screw 53 (See FIG. 28).

The first minimum height $H_1$ of the telescopic actuator 5 may be measured in a direction parallel along the longitudinal axis L from the top surface 559 of the elevator 55 to the inner surface 5130 at the bottom 513 of the hand wheel 51. The first minimum height $H_1$ of the telescopic actuator 5 is the height when the telescopic actuator 5 is in an initial position, i.e. a rest position or a fully collapsed state, namely when the leading screw 53, the tubular screw 54 and the elevator 55 of the telescopic actuator 5 are all initially screwed down.

The second maximum height $H_2$ of the telescopic actuator 5 may be measured in a direction parallel along the longitudinal axis L from the top surface 559 of the elevator 55 to the inner surface 5130 at the bottom 513 of the hand wheel 51, and be the maximum height when the telescopic actuator 5 is in a final position, i.e. a maximum extended position, namely when the leading screw 53, the tubular screw 54 and the elevator 55 of the telescopic actuator 5 have been all translated out. The second maximum height $H_2$ of the telescopic actuator 5 is also the sum of the heights of the central shaft 52 with the leading screw 53, the tubular screw 54 and the elevator 55.

In order to provide a compact reusable dispenser, the dispensing package (1) may include a ratio between the first minimum height $H_1$ and the second maximum height $H_2$ of the telescopic actuator 5 ranging from about 5:3 to about 2:1, alternatively from about 5:3 to about 3:2.

Alternatively or also, in order to provide a compact reusable dispenser, the dispensing package (1) may include a compacting ratio between the first minimum height $H_1$ of the telescopic actuator 5 and the height Hr of the replaceable cartridge 8 ranging from about 5:3 to about 2:1, alternatively from about 5:3 to about 3:2.

As mentioned hereinbefore, the push plate 86 of the replaceable cartridge 8 may comprise first, second and third layers (861, 862, 863). The first layer 861 of the push plate 86 is positioned towards the open top 84 of the replaceable cartridge 8. The third layer 863 of the push plate 86 is positioned towards the open bottom 85 of the replaceable cartridge 8. The second layer 862 of the push plate 86 is positioned between the first and third layer (861, 863) of the push plate 86, as shown for instance in FIG. 10, when the upper end 81 of the replaceable cartridge 8 may have a sharped edge 840; or for instance in FIG. 12, when the upper end 81 of the replaceable cartridge 8 may have a rounded edge 845.

A portion of the third layer 863 of the push plate 86 may been cut out such that the top surface 559 of the elevator 55 of the telescopic actuator 5 can better adhere with a bottom surface 862B of the second layer 862 of the push plate 86.

The top surface 559 of the elevator 55 may have a diameter $d_E$ which is measured from two points diametrically opposed at the top surface 559 of the elevator 55 in a transversal direction perpendicular to the longitudinal axis L, as shown for instance in FIG. 22.

The bottom surface 862B of the second layer 862 of the push plate 86 may have a diameter d2B which is measured from two points diametrically opposed at bottom surface 862B of the second layer 862 in a transversal direction perpendicular to the longitudinal axis L, as shown for instance in FIG. 10 or FIG. 12.

The diameter $d_E$ of the top surface 559 of the elevator 55 may be equal from ⅓ up to the diameter d2B, alternatively equal from ½ up to the diameter d2B, alternatively equal from ⅔ up to the diameter d2B of the bottom surface 862B of the second layer 862.

By providing such construction of the push plate 86, the top surface 559 of the elevator 55 can better engage with the push plate 86 of the replaceable cartridge 8, which optimizes the telescoping motion between the telescopic actuator 5 and the replaceable cartridge 8.

Figure 29:
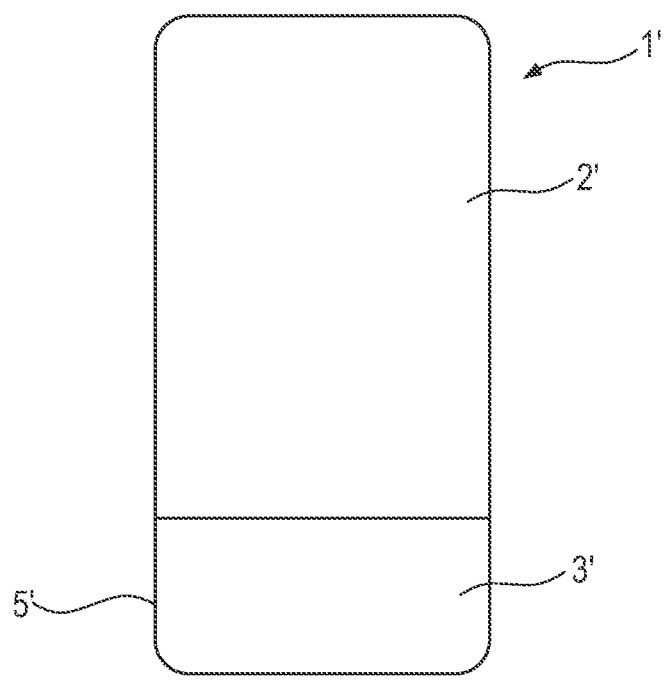
FIG. 29 provides a front view of another dispensing package for a spreadable personal care product shown and described herein in a closed position.

Alternatively, less preferred, another reusable dispenser 3' may be provided, as shown for instance in FIG. 29. The tubular body 6' of the reusable dispenser 3' may be provided to be relatively large in height for including a non-collapsing telescopic actuator 5'.

The reusable dispenser 3' comprises a longitudinal axis L'; a tubular body 6' and a telescopic actuator 5'. The reusable dispenser 3' comprises a telescopic actuator 5' axially oriented within the tubular body 6' and mounted through the open bottom 62' of the tubular body 6' into the coupling sleeve 63'.

Figure 30:
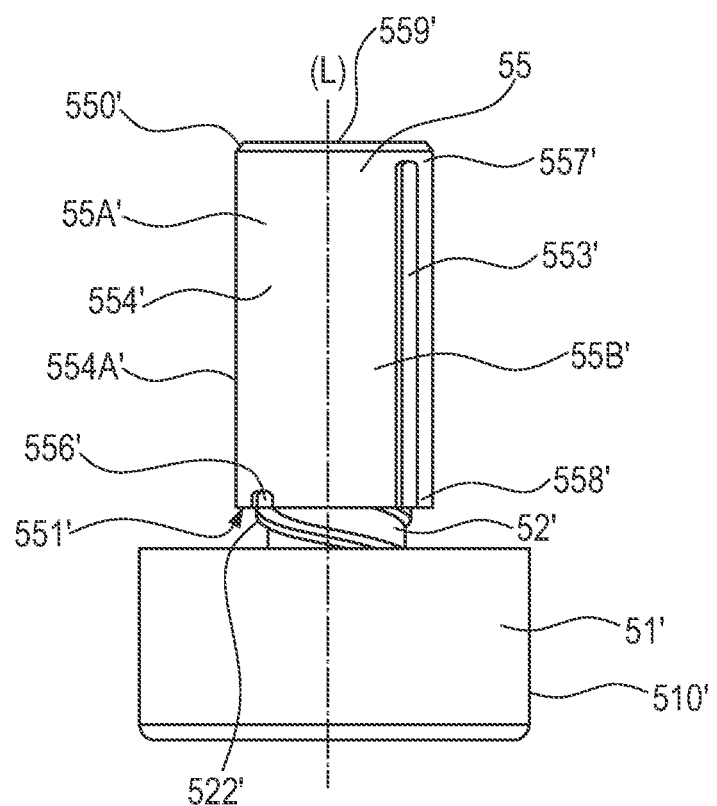
FIG. 30 provides a perspective, front view of another telescopic actuator of a reusable dispenser according to one or more aspects.

The telescopic actuator 5' may comprise a hand wheel 51', a central shaft 52' and an elevator 55', as shown for instance in FIG. 30.

The telescopic actuator 5' may comprise a hand wheel 51' having an inner surface 512' and a perimeter wall 510'. The perimeter wall 510' of the telescopic actuator 5' may extend around the lower bottom portion 67' of the tubular body 6'.

The telescopic actuator 5' may additionally comprise a central shaft 52' connected to the hand wheel 51' of the telescopic actuator 5'. The central shaft 52' of the telescopic actuator 5' may extend from the inner surface 512' of the hand wheel 51' into the coupling sleeve 63' of the tubular body 6' along the longitudinal axis L'. The central shaft 52' of the telescopic actuator 5' may comprise outer threads 522'.

The central shaft 52' of the telescopic actuator 5' may be a separate member that is formed separately and then attached to the inner surface 512' of the hand wheel 51'. Alternatively, the central shaft 52' of the telescopic actuator 5' may be integrally formed with the inner surface 512' of the hand wheel 51', as shown for instance in FIG. 32 and FIG. 33.

The telescopic actuator 5' may further comprise an elevator 55'. The elevator 55' of the telescopic actuator 5' may comprise a side wall 554' having an outer surface 554A' and an inner surface 554B'. The elevator 55' of the telescopic actuator 5' may include an upper end 557' and a lower end 558' opposed to the upper end 557' of the elevator 55'. The elevator 55' of the telescopic actuator 5' may include a closed top 550' at the upper end 557' of the elevator 55' and an open bottom 551' at the lower end 558' of the elevator 55'. The closed top 550' of the elevator 55' has a top surface 559'. The closed top 550', the open bottom 551' and the side wall 554' of the elevator 55' may define a threaded cavity. The threaded cavity of the elevator 55' may have inner threads 552'. The inner threads 552' of the elevator 55' extend from the closed top 550' of the elevator 55' to a distal position of the open bottom 551' of the elevator 55'.

The threaded cavity of the elevator 55' having inner threads 552' is adapted to receive the central shaft 52' having outer threads 522' in a threaded telescoping relation. In other words, the central shaft 52' is threadedly engaged with the elevator 55' by engaging the outer threads 522' of the central shaft 52' with the inner threads 552' of the elevator 55'.

Figure 32:
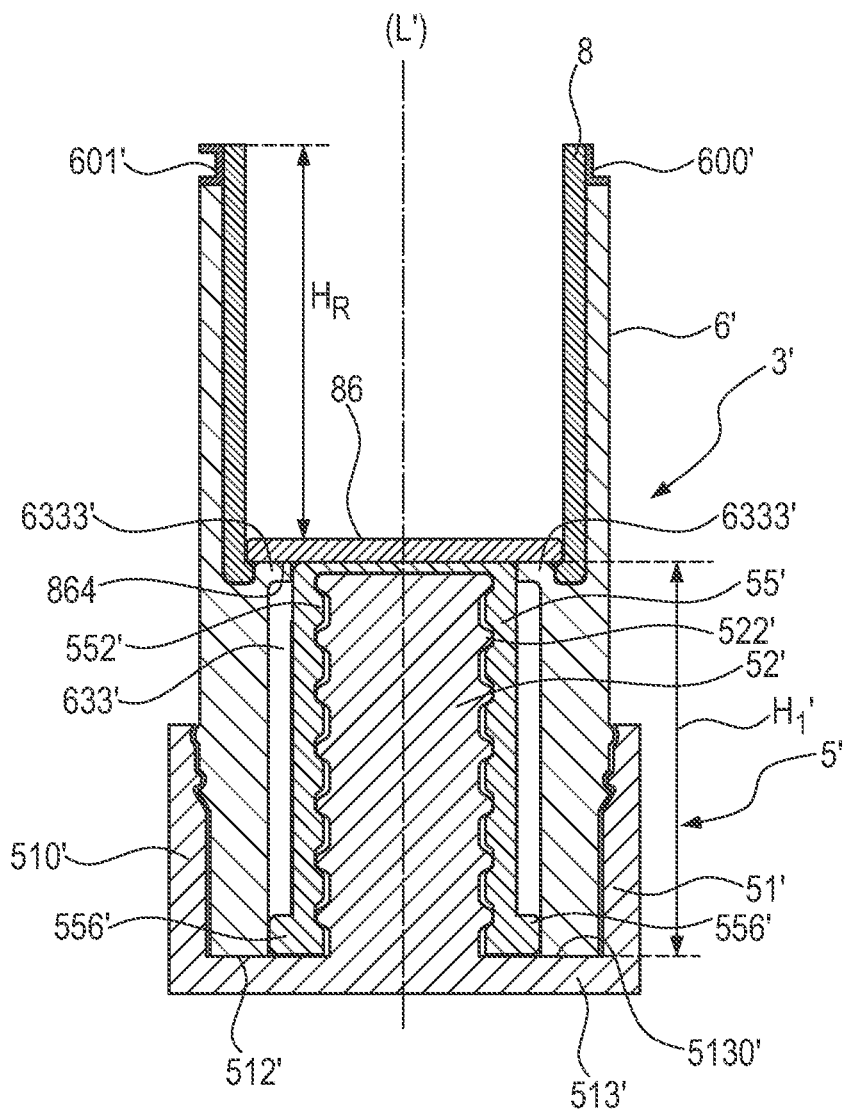
FIG. 32 provides a cross-sectional view of a reusable dispenser comprising the tubular body of FIG. 31 and the telescopic actuator of FIG. 30 in a rest or collapsed state position, according to one or more aspects.

FIG. 32 provides a cross-sectional view of a reusable dispenser 3' comprising a tubular body 6', a telescopic actuator 5' and a replaceable cartridge 8 in a rest position.

When the reusable dispenser 3' is in a rest position, namely an initial position, the elevator 55' of the telescopic actuator 5' is in its lowermost position, as shown in FIG. 32. That is with the open bottom 551' of the elevator 55' abutting against the inner surface 512' of the hand wheel 51'.

The elevator 55' of the telescopic actuator 5' further includes a top surface 559' to abut against the bottom surface 864 of the push plate 86 of the replaceable cartridge 8, whereby when the hand wheel 51' of the telescopic actuator 5' is turned in a predetermined direction, the central shaft 52' of the telescopic actuator 5' rotates advancing the top surface 559' of the elevator 55' and the push plate 86' of the replaceable cartridge 8 and thereby advancing the spreadable personal care product out of the open top 84 of the replaceable cartridge 8.

When the replaceable cartridge 8 is inserted into the tubular body 6' of the reusable dispenser 3' and locked in place, for instance by the locking ring 7, the top surface 559' of the elevator 55' will abut against the push plate 86 of the replaceable cartridge 8. Thereafter, when the hand wheel 51' of the telescopic actuator 5' is turned in a predetermined direction (depending on the direction of the threads), the central shaft 52' having outer threads 522' rotates so that the elevator 55' of the telescopic actuator 5' will move upwardly, whereby the top surface 559' of the elevator 55' will force the push plate 86 of the replaceable cartridge 8 up and the push plate 86 will push the spreadable personal care product up and out of the reusable dispenser 3' so that the consumer can have access to it and apply it to the skin.

The elevator 55' of the telescopic actuator 5' may comprise inner threads 552' that extend from the closed top 550' of the elevator 55' to a distal position of the open bottom 551' of the elevator 55' such that the central shaft 52' and the elevator 55' do not detach. Such construction can help for preventing the elevator 55' of the telescopic actuator 5' from disengaging the central shaft 52' of the telescopic actuator 5' and falling out of the tubular body 6' of the reusable dispenser 3'.

Alternatively, other means for preventing the elevator 55' from disengaging the central shaft 52' of the telescopic actuator 5' may be considered such as providing tapered bulbs disposed at an upper end of the central shaft 52' of the telescopic actuator 5'.

The central shaft 52' of the telescopic actuator 5' may be initially inserted inside the threaded cavity of the elevator 55'. For instance, the elevator 55' may be divided into two halves (55'A, 55'B) along the longitudinal axis L that can be joined together around central shaft 52' of the telescopic actuator 5' such that the outer threads 522' of the central shaft 52' are engaged with the inner threads 552' of the elevator 55'.

In order to better guide the elevator 55' pushing upwardly the push plate 86 of the replaceable cartridge 8, other features may be implemented to the elevator 55' of the telescopic actuator 5'.

The coupling sleeve 63' of the tubular body 6' may have an inner surface 631'. The coupling sleeve 63' of the tubular body 6' may comprise two opposed first vertical guide grooves 632' recessing from the inner surface 631' of the coupling sleeve 63' along a direction parallel to the longitudinal axis L. The two opposed first vertical guide grooves 632' of the coupling sleeve 63' may have open upper ends 6322'.

Also, the coupling sleeve 63' of the tubular body 6' may comprise two opposed second vertical guide grooves 633' recessing from the inner surface 631' of the coupling sleeve 63' along a direction parallel to the longitudinal axis L. The two opposed second vertical guide grooves 633' of the coupling sleeve 63' have closed upper ends 6333'.

The two opposed first vertical guide grooves 632' of the coupling sleeve 63' may be positioned at an angle of $\pi$ from each other with regard to the longitudinal axis L.

The two opposed second vertical guide grooves 633' of the coupling sleeve 63' may be positioned at an angle of $\pi$ from each other with regard to the longitudinal axis L.

Each first vertical guide groove 632' of the coupling sleeve 63' may be further positioned at an angle of $\pi/2$ to an adjacent second vertical guide groove 633' with regard to the longitudinal axis L, as shown for instance in FIG. 32.

The elevator 55' of the telescopic actuator 55' may have an outer surface 554A' comprising two opposed vertical guides 553'. The two opposed vertical guides 553' of the elevator 55' protrude from the outer surface 554A' of the elevator 55' and extend along a direction parallel to the longitudinal axis L. Each of the two opposed vertical guides 553' of the elevator 55' may be positioned at an angle of $\pi/2$ from each other with regard to the longitudinal axis L, as shown in FIG. 30.

The elevator 55' of the telescopic actuator 5' can be translated out from the central shaft 52' by being guided by the two opposed vertical guides 553' of the elevator 55' in engagement with the two opposed first vertical guide grooves 632' of the coupling sleeve 63'.

When the hand wheel 51' of the telescopic actuator 5' is turned in a predetermined direction (depending on the direction of the threads), the central shaft 52' having outer threads 522' rotates so that the elevator 55' of the telescopic actuator 5' will move upwardly, whereby the top surface 559' of the elevator 55' will force the push plate 86 of the replaceable cartridge 8 up. Then, the push plate 86 will push the spreadable personal care product up and out of the reusable dispenser 3' so that the consumer can have access to it and apply it to the skin. In that case, the elevator 55' of the telescopic actuator 5' will move upwardly by being specifically guided by the two opposed vertical guides 553' of the elevator 55' in engagement with the two opposed first vertical guide grooves 632' of the coupling sleeve 63'.

Also, the elevator 55' may further comprise two opposed vertical spokes 556' protruding from the outer surface 554A' of the elevator 55' at or adjacent to a lower end 557' of the elevator 55'.

The two opposed vertical spokes 556' of the elevator 55' may be positioned at an angle of $\pi$ from each other with regard to the longitudinal axis L.

Each vertical spoke 556' of the elevator 55' may be further positioned at an angle of $\pi/2$ to the adjacent vertical guide 553' of the elevator 55' with regard to the longitudinal axis L.

Figure 31:
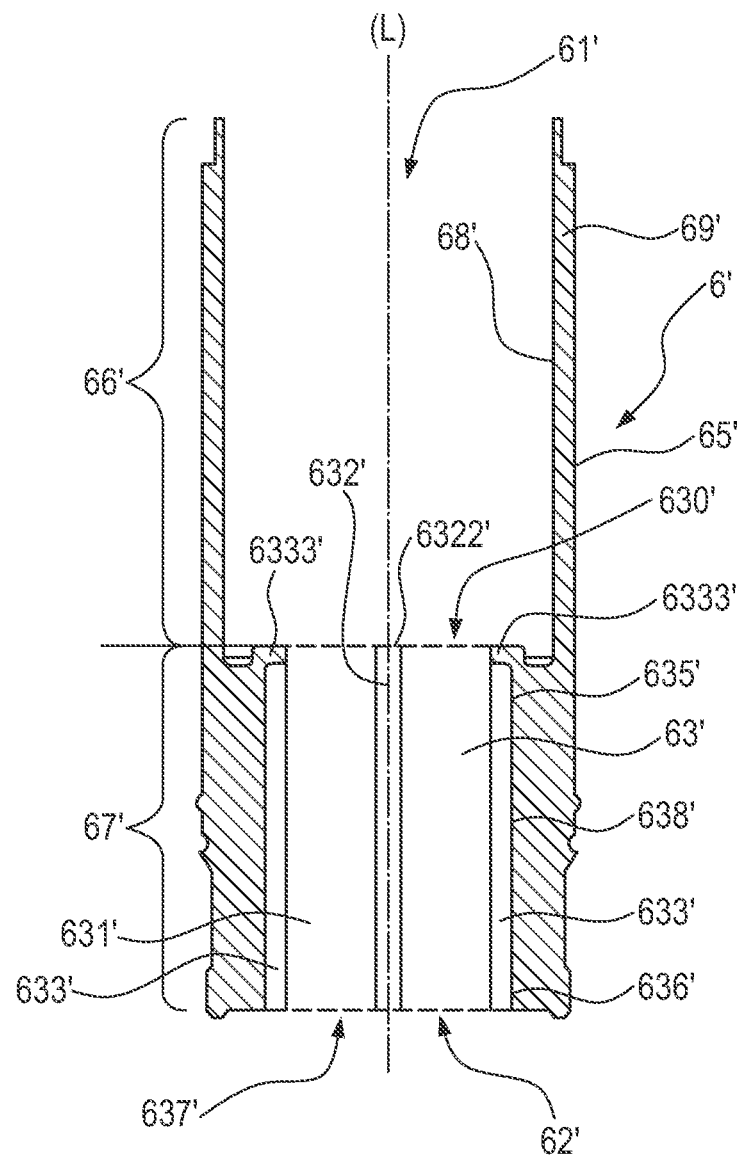
FIG. 31 provides a cross-sectional view of a tubular body of the reusable dispenser according to one or more aspects.

As set out above, each first vertical guide groove 632' of the coupling sleeve 63' may be further positioned at an angle of $\pi/2$ to an adjacent second vertical guide groove 633' with regard to the longitudinal axis L., as shown for instance in FIG. 31.

Hence, in that case, each vertical spoke 556' of the elevator 55' is engaged with the respective second vertical guide groove 633' of the coupling sleeve 63' such that the central shaft 52' and the elevator 55' do not detach.

Figure 33:
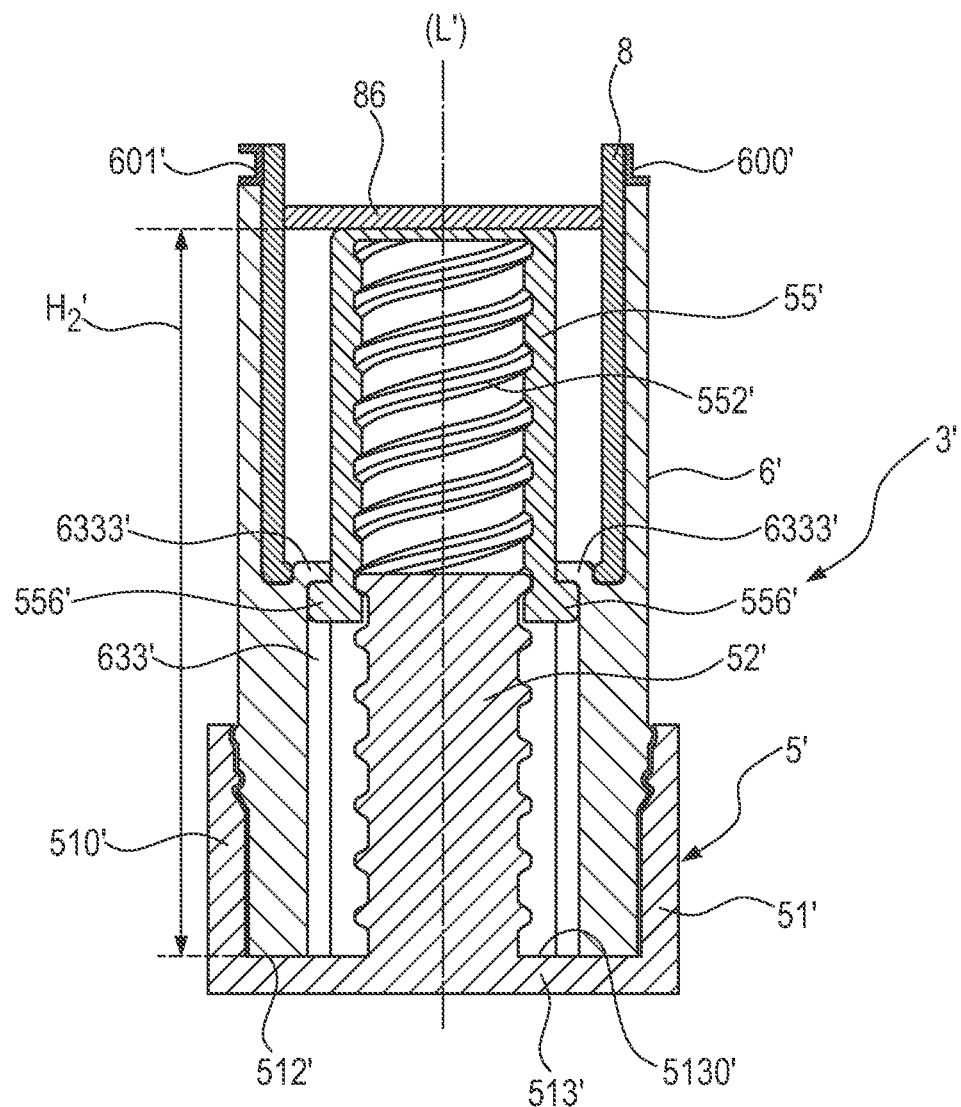
FIG. 33 provides a cross-sectional view of the reusable dispenser of FIG. 32 when the elevator is translated out from the central shaft in an elevated position, according to one or more aspects.
Figure 34A:
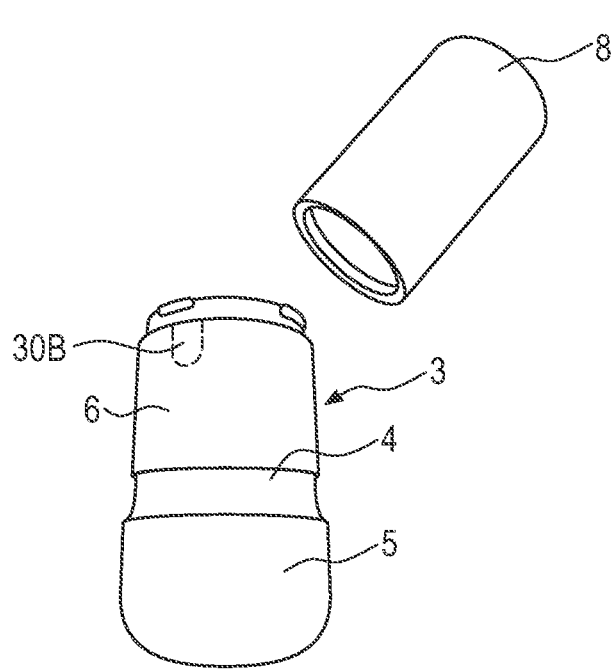
FIG. 34A provides a front view of a reusable dispenser when inserting a replaceable cartridge.
Figure 34B:
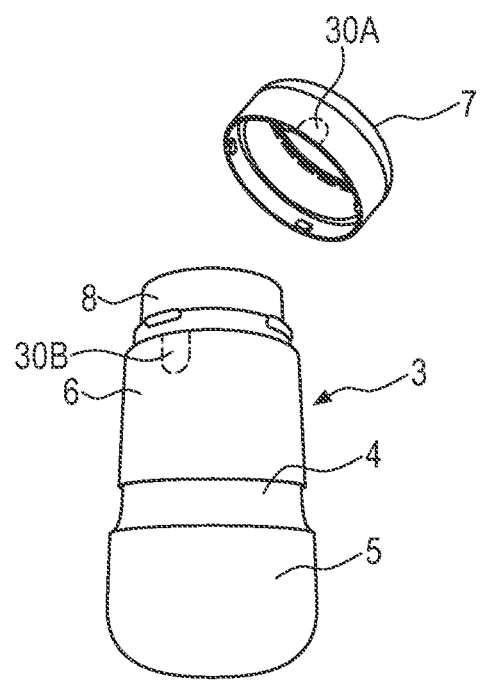
FIG. 34B provides a front view a reusable dispenser of the dispensing package of FIG. 34A, the reusable dispenser having a locking ring being inserted.
Figure 34C:
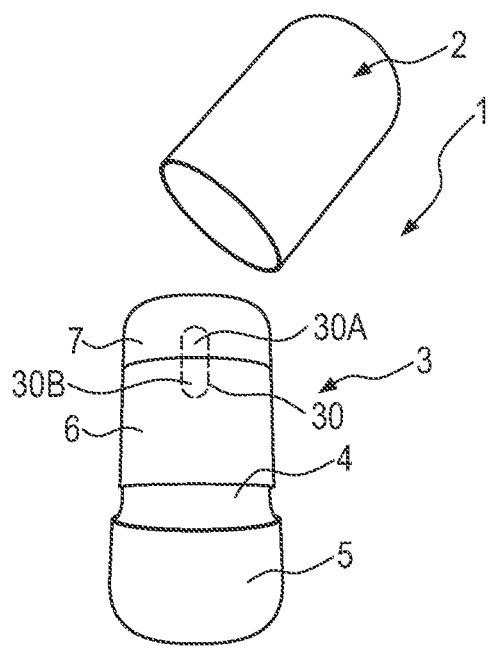
FIG. 34C provides a front view the dispensing package of FIG. 34B in an open position.
Figure 34D:
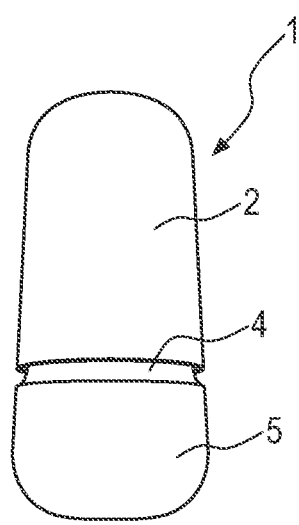
FIG. 34D provides a front view of a dispensing package for a spreadable personal care product shown in a closed position.

Upon rotation of the central shaft 52' of the telescopic actuator 5' by turning the hand wheel 51' in a further predetermined direction, the central shaft 52' and the elevator 55' rotates together such that the elevator 55' is translated out from the central shaft 52', however, without any disengagement between the elevator 55' and the central shaft 52' of the telescopic actuator 5', see for instance, FIG. 33.

In such construction wherein the elevator 55' and the central shaft 52' are commingled together, the elevator 55' has a maximum height that can be translated out from the central shaft 52' of the telescopic actuator 5'. The maximum height $H_2'$ of the elevator 55' that can be translated out from the central shaft 52' is below or nearly the height of the central shaft 52'. The height Hr of the replaceable cartridge 8 can be defined as set out hereinbefore. The height of the replaceable cartridge 8 may be the same as the maximum height of the elevator 55' that can be translated out in order to discharge all the personal care product contained within the tubular chamber 80 of the replaceable cartridge 8.

The first minimum height $H_1'$ of the telescopic actuator 5' may be measured in a direction parallel along the longitudinal axis L from the top surface 559' of the elevator 55' to the inner surface 512' at the bottom 513' of the hand wheel 51'. The first minimum height $H_1'$ of the telescopic actuator 5' is the height when the telescopic actuator 5' is in an initial position.

The second maximum height $H_2'$ of the telescopic actuator 5' may be measured in a direction parallel along the longitudinal axis L from the top surface 559' of the elevator 55' to the inner surface 512' at the bottom 513' of the hand wheel 51', and be the maximum height when the telescopic actuator 5 is in a final position, i.e. a maximum extended position. The second maximum height $H_2'$ of the telescopic actuator 5' can be thus measured as the first minimum height $H_1'$ of the telescopic actuator 5'.

Hence, the dispensing package 1 may be provided such that the ratio between the height Hr of the replaceable cartridge 8 and the second maximum height $H_2'$ of the elevator 55' that can be translated out from the central shaft 52' of the telescopic actuator 5' ranges from about 1 to about ⅘, alternatively about 1 to about ¾, alternatively from about 1 to about ⅔ and alternatively from about 1 to about ½.

Personal Care Product

The replaceable cartridge 8 may comprise a personal care product selected from the group consisting of an antiperspirant product, a deodorant product and a shave care product.

An antiperspirant product comprises antiperspirant actives suitable for application to human skin to provide the desired enhanced wetness protection. Antiperspirant actives can include, but are not limited to, astringent metallic salts, especially the inorganic and organic salts of aluminum, zirconium and zinc, as well as mixtures thereof. Particularly preferred are salts such as aluminum halides, aluminum chlorohydrate, aluminum hydroxyhalides, zirconyl oxyhalides, zirconyl hydroxyhalides, and mixtures thereof.

A deodorant product comprises deodorant actives suitable for topical application to human skin. Suitable deodorant actives, but not limited to, may can include any topical material that is known or otherwise effective in preventing or eliminating malodor associated with perspiration. Suitable deodorant actives may be selected from the group consisting of antimicrobial agents (e.g., bacteriocides, fungicides), malodor-absorbing material, and combinations thereof.

A deodorant or antiperspirant product may be, for example, in the form of a stick and either a soft solid or a solid. Soft solid forms can generally be delivered through perforated dome covers, while solids are utilized without a perforated dome cover for delivery, see for instance US2018/0064624 A1.

A shave care product may be a shaving cream or shave solid stick. The purpose of the shave care product is to soften the hair by providing lubrication. The shave care product may comprise for instance an emulsion of oils, soaps or surfactants, and water. The shave care product may further comprise a humectant for softer consistency and keeping the lather moisturized. Alternatively or also, the shave care product may be an oil-in-water mixture to which humectants, wetting agents, and other ingredients are added.

The personal care product may be selected from the group consisting of an invisible solid product, a soft-solid product, a gel product, a cream.

A personal care product being invisible solid may contain a primary structurant, an antiperspirant or deodorant or shave care active, optionally a perfume, and additional chassis ingredient(s).

The invisible solid personal care product may have a product hardness of least 600 gram-force, more specifically from 600 gram-force to 5 000 gram-force, still more specifically from 750 gram-force to 2 000 gram-force, and yet more specifically from 800 gram force to 1 400 gram force.

The invisible solid may comprise a suitable concentration of a primary structurant to help provide the personal care product active with the desired spreading ability, viscosity, rheology, texture and/or product hardness, or to otherwise help suspend any dispersed solids or liquids within the composition. Non-limiting examples of suitable primary structurants include stearyl alcohol and other fatty alcohols; hydrogenated castor wax; hydrocarbon waxes, synthetic waxes, and microcrystalline wax; polyethylenes with molecular weight of 200 to 1000 daltons; solid triglycerides; behenyl alcohol, or combinations thereof.

A soft-solid personal care product is a product with a static yield stress of 200 Pa to 1 300 Pa. To determine static stress yield values for the antiperspirant soft solid products herein, a two-part test can be conducted. First, a controlled stress ramp can ramp up linearly, and can measure a shear rate at each point of stress. In the second part of the two-part test, a controlled shear rate ramp can be linearly increased and shear stress can be measured. A rheological model can be used to fit the data in both segments of the test, and a value can be determined from the rheological model for both segments.

The soft-solid personal care product can be analyzed using a rheometer. In particular, the rheometer can be a Thermo Scientific Haake RheoStress 600 (available from TA Instruments, New Castle, Del., U.S.A) and data collection and analysis can be performed using rheology software, which can be RheoWin Software Version 2.84 or greater.

To prepare product samples, each product sample can be conditioned at 23° C. until rheological properties can stabilize. An incubation period can be specified for each type of antiperspirant soft solid composition, see for instance US2013/0108570 A1. The rheology software can be used to determine shear yield stress values based on the controlled stress ramp and the controlled shear rate ramp. Data from the rheology test can be plotted as viscosity (Pa-s) on a log scale versus linear applied stress (Pa). "Static yield stress" refers to a point in a stress sweep analysis of a product at which point the rheometer is first capable of measuring product viscosity. The static yield stress is extrapolated from the data from a flow region along a shear rate measurement within 50-500 $s^{-1}$. For the high shear viscosity, the shear rate measurement is done at 10 $s^{-1}$ instead of the 50-500 $s^{-1}$ used for the static yield stress.

A gel personal care product may be a product including a gelling agent, wherein the gelling agent comprises a primary gellant, or a secondary gellant, or a mixture thereof. The primary gellant may be selected from the group consisting of 12-hydroxystearic acid, esters of 12-hydroxystearic acid, amides of 12-hydroxystearic acid and mixtures thereof. The secondary gellant may be selected from the group consisting of n-acyl amino acid derivatives.

A personal care product may be provided as a cream, which may be typical oil/water emulsions, see for instance U.S. Pat. No. 4,083,956A.

The personal care product may not be a product selected from the group consisting of a lipstick, a make-up product, an adhesive or glue product, and a pen.

Exemplary Packaging Materials

A variety of thermoplastic materials or rigid and semi-rigid materials can be used for the reusable dispenser 3, the locking ring 7, the telescopic actuator 5 and the top cap 2, and other components of the dispensing package 1 herein. For example, rigid and semi-rigid materials may include, but are not limited to, metals, including but not limited to, aluminum, magnesium alloy, steel; glass; including but not limited to, laminates and polymeric materials such as polypropylene (PP), polyethylene (PE), polystyrene (PS), polyethylene-terephthalate (PET), styrene-acrylonitrile copolymer (SAN), polyethylene-terephthalate copolymers, polycarbonate (PC), polyamides, acrylonitrile-butadiene-styrene (ABS), thermoplastic elastomers, polyoxymethylene copolymer and mixtures thereof.

Any of the aforementioned polyolefins could be sourced from bio-based feedstocks, such as sugarcane or other agricultural products, to produce a bio-polypropylene or bio-polyethylene.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically modified starch and polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials. For example, the blend may be a combination of materials derived from virgin bio-derived or petroleum-derived materials, or recycled materials of bio-derived or petroleum-derived materials. One or more of the thermoplastic materials in a blend may be biodegradable. Thermoplastic materials may be biodegradable.

The thermoplastic material can also be, for example, a polyester. Exemplary polyesters include, but are not limited to, polyethylene terephthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly(acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material can also be a blend of multiple polymeric and non-polymeric materials. The thermoplastic material can be, for example, a blend of high, medium, and low molecular polymers yielding a multi-modal or bi-modal blend. The multi-modal material can be designed in a way that results in a thermoplastic material that has superior flow properties yet has satisfactory chemo/physical properties. The thermoplastic material can also be a blend of a polymer with one or more small molecule additives. The small molecule could be, for example, a siloxane or other lubricating molecule that, when added to the thermoplastic material, improves the flowability of the polymeric material.

Polymeric materials may also include various fillers known to the skilled artisan, such as, for example, mica, interference pigments, wood flour; or materials that are capable of "blooming" to the surface of a molded component. Other additives may include inorganic fillers such calcium carbonate, calcium sulfate, talcs, clays (e.g., nanoclays), aluminum hydroxide, CaSiO3, glass formed into fibers or microspheres, crystalline silicas (e.g., quartz, novacite, crystallobite), magnesium hydroxide, mica, sodium sulfate, lithopone, magnesium carbonate, iron oxide; or, organic fillers such as rice husks, straw, hemp fiber, wood flour, or wood, bamboo or sugarcane fiber.

Methods

A method for dispensing a spreadable personal care product is provided and comprises the following steps in that order:

a) Providing a reusable dispenser 3, wherein the reusable dispenser 3 comprises: a longitudinal axis L, a tubular body 6 having an open top 61 and an open bottom 62, wherein the tubular body 6 comprises an upper top portion 66 and a lower bottom portion 67, wherein the tubular body 6 has a coupling sleeve 63 disposed inside the lower bottom portion 67 forming a central opening 630 coaxial to the longitudinal axis L; and a telescopic actuator 5 axially oriented within the tubular body 6 and mounted through the open bottom 62 of the tubular body 6 into the coupling sleeve 63;

b) Providing a replaceable cartridge 8, wherein the replaceable cartridge 8 comprises a tubular chamber 80, wherein the tubular chamber 80 includes an open top 84 and an open bottom 85; wherein the replaceable cartridge 8 comprises a push plate 86 disposed inside the tubular chamber 80 at or adjacent to the open bottom 85 of the tubular chamber 80;

c) Filling the replaceable cartridge 8 with a spreadable personal care product;

d) Inserting the replaceable cartridge 8 in the reusable dispenser 3 through the open top 61 of the tubular body 6 of the reusable dispenser 3;

e) Securing the replaceable cartridge 8 within the tubular body 6 of the reusable dispenser 3 by removably engaging a locking ring 7 with the tubular body 6 of the reusable dispenser 3; and f) actuating the telescopic actuator 5 to dispense the spreadable personal care product to the consumer by displacing the push plate 86 upwardly in the replaceable cartridge 8 towards the open top 84 of the replaceable cartridge 8.

Alternatively, a method for dispensing a spreadable personal care product is provided and comprises the following steps in that order:

a) Providing a reusable dispenser 3, wherein the reusable dispenser 3 comprises: a longitudinal axis L, a tubular body 6 having an open top 61 and an open bottom 62, wherein the tubular body 6 comprises an upper top portion 66 and a lower bottom portion 67, wherein the tubular body 6 has a coupling sleeve 63 disposed inside the lower bottom portion 67 forming a central opening 630 coaxial to the longitudinal axis L; and a telescopic actuator 5 axially oriented within the tubular body 6 and mounted through the open bottom 62 of the tubular body 6 into the coupling sleeve 63;

b) Providing a replaceable cartridge 8, wherein the replaceable cartridge 8 comprises a tubular chamber 80, wherein the tubular chamber 80 includes an open top 84 and an open bottom 85; wherein the replaceable cartridge 8 comprises a push plate 86 disposed inside the tubular chamber 80 at or adjacent to the open bottom 85 of the tubular chamber 80;

c) Filling the replaceable cartridge 8 with a spreadable personal care product;

d) Inserting the replaceable cartridge 8 in the reusable dispenser 3 through the open top 61 of the tubular body 6 of the reusable dispenser 3;

e) Securing the replaceable cartridge 8 within the tubular body 6 of the reusable dispenser 3 by removably engaging a locking ring 7 with the tubular body 6 of the reusable dispenser 3; wherein the locking ring 7 comprises a first indicia 30A located at an outer surface 78 of the locking ring 7, wherein the tubular body 6 comprises a second indicia 30B located at an outer surface 65 of the tubular body 6, such that the first and second indicia (30A, 30B) together form a final indicia 30 to indicate that the locking ring 7 is locked to the tubular body 6 of the reusable dispenser 3; and f) actuating the telescopic actuator 5 to dispense the spreadable personal care product to the consumer by displacing the push plate 86 upwardly in the replaceable cartridge 8 towards the open top 84 of the replaceable cartridge 8.

The method may further comprise the following steps in that order of:

g. removing the locking ring 7 from the tubular body 6 of the reusable dispenser 3;
h. removing the replaceable cartridge 8 to be disposed of or recycled; and
i. actuating the telescopic actuator 5 to the initial position.

FIG. 34A-D are non-limiting front views to show how the replaceable cartridge 8 can be inserted and removed reciprocally.

A method of applying a spreadable personal care product onto the skin of a consumer, such as an antiperspirant or a deodorant product onto the axilla skin of a consumer; optionally in the form of a cream, a gel, a soft-solid or invisible solid, is provided and comprises the use of a dispensing package 1 as set out hereinbefore.

A method of manufacturing a dispensing package 1 for a spreadable personal care product is provided and comprises bringing together a reusable dispenser 3, a replaceable cartridge 8, a locking ring 7 and optionally a top cap 2.

The reusable dispenser 3 comprises: a longitudinal axis L; a tubular body 6 having an open top 61 and an open bottom 62. The tubular body 6 comprises an upper top portion 66 and a lower bottom portion 67, wherein the tubular body 6 has a coupling sleeve 63 disposed inside the lower bottom portion 67 forming a central opening 630 coaxial to the longitudinal axis L. Also, the reusable dispenser 3 comprises a telescopic actuator 5 axially oriented within the tubular body 6 and mounted through the open bottom 62 of the tubular body 6 into the coupling sleeve 63.

The replaceable cartridge 8 comprises: a tubular chamber 80 for holding the personal care product. The tubular chamber 80 includes an open top 84 and an open bottom 85; wherein the tubular chamber 80 comprises a push plate 86 disposed inside the tubular chamber 80 at or adjacent to the open bottom 85 of the tubular chamber 80.

The replaceable cartridge 8 is slidingly mounted through the open top 61 of the tubular body 6. The reusable dispenser 3 comprises a locking ring 7 removably engaged with the tubular body 6 of the reusable dispenser 3 to secure the replaceable cartridge 8 within the tubular body 6 of the reusable dispenser 3.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dispensing package for a spreadable personal care product comprising:
   a reusable dispenser, a replaceable cartridge and optionally a top cap;
   wherein the reusable dispenser comprises:
      a longitudinal axis;
      a tubular body having an open top and an open bottom, wherein the tubular body comprises an upper top portion and a lower bottom portion,
      wherein the tubular body has a coupling sleeve disposed inside the lower bottom portion forming a central opening coaxial to the longitudinal axis; and
      a telescopic actuator axially oriented within the tubular body and mounted through the open bottom of the tubular body into the coupling sleeve;
   wherein the replaceable cartridge comprises:
      a tubular chamber for holding the personal care product, wherein the tubular chamber includes an open top and an open bottom;
      wherein the tubular chamber comprises a push plate disposed inside the tubular chamber at or adjacent to the open bottom of the tubular chamber;
   wherein the replaceable cartridge is slidingly mounted through the open top of the tubular body;
   wherein the telescopic actuator is able to engage with the push plate to deliver the personal care product from the open top of the replaceable cartridge; and
   wherein the reusable dispenser comprises a locking ring removably engaged with the tubular body of the reusable dispenser to secure the replaceable cartridge within the tubular body of the reusable dispenser.

2. The dispensing package according to claim 1, wherein the locking ring comprises an upper end at an open top, a lower end at an open bottom, and an inner surface, wherein the locking ring comprises a circumferential edge located at the upper end of the locking ring, wherein the circumferential edge protrudes from the inner surface of the locking ring;
   wherein the locking ring secures the replaceable cartridge within the tubular body of the reusable dispenser by contacting the inner surface of the locking ring with an outer surface of the replaceable cartridge and by contacting the circumferential edge of the locking ring with an upper end of the replaceable cartridge.

3. The dispensing package according to claim 1, wherein the locking ring comprises an open top, wherein the open top of the locking ring has an inner diameter, wherein the open top of the replaceable cartridge has an inner diameter and an outer diameter, wherein the inner diameter of the open top of the locking ring is smaller than the outer diameter of the open top of the replaceable cartridge.

4. The dispensing package according to claim 1, wherein the locking ring comprises an annular groove at or adjacent to the lower end of the locking ring, wherein the annular groove is a recess of the inner surface of the locking ring.

5. The dispensing package according to claim 4, wherein the annular groove of the locking ring has an inner surface, wherein the annular groove comprises one or more male lugs which protrudes from the inner surface of the annular groove;
   wherein the tubular body of the reusable dispenser comprises a stepped section at or adjacent to an upper end of the tubular body, wherein the stepped section comprises one or more interlocking recesses, wherein the one or more male lugs of the annular groove of the locking ring snap fit over the one or more interlocking recesses of the stepped section of the tubular body to engage the locking ring with the tubular body for securing the replaceable cartridge within the tubular body of the reusable dispenser.

6. The dispensing package according to claim 4, wherein the annular groove of the locking ring comprises inner threads;
wherein the tubular body of the reusable dispenser comprises a stepped section at or adjacent to an upper end of the tubular body, wherein the stepped section comprises outer threads, wherein the inner threads of the annular groove of the locking ring engage with the outer threads of the stepped section of the tubular body to lock the locking ring with the tubular body for securing the replaceable cartridge within the tubular body of the reusable dispenser.

7. The dispensing package according to claim 1, wherein the replaceable cartridge is made of a material selected from the group consisting of paper, corrugated paperboard, cardboard, and mixtures thereof.

8. The dispensing package according to claim 1, wherein the replaceable cartridge comprises a personal care product selected from the group consisting of an antiperspirant product, a deodorant product and a shave care product.

9. The dispensing package according to claim 1, wherein the replaceable cartridge comprises an upper end at the open top of the replaceable cartridge and a lower end at the open bottom of the replaceable cartridge, wherein the upper end of the replaceable cartridge has a rounded edge and the lower end of the replaceable cartridge has a rounded edge.

10. The dispensing package according to claim 1, wherein the replaceable cartridge comprises a spiral wounded tube, wherein the replaceable cartridge includes a first laminate forming an inner part of the tubular chamber and the rounded edge at the open bottom of the replaceable cartridge; and wherein the replaceable cartridge further comprises a second laminate forming the outer part of the tubular chamber and the rounded edge at the open top of the replaceable cartridge.

11. The dispensing package according to claim 1, wherein the push plate comprise first, second and third layers, wherein the first layer of the push plate is positioned towards the open top of the replaceable cartridge, wherein the third layer of the push plate is positioned towards the open bottom of the replaceable cartridge, wherein the second layer of the push plate is positioned between the first and third layer; and
wherein a portion of the first layer has been cut out such that the personal care product adheres with the remaining first layer and a top surface of the second layer.

12. A dispensing package for a spreadable personal care product comprising:
a reusable dispenser, a replaceable cartridge and a top cap;
wherein the reusable dispenser comprises:
a longitudinal axis,
a tubular body having an open top and an open bottom, wherein the tubular body comprises an upper top portion and a lower bottom portion,
wherein the tubular body has a coupling sleeve disposed inside the lower bottom portion forming a central opening coaxial to the longitudinal axis; and
a telescopic actuator axially oriented within the tubular body and mounted through the open bottom of the tubular body into the coupling sleeve;

wherein the replaceable cartridge comprises:
a tubular chamber for holding the personal care product, wherein the tubular chamber includes an open top and an open bottom;
wherein the tubular chamber comprises a push plate disposed inside the tubular chamber at or adjacent to the open bottom of the tubular chamber;
wherein the replaceable cartridge is slidingly mounted through the open top of the tubular body;
wherein the telescopic actuator is able to engage with the push plate to deliver the personal care product from the open top of the replaceable cartridge;
wherein the reusable dispenser comprises a locking ring removably engaged with the tubular body of the reusable dispenser to secure the replaceable cartridge within the tubular body of the reusable dispenser;
wherein the locking ring comprises a first indicia located at an outer surface of the locking ring, wherein the tubular body comprises a second indicia located at an outer surface of the tubular body, such that the first and second indicia together form a final indicia to indicate that the locking ring is locked to the tubular body of the reusable dispenser.

13. A method for dispensing a spreadable personal care product comprising the following steps in that order:
a. Providing the dispensing package of claim 1 wherein the reusable dispenser and the replaceable cartridge are separate;
b. Filling the replaceable cartridge with a spreadable personal care product;
c. Inserting the replaceable cartridge in the reusable dispenser through the open top of the tubular body of the reusable dispenser;
d. Securing the replaceable cartridge within the tubular body of the reusable dispenser by removably engaging a locking ring with the tubular body of the reusable dispenser; and
e. actuating the telescopic actuator to dispense the spreadable personal care product to the consumer by displacing the push plate upwardly in the replaceable cartridge towards the open top of the replaceable cartridge.

14. A method for dispensing a spreadable personal care product comprising the following steps in that order:
a. Providing a dispensing package of claim 12 wherein the reusable dispenser and the replaceable cartridge are separate;
b. Filling the replaceable cartridge with a spreadable personal care product;
c. Inserting the replaceable cartridge in the reusable dispenser through the open top of the tubular body of the reusable dispenser;
d. Securing the replaceable cartridge within the tubular body of the reusable dispenser by removably engaging a locking ring with the tubular body of the reusable dispenser;
wherein the locking ring comprises a first indicia located at an outer surface of the locking ring, wherein the tubular body comprises a second indicia located at an outer surface of the tubular body, such that the first and second indicia together form a final indicia to indicate that the locking ring is locked to the tubular body of the reusable dispenser; and
e. actuating the telescopic actuator to dispense the spreadable personal care product to the consumer by displacing the push plate upwardly in the replaceable cartridge towards the open top of the replaceable cartridge.

15. The method of claim 14 wherein the spreadable personal care product comprises an antiperspirant or a deodorant product in the form of a cream, a gel, a soft-solid, or invisible solid.

* * * * *